United States Patent
Huang et al.

(10) Patent No.: US 9,876,522 B2
(45) Date of Patent: Jan. 23, 2018

(54) PROTECTIVE CASE FOR MOBILE DEVICE

(71) Applicant: Mophie, Inc., Tustin, CA (US)

(72) Inventors: Daniel Huang, Irvine, CA (US); Matthew Brand, Brooklyn, NY (US); Nguyen To, Corona, CA (US); Andrew Namminga, Costa Mesa, CA (US); Walter Singhon Tam, Surrey (CA)

(73) Assignee: MOPHIE, INC., Tustin, CA (US)

( * ) Notice: Subject to any disclaimer, the term of this patent is extended or adjusted under 35 U.S.C. 154(b) by 6 days.

(21) Appl. No.: 14/205,167

(22) Filed: Mar. 11, 2014

(65) Prior Publication Data
US 2014/0268519 A1   Sep. 18, 2014

Related U.S. Application Data

(60) Provisional application No. 61/802,181, filed on Mar. 15, 2013, provisional application No. 61/923,590, filed on Jan. 3, 2014.

(51) Int. Cl.
*G06F 1/16*    (2006.01)
*H04M 1/02*   (2006.01)
*H04B 1/3888*  (2015.01)
*H04B 1/38*   (2015.01)

(52) U.S. Cl.
CPC ... *H04B 1/3888* (2013.01); *H04B 2001/3894* (2013.01)

(58) Field of Classification Search
CPC .... H04M 1/0214; H04M 1/23; H04M 1/0247; H04M 1/0237; H04M 1/0283; H04M 1/18; H04B 1/3833; H04B 1/3888; A45C 2011/002
See application file for complete search history.

(56) References Cited

U.S. PATENT DOCUMENTS

| | | |
|---|---|---|
| 3,851,126 A | 11/1974 | Keller |
| 4,028,515 A | 6/1977 | Desio et al. |
| D267,795 S | 2/1983 | Mallon |
| 4,479,596 A | 10/1984 | Swanson |
| 4,515,272 A | 5/1985 | Newhouse |
| D284,372 S | 6/1986 | Carpenter |

(Continued)

FOREIGN PATENT DOCUMENTS

| CN | 201252577 Y | 6/2009 |
|---|---|---|
| CN | 202364273 U | 8/2012 |

(Continued)

OTHER PUBLICATIONS

Reexamination Control No. 90/013,319 including its prosecution history, filed Sep. 18, 2014, Huang et al.

(Continued)

*Primary Examiner* — Xanthia C Cunningham
(74) *Attorney, Agent, or Firm* — Knobbe, Martens, Olson & Bear LLP

(57) ABSTRACT

Disclosed is durable and water-resistant or water-proof communication accessory with a built-in battery for a mobile communication device capable of enclosing, powering, and protecting a mobile device and protecting it from dirt, water, weather, bumps, and scratches. The built-in battery can extend the battery operating time of mobile communication device while protecting the sensitive electronics, glass screen, and data.

34 Claims, 60 Drawing Sheets

(56) References Cited

U.S. PATENT DOCUMENTS

| | | |
|---|---|---|
| 4,951,817 A | 8/1990 | Barletta et al. |
| D312,534 S | 12/1990 | Nelson et al. |
| 5,001,772 A | 3/1991 | Holcomb et al. |
| D322,719 S | 12/1991 | Jayez |
| D327,868 S | 7/1992 | Oka |
| 5,360,108 A | 11/1994 | Alagia |
| 5,368,159 A | 11/1994 | Doria |
| 5,383,091 A | 1/1995 | Snell |
| 5,386,084 A | 1/1995 | Risko |
| 5,508,123 A | 4/1996 | Fan |
| D372,896 S | 8/1996 | Nagele et al. |
| 5,586,002 A | 12/1996 | Notarianni |
| 5,604,050 A | 2/1997 | Brunette et al. |
| 5,610,979 A | 3/1997 | Yu |
| D384,327 S | 9/1997 | Nakui |
| 5,708,707 A | 1/1998 | Halttlunen et al. |
| 5,711,013 A | 1/1998 | Collett et al. |
| D392,248 S | 3/1998 | Johansson |
| D392,939 S | 3/1998 | Finke-Anlauff |
| 5,786,106 A | 7/1998 | Armani |
| 5,816,459 A | 10/1998 | Armistead |
| D400,495 S | 11/1998 | Deslyper et al. |
| D400,496 S | 11/1998 | Barber et al. |
| 5,859,481 A | 1/1999 | Banyas |
| 5,864,766 A | 1/1999 | Chiang |
| D405,801 S | 2/1999 | Nagele et al. |
| D407,063 S | 3/1999 | Reis et al. |
| 5,876,351 A | 3/1999 | Rohde |
| D407,708 S | 4/1999 | Nagele et al. |
| 5,896,277 A | 4/1999 | Leon et al. |
| 5,932,855 A | 8/1999 | Wang et al. |
| 5,959,433 A | 9/1999 | Rohde |
| 5,973,477 A | 10/1999 | Chang |
| D417,189 S | 11/1999 | Amero, Jr. et al. |
| 6,043,626 A | 3/2000 | Snyder et al. |
| 6,051,957 A | 4/2000 | Klein |
| D424,512 S | 5/2000 | Ho |
| 6,069,332 A | 5/2000 | Suchanek et al. |
| 6,081,595 A | 6/2000 | Picaud |
| D428,019 S | 7/2000 | Amron |
| 6,082,535 A | 7/2000 | Mitchell |
| 6,171,138 B1 | 1/2001 | Lefebvre et al. |
| D438,004 S | 2/2001 | Watson et al. |
| 6,184,654 B1 | 2/2001 | Bachner, III et al. |
| D439,218 S | 3/2001 | Yu |
| 6,201,867 B1 | 3/2001 | Koike |
| 6,208,115 B1 | 3/2001 | Binder |
| 6,266,539 B1 | 7/2001 | Pardo |
| D446,497 S | 8/2001 | Yu |
| 6,273,252 B1 | 8/2001 | Mitchell |
| D447,462 S | 9/2001 | Kosiba |
| 6,313,982 B1 | 11/2001 | Hino |
| 6,317,313 B1 | 11/2001 | Mosgrove et al. |
| 6,324,380 B1 | 11/2001 | Kiuchi et al. |
| 6,346,791 B1 | 2/2002 | Berguirdjian |
| 6,377,811 B1 | 4/2002 | Sood et al. |
| 6,405,056 B1 | 6/2002 | Altschul et al. |
| D460,411 S | 7/2002 | Wang |
| D460,761 S | 7/2002 | Croley |
| 6,415,138 B2 | 7/2002 | Sirola et al. |
| 6,434,371 B1 | 8/2002 | Claxton |
| 6,434,404 B1 | 8/2002 | Claxton et al. |
| 6,445,577 B1 | 9/2002 | Madsen et al. |
| 6,471,056 B1 | 10/2002 | Tzeng |
| D469,427 S | 1/2003 | Ma et al. |
| 6,536,589 B2 | 3/2003 | Chang |
| 6,538,413 B1 | 3/2003 | Beard et al. |
| D472,384 S | 4/2003 | Richardson |
| 6,552,513 B1 | 4/2003 | Li |
| 6,555,990 B1 | 4/2003 | Yang |
| 6,583,601 B2 | 6/2003 | Simoes et al. |
| 6,594,472 B1 * | 7/2003 | Curtis ............... H04M 1/0283 379/428.01 |
| 6,614,722 B2 | 9/2003 | Polany et al. |
| 6,626,362 B1 | 9/2003 | Steiner et al. |
| D481,716 S | 11/2003 | He et al. |
| D482,529 S | 11/2003 | Hardigg et al. |
| 6,646,864 B2 | 11/2003 | Richardson |
| D484,874 S | 1/2004 | Chang et al. |
| D485,834 S | 1/2004 | Davetas |
| 6,681,003 B2 | 1/2004 | Linder et al. |
| 6,701,159 B1 | 3/2004 | Powell |
| 6,708,887 B1 | 3/2004 | Garrett et al. |
| 6,714,802 B1 | 3/2004 | Barvesten |
| 6,785,566 B1 | 8/2004 | Irizarry |
| 6,819,549 B1 | 11/2004 | Lammers-Meis et al. |
| D500,041 S | 12/2004 | Tsujimoto |
| D506,612 S | 6/2005 | Rosa et al. |
| D508,495 S | 8/2005 | Bone et al. |
| D513,123 S | 12/2005 | Richardson et al. |
| 6,980,777 B2 | 12/2005 | Shepherd et al. |
| D513,451 S | 1/2006 | Richardson et al. |
| 6,992,461 B2 | 1/2006 | Liang et al. |
| D514,808 S | 2/2006 | Morine et al. |
| D516,309 S | 3/2006 | Richardson et al. |
| D516,553 S | 3/2006 | Richardson et al. |
| D516,554 S | 3/2006 | Richardson et al. |
| D516,807 S | 3/2006 | Richardson et al. |
| D517,007 S | 3/2006 | Yong-Jian et al. |
| D520,744 S | 5/2006 | Pangerc et al. |
| 7,050,841 B1 | 5/2006 | Onda |
| 7,059,769 B1 | 6/2006 | Potega |
| 7,069,063 B2 | 6/2006 | Halkosaari et al. |
| D525,582 S | 7/2006 | Chan |
| 7,072,699 B2 | 7/2006 | Eiden |
| 7,079,879 B1 | 7/2006 | Sylvester et al. |
| 7,081,736 B2 | 7/2006 | Seil et al. |
| D526,780 S | 8/2006 | Richardson et al. |
| D526,958 S | 8/2006 | Shimizu |
| D530,079 S | 10/2006 | Thomas et al. |
| D535,252 S | 1/2007 | Sandnes |
| 7,158,376 B2 | 1/2007 | Richardson et al. |
| 7,166,987 B2 | 1/2007 | Lee et al. |
| D537,063 S | 2/2007 | Kim et al. |
| 7,180,735 B2 | 2/2007 | Thomas et al. |
| 7,180,754 B2 | 2/2007 | Qin et al. |
| 7,194,291 B2 | 3/2007 | Peng |
| D540,539 S | 4/2007 | Gutierrez |
| 7,203,467 B2 | 4/2007 | Siddiqui |
| D542,286 S | 5/2007 | Taniyama et al. |
| D542,524 S | 5/2007 | Richardson et al. |
| D543,541 S | 5/2007 | Chung et al. |
| D544,486 S | 6/2007 | Hussaini et al. |
| 7,230,823 B2 | 6/2007 | Richardson et al. |
| D547,056 S | 7/2007 | Griffin et al. |
| D547,057 S | 7/2007 | Griffin et al. |
| D550,455 S | 9/2007 | Barnhart |
| D551,252 S | 9/2007 | Andre et al. |
| 7,266,391 B2 | 9/2007 | Warren |
| D551,856 S | 10/2007 | Ko et al. |
| D553,857 S | 10/2007 | Pendergraph et al. |
| D556,679 S | 12/2007 | Weinstein et al. |
| D556,681 S | 12/2007 | Kim |
| D557,205 S | 12/2007 | Kim |
| D557,264 S | 12/2007 | Richardson et al. |
| D557,494 S | 12/2007 | Mayette et al. |
| D557,897 S | 12/2007 | Richardson et al. |
| 7,312,984 B2 | 12/2007 | Richardson et al. |
| D558,667 S | 1/2008 | Park et al. |
| D558,757 S | 1/2008 | Andre et al. |
| D558,972 S | 1/2008 | Oh |
| D558,973 S | 1/2008 | Hussaini et al. |
| D559,267 S | 1/2008 | Griffin |
| D560,229 S | 1/2008 | Yagi |
| D561,092 S | 2/2008 | Kim |
| 7,336,973 B2 | 2/2008 | Goldthwaite et al. |
| D563,093 S | 3/2008 | Nussberger |
| 7,343,184 B2 | 3/2008 | Rostami |
| D565,291 S | 4/2008 | Brandenburg et al. |
| 7,397,658 B2 | 7/2008 | Finke-Anlauff et al. |
| 7,400,917 B2 | 7/2008 | Wood et al. |
| D574,326 S | 8/2008 | Lim |
| D574,819 S | 8/2008 | Andre et al. |
| D575,056 S | 8/2008 | Tan |

(56) References Cited

U.S. PATENT DOCUMENTS

| | | |
|---|---|---|
| 7,428,427 B2 | 9/2008 | Brunstrom et al. |
| D577,904 S | 10/2008 | Sasaki |
| D581,151 S | 11/2008 | Aipa |
| D581,155 S | 11/2008 | Richardson et al. |
| D581,421 S | 11/2008 | Richardson et al. |
| D582,149 S | 12/2008 | Tan |
| 7,464,814 B2 | 12/2008 | Carnevali |
| D584,732 S | 1/2009 | Cho et al. |
| 7,479,759 B2 | 1/2009 | Vilanov et al. |
| D587,008 S | 2/2009 | Richardson et al. |
| D587,896 S | 3/2009 | Aipa |
| D589,016 S | 3/2009 | Richardson et al. |
| D589,953 S | 4/2009 | Turner |
| 7,536,099 B2 | 5/2009 | Dalby et al. |
| D593,319 S | 6/2009 | Richardson et al. |
| D593,746 S | 6/2009 | Richardson et al. |
| D594,849 S | 6/2009 | Ko |
| 7,555,325 B2 | 6/2009 | Goros |
| D597,089 S | 7/2009 | Khan et al. |
| 7,562,813 B2 | 7/2009 | Humphrey et al. |
| D597,301 S | 8/2009 | Richardson et al. |
| D598,407 S | 8/2009 | Richardson et al. |
| 7,577,462 B2 | 8/2009 | Kumar |
| D600,640 S | 9/2009 | Stein et al. |
| D600,908 S | 9/2009 | Richardson et al. |
| D601,955 S | 10/2009 | Ekmekdje |
| D601,959 S | 10/2009 | Lee et al. |
| D601,960 S | 10/2009 | Dai |
| 7,609,512 B2 * | 10/2009 | Richardson ............ G06F 1/1626 361/679.02 |
| D603,602 S | 11/2009 | Richardson et al. |
| D603,603 S | 11/2009 | Laine et al. |
| 7,612,997 B1 | 11/2009 | Diebel et al. |
| D605,850 S | 12/2009 | Richardson et al. |
| D606,528 S | 12/2009 | Khan et al. |
| D606,529 S | 12/2009 | Ferrari et al. |
| 7,635,086 B2 | 12/2009 | Spencer, II |
| 7,638,969 B2 | 12/2009 | Woud |
| 7,647,082 B2 | 1/2010 | Holmberg |
| D609,228 S | 2/2010 | Ferrari et al. |
| D609,463 S | 2/2010 | Bullen |
| D610,538 S | 2/2010 | Wu et al. |
| 7,656,120 B2 | 2/2010 | Neu et al. |
| 7,663,878 B2 | 2/2010 | Swan et al. |
| 7,667,433 B1 | 2/2010 | Smith |
| D610,807 S | 3/2010 | Bau |
| D611,042 S | 3/2010 | Ferrari et al. |
| D611,478 S | 3/2010 | Richardson et al. |
| 7,669,829 B2 | 3/2010 | Ogatsu |
| D613,282 S | 4/2010 | Richardson et al. |
| D615,077 S | 5/2010 | Richardson et al. |
| D615,535 S | 5/2010 | Richardson et al. |
| D615,536 S | 5/2010 | Richardson et al. |
| D615,967 S | 5/2010 | Richardson et al. |
| D616,360 S | 5/2010 | Huang |
| D616,361 S | 5/2010 | Huang |
| D617,753 S | 6/2010 | Cheng |
| D617,784 S | 6/2010 | Richardson et al. |
| D617,785 S | 6/2010 | Richardson et al. |
| D617,786 S | 6/2010 | Richardson et al. |
| D617,787 S | 6/2010 | Richardson et al. |
| D618,231 S | 6/2010 | Fahrendorff et al. |
| 7,733,637 B1 | 6/2010 | Lam |
| D619,573 S | 7/2010 | Khan et al. |
| D619,574 S | 7/2010 | Richardson et al. |
| D619,991 S | 7/2010 | Huang |
| D620,000 S | 7/2010 | Bau |
| D620,487 S | 7/2010 | Richardson et al. |
| D621,394 S | 8/2010 | Richardson et al. |
| D621,395 S | 8/2010 | Richardson et al. |
| D621,821 S | 8/2010 | Richardson et al. |
| D621,822 S | 8/2010 | Richardson et al. |
| 7,778,023 B1 | 8/2010 | Mohoney |
| 7,782,610 B2 | 8/2010 | Diebel et al. |
| D623,179 S | 9/2010 | Richardson et al. |
| D623,180 S | 9/2010 | Diebel |
| D623,638 S | 9/2010 | Richardson et al. |
| D623,639 S | 9/2010 | Richardson et al. |
| D623,640 S | 9/2010 | Freeman |
| D624,317 S | 9/2010 | Wenchel et al. |
| D624,533 S | 9/2010 | Richardson et al. |
| D624,908 S | 10/2010 | Huskinson |
| D624,909 S | 10/2010 | Huskinson |
| D624,910 S | 10/2010 | Richardson et al. |
| D625,303 S | 10/2010 | Kim |
| D626,120 S | 10/2010 | Richardson et al. |
| D626,121 S | 10/2010 | Richardson et al. |
| D626,538 S | 11/2010 | Brown et al. |
| D626,539 S | 11/2010 | Brown et al. |
| D626,540 S | 11/2010 | Brown et al. |
| D626,964 S | 11/2010 | Richardson et al. |
| D628,568 S | 12/2010 | Richardson et al. |
| D628,994 S | 12/2010 | Griffin, Jr. et al. |
| 7,859,222 B2 | 12/2010 | Woud |
| D631,246 S | 1/2011 | Boettner |
| 7,863,856 B2 | 1/2011 | Sherman et al. |
| 7,863,862 B2 | 1/2011 | Idzik et al. |
| D631,877 S | 2/2011 | Rak et al. |
| D632,648 S | 2/2011 | Yang |
| D632,683 S | 2/2011 | Richardson et al. |
| D632,684 S | 2/2011 | Richardson et al. |
| D632,685 S | 2/2011 | Richardson et al. |
| D632,686 S | 2/2011 | Magness et al. |
| 7,889,489 B2 | 2/2011 | Richardson et al. |
| 7,889,498 B2 | 2/2011 | Diebel et al. |
| D634,704 S | 3/2011 | Tieleman et al. |
| D634,741 S | 3/2011 | Richardson et al. |
| 7,899,397 B2 | 3/2011 | Kumar |
| 7,907,394 B2 | 3/2011 | Richardson et al. |
| 7,911,530 B2 | 3/2011 | Sawachi |
| D636,386 S | 4/2011 | Richardson et al. |
| D636,387 S | 4/2011 | Willes et al. |
| 7,930,011 B2 | 4/2011 | Shi et al. |
| 7,933,122 B2 | 4/2011 | Richardson et al. |
| D637,588 S | 5/2011 | Richardson et al. |
| D637,589 S | 5/2011 | Willes et al. |
| D637,590 S | 5/2011 | Michie et al. |
| D637,591 S | 5/2011 | Willes et al. |
| D637,592 S | 5/2011 | Magness et al. |
| D637,952 S | 5/2011 | Tan |
| D638,005 S | 5/2011 | Richardson et al. |
| D638,411 S | 5/2011 | Willes et al. |
| D638,413 S | 5/2011 | Magness et al. |
| D638,414 S | 5/2011 | Magness et al. |
| D638,828 S | 5/2011 | Melanson et al. |
| D638,829 S | 5/2011 | Melanson et al. |
| D638,830 S | 5/2011 | Magness et al. |
| D639,731 S | 6/2011 | Sun |
| D640,679 S | 6/2011 | Willes et al. |
| D640,680 S | 6/2011 | Magness et al. |
| 7,957,524 B2 | 6/2011 | Chipping |
| D641,013 S | 7/2011 | Richardson et al. |
| D641,014 S | 7/2011 | Smith et al. |
| D641,974 S | 7/2011 | Stampfli |
| D642,170 S | 7/2011 | Johnson et al. |
| D642,171 S | 7/2011 | Melanson et al. |
| D642,558 S | 8/2011 | Magness |
| D643,029 S | 8/2011 | Feng |
| D643,424 S | 8/2011 | Richardson et al. |
| D644,215 S | 8/2011 | Dong |
| D644,216 S | 8/2011 | Richardson et al. |
| D644,219 S | 8/2011 | Sawada |
| 7,988,010 B2 | 8/2011 | Yang et al. |
| 8,004,962 B2 | 8/2011 | Yang et al. |
| D644,635 S | 9/2011 | Richardson et al. |
| D644,639 S | 9/2011 | Weller et al. |
| D647,084 S | 10/2011 | Fathollahi |
| D647,108 S | 10/2011 | Lee |
| 8,028,794 B1 * | 10/2011 | Freeman ................ A45C 11/00 181/202 |
| 8,046,039 B2 | 10/2011 | Lee et al. |
| D648,714 S | 11/2011 | Jones, III et al. |
| D648,715 S | 11/2011 | Jones, III et al. |
| D648,716 S | 11/2011 | Jones, III et al. |

(56) References Cited

U.S. PATENT DOCUMENTS

| | | |
|---|---|---|
| D648,717 S | 11/2011 | Fahrendorff et al. |
| D649,143 S | 11/2011 | Jones, III et al. |
| D649,539 S | 11/2011 | Hong |
| D650,810 S | 12/2011 | Lemelman et al. |
| D652,827 S | 1/2012 | Fahrendorff et al. |
| D652,828 S | 1/2012 | Fahrendorff et al. |
| D653,202 S | 1/2012 | Hasbrook et al. |
| D653,659 S | 2/2012 | Fahrendorff et al. |
| D654,069 S | 2/2012 | Kwon |
| D654,483 S | 2/2012 | Richardson et al. |
| D654,931 S | 2/2012 | Lemelman et al. |
| D655,281 S | 3/2012 | Turocy |
| D655,699 S | 3/2012 | Bau |
| D656,495 S | 3/2012 | Andre et al. |
| D658,165 S | 4/2012 | Freeman |
| 8,150,485 B2 | 4/2012 | Lee |
| D658,643 S | 5/2012 | Fahrendorff et al. |
| 8,167,127 B2 | 5/2012 | Martin et al. |
| D662,923 S | 7/2012 | Piedra et al. |
| D663,263 S | 7/2012 | Gupta et al. |
| D663,319 S | 7/2012 | Chen et al. |
| D663,724 S | 7/2012 | Lee |
| D664,091 S | 7/2012 | Pliner et al. |
| 8,224,408 B2 | 7/2012 | Tomasini et al. |
| D665,386 S | 8/2012 | Fathollahi |
| D665,735 S | 8/2012 | Kang et al. |
| 8,245,842 B2 | 8/2012 | Bau |
| 8,247,102 B2 | 8/2012 | Hua |
| D667,783 S | 9/2012 | Zhang et al. |
| D670,281 S | 11/2012 | Corpuz et al. |
| D670,689 S | 11/2012 | Wang |
| D671,105 S | 11/2012 | Rothbaum et al. |
| D671,106 S | 11/2012 | Rothbaum et al. |
| D671,493 S | 11/2012 | Hasbrook et al. |
| 8,321,619 B2 | 11/2012 | Kular et al. |
| 8,328,008 B2 | 12/2012 | Diebel et al. |
| D674,394 S | 1/2013 | Kajimoto |
| 8,342,325 B2 * | 1/2013 | Rayner ............... G06F 1/1626 206/305 |
| 8,355,515 B2 | 1/2013 | Mao et al. |
| D675,603 S | 2/2013 | Melanson et al. |
| D676,032 S | 2/2013 | Stump et al. |
| D676,432 S | 2/2013 | Hasbrook et al. |
| 8,367,235 B2 | 2/2013 | Huang et al. |
| 8,380,264 B2 * | 2/2013 | Hung ................... A45C 11/00 224/580 |
| D677,249 S | 3/2013 | Li et al. |
| D678,869 S | 3/2013 | Diebel |
| 8,390,255 B1 * | 3/2013 | Fathollahi ............ H02J 7/0045 206/308.3 |
| 8,393,466 B2 | 3/2013 | Rayner |
| D679,271 S | 4/2013 | Liu |
| D679,684 S | 4/2013 | Baker et al. |
| D679,699 S | 4/2013 | Piedra et al. |
| D681,020 S | 4/2013 | Magness et al. |
| D682,196 S | 5/2013 | Leung |
| D682,815 S | 5/2013 | Chang |
| D683,338 S | 5/2013 | Wilson et al. |
| 8,439,191 B1 | 5/2013 | Lu |
| 8,452,242 B2 | 5/2013 | Spencer, II |
| D684,554 S | 6/2013 | Park |
| 8,457,701 B2 | 6/2013 | Diebel |
| D685,356 S | 7/2013 | Diebel |
| D686,152 S | 7/2013 | Lee et al. |
| D686,586 S | 7/2013 | Cho |
| D686,606 S | 7/2013 | Hong |
| 8,483,758 B2 | 7/2013 | Huang |
| D687,426 S | 8/2013 | Requa |
| D688,233 S | 8/2013 | Dong |
| 8,499,933 B2 | 8/2013 | Ziemba |
| 8,505,718 B2 | 8/2013 | Griffin, Jr. et al. |
| 8,509,864 B1 | 8/2013 | Diebel |
| 8,509,865 B1 | 8/2013 | LaColla et al. |
| D531,833 B2 | 9/2013 | Diebel et al. |
| D691,990 S | 10/2013 | Rayner |
| 8,560,014 B1 * | 10/2013 | Hu ...................... H04M 1/0283 361/679.1 |
| D693,801 S | 11/2013 | Rayner |
| 8,579,172 B2 | 11/2013 | Monaco et al. |
| D696,234 S | 12/2013 | Wright |
| D697,502 S | 1/2014 | Chu et al. |
| D698,774 S | 2/2014 | Wardy |
| D703,652 S | 4/2014 | Melanson et al. |
| D704,182 S | 5/2014 | Smith |
| D704,688 S | 5/2014 | Reivo et al. |
| D706,255 S | 6/2014 | Akana et al. |
| D706,256 S | 6/2014 | Ward et al. |
| D706,272 S | 6/2014 | Poon |
| D709,058 S | 7/2014 | Hemesath et al. |
| D709,439 S | 7/2014 | Ferber et al. |
| D709,485 S | 7/2014 | Bishop |
| D710,344 S | 8/2014 | Smith et al. |
| D710,795 S | 8/2014 | Gupta et al. |
| D710,839 S | 8/2014 | Chang |
| D711,312 S | 8/2014 | Tien |
| D711,362 S | 8/2014 | Poon |
| D711,863 S | 8/2014 | Wen |
| D714,274 S | 9/2014 | Jung |
| D714,278 S | 9/2014 | Case et al. |
| 8,837,156 B2 | 9/2014 | Sun et al. |
| D716,784 S | 11/2014 | Wen |
| D716,785 S | 11/2014 | White |
| D718,291 S | 11/2014 | Hong |
| 8,917,506 B2 | 12/2014 | Diebel et al. |
| D720,738 S | 1/2015 | Rodriguez et al. |
| D720,740 S | 1/2015 | Wicks et al. |
| D722,312 S | 2/2015 | Tages et al. |
| D723,018 S | 2/2015 | White |
| 8,955,678 B2 * | 2/2015 | Murphy ................ B23P 19/00 206/320 |
| D724,574 S | 3/2015 | Williams |
| D725,091 S | 3/2015 | Wen |
| 8,971,039 B2 | 3/2015 | Huang et al. |
| D728,468 S | 5/2015 | Ferber et al. |
| D738,365 S | 9/2015 | Melanson et al. |
| D739,394 S | 9/2015 | Rayner et al. |
| D740,797 S | 10/2015 | Daniel |
| D741,844 S | 10/2015 | Rayner et al. |
| 9,153,985 B1 | 10/2015 | Gjøvik et al. |
| D744,472 S | 12/2015 | Lerenthal |
| D744,989 S | 12/2015 | Lee |
| D744,993 S | 12/2015 | Diebel |
| D744,995 S | 12/2015 | Lerenthal |
| D746,273 S | 12/2015 | Herbst |
| D746,275 S | 12/2015 | Mohammad |
| D746,801 S | 1/2016 | Pan |
| D748,612 S | 2/2016 | Chan et al. |
| D749,557 S | 2/2016 | Feng |
| D751,058 S | 3/2016 | Cocchia et al. |
| D751,059 S | 3/2016 | Cocchia et al. |
| D751,542 S | 3/2016 | Daniel |
| 9,313,305 B1 | 4/2016 | Diebel |
| 9,319,501 B2 | 4/2016 | Huang |
| 9,576,178 B2 | 2/2017 | Pope et al. |
| 2001/0054148 A1 | 12/2001 | Hoornaert et al. |
| 2002/0065054 A1 * | 5/2002 | Humphreys ......... H04B 1/3888 455/575.1 |
| 2002/0111189 A1 | 8/2002 | Chou |
| 2002/0147035 A1 | 10/2002 | Su |
| 2002/0193136 A1 * | 12/2002 | Halkosaari ............. H04M 1/18 455/550.1 |
| 2002/0197965 A1 | 12/2002 | Peng |
| 2003/0000984 A1 | 1/2003 | Vick, III |
| 2003/0096642 A1 | 5/2003 | Bessa et al. |
| 2003/0151890 A1 | 8/2003 | Huang et al. |
| 2003/0217210 A1 | 11/2003 | Carau, Sr. |
| 2003/0218445 A1 | 11/2003 | Behar |
| 2003/0228866 A1 | 12/2003 | Pezeshki |
| 2004/0096054 A1 | 5/2004 | Nuovo |
| 2004/0097256 A1 | 5/2004 | Kujawski |
| 2004/0104268 A1 | 6/2004 | Bailey |
| 2004/0247113 A1 | 12/2004 | Akatsu |
| 2004/0268005 A1 | 12/2004 | Dickie |

(56) References Cited

U.S. PATENT DOCUMENTS

| | | |
|---|---|---|
| 2005/0049016 A1* | 3/2005 | Cho .................. H04M 1/0214 455/575.1 |
| 2005/0088141 A1 | 4/2005 | Lee et al. |
| 2005/0090301 A1 | 4/2005 | Lange et al. |
| 2005/0093510 A1 | 5/2005 | Seil et al. |
| 2005/0116684 A1 | 6/2005 | Kim |
| 2005/0130721 A1* | 6/2005 | Gartrell .............. H04M 1/0283 455/575.8 |
| 2005/0231159 A1 | 10/2005 | Jones et al. |
| 2005/0247787 A1 | 11/2005 | Von Mueller et al. |
| 2005/0248312 A1 | 11/2005 | Cao et al. |
| 2005/0286212 A1 | 12/2005 | Brignone et al. |
| 2006/0003709 A1 | 1/2006 | Wood |
| 2006/0010588 A1 | 1/2006 | Schuster et al. |
| 2006/0052064 A1 | 3/2006 | Goradesky |
| 2006/0058073 A1 | 3/2006 | Kim |
| 2006/0063569 A1 | 3/2006 | Jacobs et al. |
| 2006/0099999 A1 | 5/2006 | Park |
| 2006/0105722 A1 | 5/2006 | Kumar |
| 2006/0105824 A1 | 5/2006 | Kim et al. |
| 2006/0125445 A1 | 6/2006 | Cao et al. |
| 2006/0140461 A1 | 6/2006 | Kim |
| 2006/0197674 A1 | 9/2006 | Nakajima |
| 2006/0205447 A1 | 9/2006 | Park et al. |
| 2006/0255493 A1 | 11/2006 | Fouladpour |
| 2007/0004450 A1 | 1/2007 | Parikh |
| 2007/0019804 A1 | 1/2007 | Kramer |
| 2007/0093140 A1 | 4/2007 | Begic et al. |
| 2007/0123316 A1 | 5/2007 | Little |
| 2007/0142097 A1 | 6/2007 | Hamasaki et al. |
| 2007/0152633 A1 | 7/2007 | Lee |
| 2007/0161404 A1 | 7/2007 | Yasujima et al. |
| 2007/0167190 A1 | 7/2007 | Moosavi et al. |
| 2007/0187563 A1 | 8/2007 | Ogatsu |
| 2007/0223182 A1 | 9/2007 | Swan et al. |
| 2007/0225031 A1 | 9/2007 | Bodkin et al. |
| 2007/0236180 A1 | 10/2007 | Rodgers |
| 2007/0261978 A1 | 11/2007 | Sanderson |
| 2007/0297149 A1* | 12/2007 | Richardson ............ G06F 1/1626 361/731 |
| 2008/0007214 A1 | 1/2008 | Cheng |
| 2008/0026794 A1 | 1/2008 | Warren |
| 2008/0026803 A1 | 1/2008 | Demuynck |
| 2008/0032758 A1 | 2/2008 | Rostami |
| 2008/0053770 A1 | 3/2008 | Tynyk |
| 2008/0058010 A1* | 3/2008 | Lee .................... H04M 1/0264 455/556.1 |
| 2008/0096620 A1 | 4/2008 | Lee et al. |
| 2008/0108395 A1 | 5/2008 | Lee et al. |
| 2008/0119244 A1 | 5/2008 | Malhotra |
| 2008/0123287 A1 | 5/2008 | Rossell et al. |
| 2008/0132289 A1* | 6/2008 | Wood .................. H04B 1/3888 455/566 |
| 2008/0139258 A1* | 6/2008 | Park .................... H01R 13/447 455/575.1 |
| 2008/0150367 A1 | 6/2008 | Oh et al. |
| 2008/0238356 A1 | 10/2008 | Batson et al. |
| 2009/0009945 A1* | 1/2009 | Johnson ................ G06F 1/1613 361/679.27 |
| 2009/0017883 A1 | 1/2009 | Lin |
| 2009/0051319 A1 | 2/2009 | Fang et al. |
| 2009/0069050 A1 | 3/2009 | Jain et al. |
| 2009/0073650 A1 | 3/2009 | Huang et al. |
| 2009/0096417 A1 | 4/2009 | Idzik et al. |
| 2009/0108800 A1 | 4/2009 | Woud |
| 2009/0111543 A1 | 4/2009 | Tai et al. |
| 2009/0114556 A1 | 5/2009 | Tai et al. |
| 2009/0117955 A1 | 5/2009 | Lo |
| 2009/0128092 A1 | 5/2009 | Woud |
| 2009/0143104 A1 | 6/2009 | Loh et al. |
| 2009/0144456 A1 | 6/2009 | Gelf et al. |
| 2009/0146898 A1 | 6/2009 | Akiho et al. |
| 2009/0152089 A1 | 6/2009 | Hanes |
| 2009/0160399 A1 | 6/2009 | Woud |
| 2009/0160400 A1 | 6/2009 | Woud |
| 2009/0181729 A1 | 7/2009 | Griffin, Jr. et al. |
| 2009/0205983 A1 | 8/2009 | Estlander |
| 2009/0247244 A1 | 10/2009 | Mittleman et al. |
| 2009/0284216 A1 | 11/2009 | Bessa et al. |
| 2009/0301289 A1 | 12/2009 | Gynes |
| 2009/0312058 A9 | 12/2009 | Wood et al. |
| 2009/0314400 A1* | 12/2009 | Liu ...................... A45C 11/00 150/165 |
| 2009/0325657 A1 | 12/2009 | Ramsdell et al. |
| 2010/0001684 A1 | 1/2010 | Eastlack |
| 2010/0005225 A1 | 1/2010 | Honda et al. |
| 2010/0013431 A1 | 1/2010 | Liu |
| 2010/0022277 A1 | 1/2010 | An et al. |
| 2010/0026589 A1 | 2/2010 | Dou et al. |
| 2010/0048267 A1 | 2/2010 | Lin |
| 2010/0056054 A1 | 3/2010 | Yamato et al. |
| 2010/0064883 A1 | 3/2010 | Gynes |
| 2010/0066311 A1 | 3/2010 | Bao et al. |
| 2010/0078343 A1 | 4/2010 | Hoellwarth et al. |
| 2010/0088439 A1 | 4/2010 | Ang et al. |
| 2010/0093412 A1 | 4/2010 | Serra et al. |
| 2010/0096284 A1 | 4/2010 | Bau |
| 2010/0113106 A1 | 5/2010 | Supran |
| 2010/0132724 A1 | 6/2010 | Seidel et al. |
| 2010/0154062 A1 | 6/2010 | Baram et al. |
| 2010/0195279 A1 | 8/2010 | Michael |
| 2010/0200456 A1* | 8/2010 | Parkinson ............. B29C 33/485 206/701 |
| 2010/0203931 A1 | 8/2010 | Hynecek et al. |
| 2010/0224519 A1 | 9/2010 | Kao |
| 2010/0243516 A1 | 9/2010 | Martin et al. |
| 2010/0302716 A1 | 12/2010 | Gandhi |
| 2010/0315041 A1 | 12/2010 | Tan |
| 2010/0328203 A1 | 12/2010 | Hsu |
| 2011/0021255 A1* | 1/2011 | Kim ...................... H01Q 1/38 455/575.1 |
| 2011/0034221 A1* | 2/2011 | Hung .................... A45C 11/00 455/575.8 |
| 2011/0049005 A1 | 3/2011 | Wilson et al. |
| 2011/0050164 A1 | 3/2011 | Partovi et al. |
| 2011/0055447 A1 | 3/2011 | Costa |
| 2011/0084081 A1 | 4/2011 | Chung et al. |
| 2011/0090626 A1 | 4/2011 | Hoellwarth et al. |
| 2011/0117974 A1 | 5/2011 | Spitalnik et al. |
| 2011/0136555 A1 | 6/2011 | Ramies et al. |
| 2011/0159324 A1 | 6/2011 | Huang et al. |
| 2011/0199041 A1 | 8/2011 | Yang |
| 2011/0244930 A1* | 10/2011 | Kong ................ G02F 1/133308 455/575.1 |
| 2011/0253569 A1 | 10/2011 | Lord |
| 2011/0259664 A1 | 10/2011 | Freeman |
| 2011/0261511 A1 | 10/2011 | Alderson et al. |
| 2011/0287726 A1 | 11/2011 | Huang |
| 2011/0297578 A1 | 12/2011 | Stiehl et al. |
| 2011/0309728 A1 | 12/2011 | Diebel |
| 2012/0013295 A1 | 1/2012 | Yeh |
| 2012/0071214 A1 | 3/2012 | Ash, Jr. et al. |
| 2012/0088555 A1 | 4/2012 | Hu |
| 2012/0088558 A1* | 4/2012 | Song ...................... H04M 1/18 455/575.1 |
| 2012/0106037 A1 | 5/2012 | Diebel et al. |
| 2012/0115551 A1* | 5/2012 | Cho ...................... H04M 1/23 455/566 |
| 2012/0119695 A1 | 5/2012 | Pin |
| 2012/0122520 A1 | 5/2012 | Phillips |
| 2012/0161696 A1 | 6/2012 | Cook et al. |
| 2012/0177967 A1 | 7/2012 | Wang |
| 2012/0209745 A1 | 8/2012 | Spencer, II |
| 2012/0282977 A1 | 11/2012 | Haleluk |
| 2012/0286741 A1 | 11/2012 | Seethaler et al. |
| 2012/0302294 A1 | 11/2012 | Hammond et al. |
| 2012/0303520 A1* | 11/2012 | Huang .................. H01M 10/46 705/39 |
| 2012/0305422 A1* | 12/2012 | Vandiver .............. H04M 1/185 206/320 |
| 2012/0320501 A1* | 12/2012 | Ackloo ................ G06F 1/1628 361/679.01 |

(56) References Cited

U.S. PATENT DOCUMENTS

| | | |
|---|---|---|
| 2012/0325637 A1 | 12/2012 | Kikuchi |
| 2013/0023313 A1 | 1/2013 | Kim |
| 2013/0045775 A1* | 2/2013 | Heywood ............ H04M 1/185 455/557 |
| 2013/0052871 A1 | 2/2013 | Eklind |
| 2013/0082662 A1 | 4/2013 | Carre et al. |
| 2013/0084799 A1 | 4/2013 | Marholev et al. |
| 2013/0088815 A1 | 4/2013 | Hu et al. |
| 2013/0098790 A1 | 4/2013 | Hong |
| 2013/0125251 A1 | 5/2013 | Johnson |
| 2013/0146491 A1* | 6/2013 | Ghali .................... G06F 1/1626 206/320 |
| 2013/0189923 A1 | 7/2013 | Lewin |
| 2013/0210475 A1 | 8/2013 | Nylund |
| 2013/0248339 A1 | 9/2013 | Koepsell |
| 2013/0273983 A1* | 10/2013 | Hsu ..................... H05K 5/0086 455/575.1 |
| 2013/0305528 A1 | 11/2013 | Anderson |
| 2013/0307818 A1 | 11/2013 | Pope et al. |
| 2013/0314030 A1 | 11/2013 | Fathollahi |
| 2013/0314880 A1* | 11/2013 | Sun ...................... H02J 7/0044 361/730 |
| 2013/0318282 A1 | 11/2013 | Wakutsu et al. |
| 2014/0035511 A1 | 2/2014 | Ferber et al. |
| 2014/0065948 A1 | 3/2014 | Huang |
| 2014/0069825 A1 | 3/2014 | Macrina et al. |
| 2014/0132205 A1 | 5/2014 | Paczkowski et al. |
| 2014/0141838 A1 | 5/2014 | Cai et al. |
| 2014/0152257 A1 | 6/2014 | Miller et al. |
| 2014/0165379 A1 | 6/2014 | Diebel et al. |
| 2014/0191033 A1 | 7/2014 | Wojcik et al. |
| 2014/0239916 A1 | 8/2014 | To et al. |
| 2014/0375182 A1 | 12/2014 | Li et al. |
| 2014/0375186 A1 | 12/2014 | Tarnow et al. |
| 2015/0028797 A1 | 1/2015 | Miller et al. |
| 2015/0141090 A1 | 5/2015 | Hwan et al. |
| 2015/0148093 A1 | 5/2015 | Huang et al. |
| 2015/0189053 A1 | 7/2015 | LaHam |
| 2015/0194648 A1 | 7/2015 | Fathollahi et al. |
| 2015/0194833 A1 | 7/2015 | Fathollahi et al. |
| 2015/0214993 A1 | 7/2015 | Huang |
| 2015/0215439 A1 | 7/2015 | Stanimirovic et al. |
| 2015/0256008 A1 | 9/2015 | Miller et al. |
| 2015/0281410 A1 | 10/2015 | Takahashi |
| 2015/0289615 A1 | 10/2015 | Welsch |
| 2015/0295439 A1 | 10/2015 | Huang et al. |
| 2015/0303722 A1 | 10/2015 | Li |
| 2015/0364875 A1 | 12/2015 | Ginsberg |
| 2015/0381226 A1 | 12/2015 | Mogol |
| 2016/0004896 A1 | 1/2016 | Pope et al. |
| 2016/0064962 A1 | 3/2016 | Huang et al. |
| 2016/0064963 A1 | 3/2016 | Huang et al. |
| 2016/0064979 A1 | 3/2016 | Huang et al. |
| 2016/0112085 A1 | 4/2016 | Johnson |
| 2016/0267313 A1 | 9/2016 | Pope et al. |

FOREIGN PATENT DOCUMENTS

| | | |
|---|---|---|
| CN | 202535667 U | 11/2012 |
| CN | 302510329 S | 7/2013 |
| CN | 302573150 S | 9/2013 |
| DE | 10 2007 021 9 | 11/2008 |
| EP | 1732291 A1 | 12/2006 |
| JP | 62-014133 | 1/1987 |
| JP | 8-18637 | 1/1996 |
| JP | 2000-175720 | 6/2000 |
| KR | 10-2005-0027961 | 3/2005 |
| KR | 10-2008-0017688 | 2/2008 |
| KR | 20-2010-0005030 | 5/2010 |
| KR | 10-2010-0132724 | 12/2010 |
| KR | 10-2011-0005507 | 1/2011 |
| KR | 10-2011-0062089 | 6/2011 |
| KR | 30-0650361 | 7/2012 |
| TW | D150044 | 11/2012 |
| TW | D156538 | 10/2013 |
| WO | WO 95/15619 | 6/1995 |
| WO | WO 97/33497 | 9/1997 |
| WO | WO 03/065227 A1 | 8/2003 |
| WO | WO 2008/151362 A2 | 12/2008 |

OTHER PUBLICATIONS

U.S. Appl. No. 14/494,348 including its prosecution history, filed Sep. 23, 2014, Huang et al.
U.S. Appl. No. 14/517,492 including its prosecution history, filed Oct. 17, 2014, Huang et al.
U.S. Appl. No. 14/517,428 including its prosecution history, filed Oct. 17, 2014, Huang et al.
U.S. Appl. No. 14/569,229 including its prosecution history, filed Dec. 12, 2014, Huang et al.
U.S. Appl. No. 14/547,060 including its prosecution history, filed Nov. 18, 2014, Huang.
U.S. Appl. No. 14/187,046 Including its prosecution history, filed Feb. 21, 2014, To et al.
U.S. Appl. No. 14/205,024 Including its prosecution history, filed Mar. 11, 2014, Huang et al.
U.S. Appl. No. 29/427,724 Including its prosecution history, filed Jul. 20, 2012, Brand et al.
U.S. Appl. No. 29/382,515 Including its prosecution history, filed Jan. 4, 2011, Gallouzi et al.
U.S. Appl. No. 29/423,032 Including its prosecution history, filed May 25, 2012, Hasbrook et al.
U.S. Appl. No. 29/406,346 Including its prosecution history, filed Nov. 11, 2011, Brand.
U.S. Appl. No. 29/423,026 Including its prosecution history, filed May 25, 2012, Hasbrook et al.
U.S. Appl. No. 29/433,665 Including its prosecution history, filed Oct. 3, 2012, Namminga et al.
U.S. Appl. No. 29/464,620 Including its prosecution history, filed Aug. 19, 2013, Tsai.
U.S. Appl. No. 29/438,697 Including its prosecution history, filed Nov. 30, 2012, Namminga et al.
U.S. Appl. No. 29/451,703 Including its prosecution history, filed Apr. 6, 2013, Tsai et al.
U.S. Appl. No. 29/435,908 Including its prosecution history, filed Oct. 30, 2012, To et al.
U.S. Appl. No. 29/435,907 Including its prosecution history, filed Oct. 30, 2012, To et al.
U.S. Appl. No. 29/438,877 Including its prosecution history, filed Dec. 4, 2012, To et al.
U.S. Appl. No. 29/440,062 Including its prosecution history, filed Dec. 18, 2012, To et al.
U.S. Appl. No. 29/478,391 Including its prosecution history, filed Jan. 3, 2014, Namminga et al.
U.S. Appl. No. 29/478,390 Including its prosecution history, filed Jan. 3, 2014, Dang et al.
U.S. Appl. No. 29/478,383 Including its prosecution history, filed Jan. 3, 2014, Dang et al.
U.S. Appl. No. 29/478,388 Including its prosecution history, filed Jan. 3, 2014, Kim et al.
U.S. Appl. No. 29/499,868 Including its prosecution history, filed Aug. 19, 2014, Mophie, Inc.
International Search Report and Written Opinion of the International Searching Authority for PCT/US2011/037244, dated Jul. 19, 2011.
International Preliminary Report on Patentability for PCT/US2011/037244, dated Nov. 29, 2012.
International Search Report and Written Opinion of the International Searching Authority for PCT/US2011/037249, dated Jul. 13, 2011.
International Preliminary Report on Patentability for PCT/US2011/037249, dated Nov. 29, 2012.
International Search Report and Written Opinion of the International Searching Authority for PCT/US2011/037254, dated Jul. 13, 2011.

(56) References Cited

OTHER PUBLICATIONS

International Preliminary Report on Patentability for PCT/US2011/037254, dated Nov. 29, 2012.
International Search Report and Written Opinion of the International Searching Authority for PCT/US2011/037257, dated Sep. 22, 2011.
International Preliminary Report on Patentability for PCT/US2011/037257, dated Nov. 29, 2012.
International Search Report and Written Opinion of the International Searching Authority for PCT/US2012/041768, dated Feb. 27, 2013.
International Preliminary Report on Patentability for PCT/US2012/041768, dated Dec. 27, 2013.
International Search Report and Written Opinion of the International Searching Authority for PCT/US2013/057276, dated Dec. 10, 2013.
International Search Report and Written Opinion of the International Searching Authority for PCT/US2014/017781, dated Jun. 8, 2014.
International Search Report and Written Opinion of the International Searching Authority for PCT/US2014/023592, dated Aug. 28, 2014.
Mophie Pulse for iPod Touch 4G, http://www.mophie.com/pulse-iPod-Touch-4th-Gen-vibrating-gaming-case-p/2015_PUL-T4-GRY.htm.
"Sandberg BatteryCase for iPhone 4/4S delivers more band for your buck," dated Mar. 15, 2012, http://www.gizmag.com/sanberg-batterycase-iphone/21839.
Shawn Brown, "Incase Power Slider battery doubles as a case," dated Nov. 19, 2008, http://www.iphonebuzz.com/incase-power-slider-battery-doubles-as-a-case-195224.php.
Nick Guy, "Incipio offGRID Battery Case for iPhone 5/5s," dated Oct. 9, 2013, http://www.ilounge.com/index.php/reviews/entry/incipio-offgrid-battery-case-for-iphone-5-5s/.
Jeremy Horwitz, "Mophie Juice Pack Plus for iPhone 5," dated May 21, 2013, http://www.ilounge.com/index.php/reviews/entry/mophie-juice-pack-plus-for-iphone-5/.
Nick Guy, "RND Power Solutions Sync & Charge Dock with Lightning Connector," dated Nov. 18, 2013, http://www.ilounge.com/index.php/reviews/entry/tylt-energi-sl.
Jeremy Horwitz, "Kensington Mini Battery Pack and Charger for iPhone and iPod," dated May 16, 2008, http://www.ilounge.com/index.php/reviews/entry/kensington-mini-battery-pack-and-charger-for-iphone-and-ipod/.
Kensington Mini Battery Pack and Charger for iPhone and iPod, dated Sep. 30, 2008, 1 Page.
Sven Rafferty, "Mybat External Battery for iPhone and iPod," dated May 18, 2008, http://svenontech.com/reviews/?p=74.
Dave Rees, "Richard Solo Backup Battery for iPhone / iPod Review," dated Jun. 16, 2008, http://the-gadgeteer.com/2008/06/16/richard_solo_backup_battery_for_iphone_ipod/.
Devin Coldewey, "Combination iPhone battery pack and flash from FastMac," dated Nov. 4, 2008, http://crunchgear.com/2008/11/04/combination-iphone-battery-pack-and-flash-from-fastmac/.
"Cheap DIY iPhone External Battery," dated Jul. 22, 2008, http://fastdad.wordpress.com/2008/07/22/cheap-diy-iphone-external-battery/.
Jeremy Horwitz, "iLuv i603 / i604 Rechargeable Lithium Polymer Batteries with Silicone Skin," dated Jun. 27, 2006, http://www.ilounge.com/index.php/reviews/entry/iluv-i603-rechargeable-lithium-polymer-battery-with-silicone-skin/.
Julie Strietelmeier, "Seidio INNODock Desktop Cradle for Treo 650," dated Jul. 28, 2005, http://the-gadgeteer.com/2005/07/28/seidio_innodock_desktop_cradle_for_treo_650/.
Brian Nyhuis, "Mophie Juice Pack Battery Case for Samsung Galaxy S III Review," dated Nov. 28, 2012, http://www.legitreviews.com/mophie-juice-pack-battery-case-for-samsung-galaxy-s-iii-review_2084.

"PowerSkin Samsung Galaxy S3 Case with Backup Battery," dated Aug. 19, 2012, http://gadgetsin.com/powerskin-samsung-galaxy-s3-case-with-backup-battery.htm.
"iPhone 4 Case with Battery Pack," dated Sep. 28, 2010, http://gadgetsin.com/iphone-4-case-with-battery-pack.htm.
Jonathan Pena, "iPhone 5 Cases, Round 3," dated Sep. 16, 2012, http://www.technologytell.com/apple/103833/iphone-5-cases-round-3/.
Jeremy Horwitz, "Mophie Juice Pack for iPhone," dated Dec. 7, 2007, http://www.ilounge.com/index.php/reviews/entry/mophie-juice-pack-for-iphone/.
Dr. Macenstein, "Review: Mophie Juice Pack for iPhone," dated Apr. 27, 2008, http://macenstein.com/default/archives/1314.
Wayne Schulz, "iPhone Extended Battery Review—Mophie Juice Pack," dated Jun. 17, 2008, http://www.geardiary.com/2008/06/17/iphone-extended-battery-review-mophie-juice-pack/.
Mophie Juice Pack iPhone 1G Product—Figures 1-7—Retrieved from http://www.mophie.com/products/juice-pack on Apr. 10, 2009.
Mophie Juice Pack iPhone 1G Product—Figure 8—Retrieved from http://www.mophie.com/pages/information/ on Apr. 10, 2009.
Mophie Juice Pack iPhone 1G Product—Figures 9-14—Retrieved from http://www.mophie.com/blogs/Juice_Pack_FAQ on Apr. 10, 2009.
Mophie Juice Pack iPhone 1G Product—Figures 15-16—Retrieved from http://mophie.com/blogs/Juice_Pack_FAQ on Apr. 20, 2009. Figure 16 is dated May 1, 2008.
Tomas Ratas, "Mophie Juice Pack—iPhone 3G," dated Dec. 9, 2008, http://www.testfreaks.com/blog/review/mophie-juice-pack-iphone-3g/.
Dr. Macenstein, "Review: Mophie Juice Pack 3G for iPhone," dated Nov. 27, 2008, http://macenstein.com/default/archives/1820.
Ewdison Then, "Mophie Juice Pack iPhone 3G Review," dated Nov. 12, 2008, http://www.slashgear.com/mophie-juice-pack-iphone-3g-review-1222446/.
Mophie Juice Pack iPhone 3G Product—Figures 1-8—Retrieved from http://www.mophie.com/products/juice-pack-iphone-3g on Apr. 10, 2009.
Mophie Juice Pack iPhone 3G Product—Figures 9-10—Retrieved from http://www.mophie.com/pages/iphone-3g-details on Apr. 10, 2009.
Mophie Juice Pack iPhone 3G Product—Figures 11-14—Retrieved from http://mophie.com/blogs/Juice_Pack_3G_FAQ on Apr. 10, 2009.
Mophie Juice Pack iPhone 3G Product—Figures 15-16—Retrieved from http://mophie.com/blogs/press on Apr. 20, 2009. Figure 15 is dated Aug. 4, 2008, and Figure 16 is dated Nov. 10, 2008.
Mophie Juice Pack iPhone 3G User Manual—Retrieved from http://static3.shopify.com/s/files/1/0008/4942/assets/mophie_juice_pack_3G_manual_rl.pdf on Apr. 10, 2009.
Panasonic Lithium Ion Batteries Technical Handbook, dated 2007.
Chris Foresman, "Several Backup Batteries Can Extend Your Daily iPhone 3G Use," dated Jul. 18, 2008, http://arstechnica.com/apple/2008/07/several-backup-batteries-can-extend-your-daily-iphone-3g-use/.
Using Your Treo 650 Smartphone by palmOne, dated 2005.
Lisa Gade, "Palm Treo 750," dated Jan. 17, 2007, http://www.mobiletechreview.com/phones/Treo-750.htm.
Incase Power Slider 3G for iPhone 3G Product Reference, alleged by Incase to be available on Nov. 28, 2008.
iPhone User's Guide, 2007.
"Power Slider," Web Archive Date Dec. 4, 2008, https://web.archive.org/web/20081204105303/http://goincase.com/products/detail/power-slider-ec20003/?
Azadeh Ensha, "A Case for Filling the iPhone 3G's Power Vacuum," Dated Nov. 27, 2008.
Joseph Flatley, "Incase Power Slider for iPhone 3G Doubles the Juice, Lets You Sync," dated Nov. 17, 2008.
Darren Quick, "Mophie Juice Pack for iPhone 3G now shipping," dated Nov. 10, 2008, http://www.gizmag.com/mophie-juice-pack-iphone-3g/10342/.
Otterbox Catalog, 2006.

(56) References Cited

OTHER PUBLICATIONS

Jeremy Horowitz, "PhoneSuit MiLi Power Pack for iPhone," Jan. 29, 2009, http://www.ilounge.com/index.php/reviews/entry/phonesuit-mili-power-pack-for-iphone/.
Jeremy Horowitz, "FastMac TruePower iV Universal Battery Charger," Dec. 11, 2008, http://www.ilounge.com/index.php/reviews/entry/fastmac-truepower-iv-universal-battery-charger/.
Jeremy Horowitz, "Konnet PowerKZ Extended Power for iPhone," Apr. 2, 2009, http://www.ilounge.com/index.php/reviews/entry/konnet-powerkz-extended-power-for-iphone/.
"Test: Batterie iPhone SKPAD" with Machine English Translation, Feb. 2, 2009, http://iphonesofa.com/2009/02/02/test-batterie-iphone-skpad.
Kanamori et al., "USB battery-charger designs meet new industry standards," EDN pp. 63-70, dated Feburary 21, 2008.
AVR458: Charging Lithium-Ion Batteries with ATAVRBC100, which appear to include a date of Aug. 8.
Battery Charging Specification, dated Apr. 15, 2009.
BCM2033 Product Brief, 2 pages, dated Nov. 1, 2002.
"USB battery charger detector intelligently powers mobiles," Dec. 17, 2007, http://www.eetasia.com/ART_8800493819_765245_NP_10b171b6.HTMce#.
Webpage Archive, Mophie.com, Nov. 25, 2007.
Ben Kaufman, "Behind the Invention: The mophie Juice Pack," dated Dec. 31, 2013, https://medium.com/@benkaufman/behind-the-invention-the-mophie-juice-pack-a0620f74efcf.
Mophie Relo Recharge, dated Feb. 7, 2006, http://songsling.com/recharge.html.
*Case-Ari, LLC* v. *mStation, Inc.*, Case No. 1:2010-CV-01874 in the United States District Court for the Northern District of Georgia, filed Jun. 17, 2010 (Docket).
*Daniel Huang* v. *GC Technology, LLC*, Case No. CV10-4705 CAS (VBKx) in the United States District Court for the Central District of California, filed Jun. 24, 2010 (Docket).
*Hali-Power, Inc.* v. *mStation Corp.*, Case No. 1:2010-CV-00773 in the United States District Court for the Northern District of New York, filed Jun. 30, 2010 (Docket).
*Mophie, Inc.* v. *Loza & Loza, LLP*, Case No. SACV11-00539 DOC (MLGx) in the United States District Court for the Central District of California, filed Apr. 7, 2011 (Docket).
Mophie's Complaint, filed Apr. 7, 2011 in *Mophie, Inc.* v. *Loza & Loza, LLP*, Case No. SACV11-00539 DOC (MLGx) in the United States District Court for the Central District of California.
*Mophie, Inc.* v. *Foreign Trade Corporation*, Case No. 8:12-CV-00292-JST-RNB in the United States District Court for the Central District of California, filed Feb. 24, 2012 (Docket).
*Mophie, Inc.* v. *Kdlinks Inc.*, Case No. 2:2012-CV-02639 in the United States District Court for the Central District of California, filed Mar. 27, 2012 (Docket).
*Otter Products, LLC* v. *Mophie, LLC*, Case No. 1:2012-CV-01969 in the United States District Court for the District of Colorado, filed Jul. 27, 2012 (Docket).
Mophie's Answer, filed Oct. 15, 2012 in *Otter Products, LLC* v. *Mophie, LLC*, Case No. 1:2012-CV-01969 in the United States District Court for the District of Colorado.
Otter's Motion for Summary Judgment of Infringement and Declaration in Support Thereof, filed May 13, 2013 in *Otter Products, LLC* v. *Mophie, LLC*, Case No. 1:2012-CV-01969 in the United States District Court for the District of Colorado.
Mophie's Opposition to Motion for Summary Judgment of Infringement, filed Jun. 6, 2013 in *Otter Products, LLC* v. *Mophie, LLC*, Case No. 1:2012-CV-01969 in the United States District Court for the District of Colorado.
Mophie's Claim Construction Brief, filed Jun. 14, 2013 in *Otter Products, LLC* v. *Mophie, LLC*, Case No. 1:2012-CV-01969 in the United States District Court for the District of Colorado.
Otter's Claim Construction Brief, filed Jun. 14, 2013 in *Otter Products, LLC* v. *Mophie, LLC*, Case No. 1:2012-CV-01969 in the United States District Court for the District of Colorado.
Mophie's Brief in Response to Otter's Claim Construction Brief, filed Jun. 24, 2013 in *Otter Products, LLC* v. *Mophie, LLC*, Case No. 1:2012-CV-01969 in the United States District Court for the District of Colorado.
Otter's Rebuttal Brief for Construction of Claim Terms and Declaration, filed Jun. 24, 2013 in *Otter Products, LLC* v. *Mophie, LLC*, Case No. 1:2012-CV-01969 in the United States District Court for the District of Colorado.
Otter's Reply in Support of Motion for Summary Judgment of Infringement, filed Jun. 24, 2013 in *Otter Products, LLC* v. *Mophie, LLC*, Case No. 1:2012-CV-01969 in the United States District Court for the District of Colorado.
Joint Claim Construction Statement, filed Jun. 26, 2013 in *Otter Products, LLC* v. *Mophie, LLC*, Case No. 1:2012-CV-01969 in the United States District Court for the District of Colorado.
*Incase Designs, Inc.* v. *Mophie, Inc.*, Case No. 3:2013-CV-00602 in the United States District Court for the Northern District of California, filed Feb. 12, 2013 (Docket).
Mophie's Amended Answer and Counterclaims, filed May 8, 2013 in *Incase Designs, Inc.* v. *Mophie, Inc.*, Case No. 3:2013-CV-00602 in the United States District Court for the Northern District of California.
Mophie's Opposition to Motion to Strike Amended Affirmative Defenses, Filed Jun. 12, 2013 in *Incase Designs, Inc.* v. *Mophie, Inc.*, Case No. 3:2013-CV-00602 in the United States District Court for the Northern District of California.
Mophie's Reply in Support of Motion to Stay and Supporting Declaration, filed Sep. 3, 2103 in *Incase Designs, Inc.* v. *Mophie, Inc.*, Case No. 3:2013-CV-00602 in the United States District Court for the Northern District of California.
*Incase Designs, Inc.* v. *Mophie, Inc.*, Case No. 3:2013-CV-03356 in the United States District Court for the Northern District of California, filed Jul. 18, 2013 (Docket).
*Incase Designs, Inc.* v. *Mophie, Inc.*, Case No. 3:2013-CV-04314 in the United States District Court for the Northern District of California, filed Sep. 18, 2013 (Docket).
Mophie Motion 1—To Be Accorded Benefit, filed Nov. 20, 2013 in Patent Interference No. 105,946(RES).
Declaration of John Feland, Ph.D, In Support of Mophie Motion 1 to Be Accorded Benefit, dated Nov. 20, 2013, in Patent Interference No. 105,946(RES).
Mophie Motion 2—For Judgment that Incase's Involved Claims Are Unpatentable, filed Nov. 20, 2013 in Patent Interference No. 105,946(RES).
Declaration of John Feland, Ph.D, In Support of Mophie Motion 2 for Judgement That Incase's Involved Claims Are Unpatentable, dated Nov. 20, 2013, in Patent Interference No. 105,946(RES).
Incase Motion 1—Motion for Benefit, filed Nov. 20, 2013 in Patent Interference No. 105,946(RES).
Incase Motion 2—Motion to Undesignate Claims, filed Nov. 20, 2013 in Patent Interference No. 105,946(RES).
Incase Motion 3—Motion for Judgment Based on Lack of Written Description, filed Nov. 20, 2013 in Patent Interference No. 105,946(RES).
Incase Motion 4—Motion for Unpatentability of Mophie Claims, filed Nov. 20, 2013 in Patent Interference No. 105,946(RES).
Declaration of Andrew Wolfe, filed Nov. 20, 2013 in Patent Interference No. 105,946(RES).
Declaration of Thomas Overthun, filed Nov. 20, 2013 in Patent Interference No. 105,946(RES).
Declaration of Gabriel Dan, filed Nov. 20, 2013 in Patent Interference No. 105,946(RES).
Mophie's Third Amended Complaint, filed Jun. 27, 2014, in *Mophie, Inc.* v. *Source Vista*, Case No. 8:13-CV-01321 in the United States District Court for the Central District of California.
LivingSocial's Answer to Mophie's Fifth Amended Complaint and Counterclaims, filed Sep. 24, 2014, in *Mophie, Inc.* v. *Source Vista*, Case No. 8:13-CV-01321 in the United States District Court for the Central District of California.
Shah's Answer, Affirmative Defenses, and Counterclaims to Plaintiff's Fifth Amended Complaint, filed Sep. 24, 2014, in *Mophie, Inc.* v. *Source Vista*, Case No. 8:13-CV-01321 in the United States District Court for the Central District of California.

(56) References Cited

OTHER PUBLICATIONS

Expert Report of Dr. David Munson, dated Aug. 28, 2014, in *Mophie, Inc.* v. *Source Vista*, Case No. 8:13-CV-01321 in the United States District Court for the Central District of California.
Expert Report of John Feland, Ph.D, dated Aug. 28, 2014, in *Mophie, Inc.* v. *Source Vista*, Case No. 8:13-CV-01321 in the United States District Court for the Central District of California.
Rebutal Expert Report of John Feland, Ph.D, dated Sep. 25, 2014, in *Mophie, Inc.* v. *Source Vista*, Case No. 8:13-CV-01321 in the United States District Court for the Central District of California.
Rebutal Expert Report of Dr. David Munson, dated Sep. 25, 2014, in *Mophie, Inc.* v. *Source Vista*, Case No. 8:13-CV-01321 in the United States District Court for the Central District of California.
Mophie's Second Amended Response to LivingSocial's Interrogatory No. 1[21], dated Aug. 28, 2014, in *Mophie, Inc.* v. *Source Vista*, Case No. 8:13-CV-01321 in the United States District Court for the Central District of California.
Mophie's Second Amended Response to Serve Global's Interrogatory No. 2, dated Aug. 28, 2014, in *Mophie, Inc.* v. *Source Vista*, Case No. 8:13-CV-01321 in the United States District Court for the Central District of California.
Defendant's Memorandum in Support of Motion for Partial Summary Judgement, dated Sep. 23, 2014, in *Mophie, Inc.* v. *Source Vista*, Case No. 8:13-CV-01321 in the United States District Court for the Central District of California.
Declaration of David Munson in Support of Defendant's Motion for Partial Summary Judgment, dated Sep. 22, 2014, in *Mophie, Inc.* v. *Source Vista*, Case No. 8:13-CV-01321 in the United States District Court for the Central District of California.
John Feland, Ph.D. Deposition Transcript, dated Sep. 30, 2014, in *Mophie, Inc.* v. *Source Vista*, Case No. 8:13-CV-01321 in the United States District Court for the Central District of California.
Matthew Brand Deposition Transcript, dated Jul. 23, 2014, in *Mophie, Inc.* v. *Source Vista*, Case No. 8:13-CV-01321 in the United States District Court for the Central District of California.
Dharmesh Shah Deposition Transcript, dated Jul. 11, 2014, in *Mophie, Inc.* v. *Source Vista*, Case No. 8:13-CV-01321 in the United States District Court for the Central District of California.
Defendants' Statement of Uncontroverted Material Fact and Contentions of Law, filed Sep. 22, 2014 in *Mophie, Inc.* v. *Source Vista*, Case No. 8:13-CV-01321 in the United States District Court for the Central District of California.
Memorandum of Points and Authorities in Support of Mophie's Motion for Summary Judgment, filed Sep. 22, 2014, in *Mophie, Inc.* v. *Source Vista*, Case No. 8:13-CV-01321 in the United States District Court for the Central District of California.
Statement of Uncontroverted Facts and Conclusions of Law in Support of Mophie's Motion for Summary Judgment, filed Sep. 22, 2014, in *Mophie, Inc.* v. *Source Vista*, Case No. 8:13-CV-01321 in the United States District Court for the Central District of California.
Mophie's Opposition to Shah and Serve Global's Motion for Partial Summary Judgment, dated Oct. 3, 2014, in *Mophie, Inc.* v. *Source Vista*, Case No. 8:13-CV-01321 in the United States District Court for the Central District of California.
Statement of Genuine Disputes of Material Fact in Opposition to Shah and Serve Global's Motion for Partial Summary Judgment, filed Oct. 3, 2014, in *Mophie, Inc.* v. *Source Vista*, Case No. 8:13-CV-01321 in the United States District Court for the Central District of California.
Opposition of LivingSocial to Mophie's Motion for Summary Judgment, dated Oct. 3, 2014, in *Mophie, Inc.* v. *Source Vista*, Case No. 8:13-CV-01321 in the United States District Court for the Central District of California.
Defendants' Opposition to Plaintiff's Motion for Summary Judgment, filed Oct. 3, 2014, in *Mophie, Inc.* v. *Source Vista*, Case No. 8:13-CV-01321 in the United States District Court for the Central District of California.
Defendants' Response to Plaintiffs Statement of Uncontroverted Material Fact and Contentions of Law, filed Oct. 3, 2014, in *Mophie,*

*Inc.* v. *Source Vista*, Case No. 8:13-CV-01321 in the United States District Court for the Central District of California.
David Munson Deposition Transcript, dated Sep. 29, 2014, in *Mophie, Inc.* v. *Source Vista*, Case No. 8:13-CV-01321 in the United States District Court for the Central District of California.
Mophie's First Amended Complaint, filed Jun. 25, 2014, in *Mophie, Inc.* v. *UNU Electronics Inc.*, Case No. 8:13-CV-01705 in the United States District Court for the Central District of California.
UNU's Answer and Counterclaims, filed Jul. 10, 2014, in *Mophie, Inc.* v. *UNU Electronics Inc.*, Case No. 8:13-CV-01705 in the United States District Court for the Central District of California.
Mophie's Responses to Defendant's Third Set of Interrogatories (No. 12), dated Aug. 21, 2014, in *Mophie, Inc.* v. *UNU Electronics Inc.*, Case No. 8:13-CV-01705 in the United States District Court for the Central District of California.
Mophie's Responses to Defendant's First set of Requests for Admissions (Nos. 1-46), dated Aug. 19, 2014, in *Mophie, Inc.* v. *UNU Electronics Inc.*, Case No. 8:13-CV-01705 in the United States District Court for the Central District of California.
Mophie's Responses to Defendant's Second set of Requests for Admissions (Nos. 47-109), dated Aug. 19, 2014, in *Mophie, Inc.* v. *UNU Electronics Inc.*, Case No. 8:13-CV-01705 in the United States District Court for the Central District of California.
Request for Ex Parte Reexamination of U.S. Pat. No. 8,367,235, filed Aug. 14, 2014.
Corrected Request for Ex Parte Reexamination of U.S. Pat. No. 8,367,235, filed Sep. 18, 2014.
Declaration of John Feland, Ph.D. in Support of Mophie's Opposition to Defendants Motion for Partial Summary Judgment, filed Oct. 3, 2014, in *Mophie, Inc.* v. *Source Vista*, Case No. 8:13-CV-01321 in the United States District Court for the Central District of California.
LivingSocial's Reply in Support of Motion for Summary Judgment, Filed Oct. 10, 2014, in *Mophie, Inc.* v. *Source Vista*, Case No. 8:13-CV-01321 in the United States District Court for the Central District of California.
Defendants' Reply in Support of Motion for Partial Summary Judgment, Filed Oct. 10, 2014, in *Mophie, Inc.* v. *Source Vista*, Case No. 8:13-CV-01321 in the United States District Court for the Central District of California.
Reply in Support of Mophie's Motion for Summary Judgment, Filed Oct. 10, 2014, in *Mophie, Inc.* v. *Source Vista*, Case No. 8:13-CV-01321 in the United States District Court for the Central District of California.
Mophie's Reply to Counterclaims of LivingSocial, filed Oct. 14, 2014, in *Mophie, Inc.* v. *Source Vista*, Case No. 8:13-CV-01321 in the United States District Court for the Central District of California.
Mophie's Reply to Counterclaims of Shah, filed Oct. 14, 2014, in *Mophie, Inc.* v. *Source Vista*, Case No. 8:13-CV-01321 in the United States District Court for the Central District of California.
Defendant's Response to Mophie's Fourth Set of Interrogatories, dated Sep. 23, 2014, in *Mophie, Inc.* v. *UNU Electronics Inc.*, Case No. 8:13-CV-01705 in the United States District Court for the Central District of California.
Plaintiff Mophie's Preliminary Claim Constructions and Identification of Extrinsic Evidence, dated Oct. 14, 2014, in *Mophie, Inc.* v. *UNU Electronics Inc.*, Case No. 8:13-CV-01705 in the United States District Court for the Central District of California.
Defendant's Preliminary Claim Constructions and Extrinsic Evicence, dated Oct. 14, 2014, in *Mophie, Inc.* v. *UNU Electronics Inc.*, Case No. 8:13-CV-01705 in the United States District Court for the Central District of California.
Plaintiff Mophie's Opening Brief on Claim Construction, filed Oct. 29, 2014, in *Mophie, Inc.* v. *UNU Electronics Inc.*, Case No. 8:13-CV-01705 in the United States District Court for the Central District of California.
Declaration of John Feland, Ph.D. in Support of Plaintiff's Preliminary Claim Constructions, filed Oct. 29, 2014, in *Mophie, Inc.* v. *UNU Electronics Inc.*, Case No. 8:13-CV-01705 in the United States District Court for the Central District of California.
Supplemental Declaration of John Feland, Ph.D. in Support of Plaintiff's Claim Constructions, filed Oct. 29, 2014, in *Mophie, Inc.*

(56) References Cited

OTHER PUBLICATIONS v. *UNU Electronics Inc.*, Case No. 8:13-CV-01705 in the United States District Court for the Central District of California.
Declaration of Sheila N. Swaroop in Support of Mophie's Opening Claim Construction Brief, filed Oct. 29, 2014, in *Mophie, Inc. v. UNU Electronics Inc.*, Case No. 8:13-CV-01705 in the United States District Court for the Central District of California.
Transcript of Deposition of John Feland, dated Oct. 21, 2014, in *Mophie, Inc. v. UNU Electronics Inc.*, Case No. 8:13-CV-01705 in the United States District Court for the Central District of California.
Defendant's Opening Claim Construction Brief, dated Oct. 29, 2014, in *Mophie, Inc. v. UNU Electronics Inc.*, Case No. 8:13-CV-01705 in the United States District Court for the Central District of California.
Order Granting Request for Ex Parte Reexamination of U.S. Pat. No. 8,367,235, in Reexamination Control No. 90/013,319, dated Oct. 24, 2014.
Order Re LivingSocial's Motion for Summary Judgment, Mophie's Motion for Summary Judgment, Source Vista and Shah's Motion for Partial Summary Judgment, and Mophie's Motion to Bifurcate, dated Nov. 12, 2014, in *Mophie, Inc. v. Source Vista*, Case No. 8:13-CV-01321 in the United States District Court for the Central District of California.
Mophie's Memorandum in Support of its Motion for Reconsideration, filed Nov. 19, 2014, in *Mophie, Inc. v. Source Vista*, Case No. 8:13-CV-01321 in the United States District Court for the Central District of California.
Declaration of Sheila N. Swaroop in Support of Mophie's Motion for Reconsideration, filed Nov. 19, 2014, in *Mophie, Inc. v. Source Vista*, Case No. 8:13-CV-01321 in the United States District Court for the Central District of California.
Order Denying Plantiff's Motion for Reconsideration, dated Nov. 21, 2014, in *Mophie, Inc. v. Source Vista*, Case No. 8:13-CV-01321 in the United States District Court for the Central District of California.
U.S. Appl. No. 14/800,530 Including its prosecution history, filed Jul. 15, 2015, Huang.
U.S. Appl. No. 14/675,067 Including its prosecution history, filed Mar. 31, 2015, To et al.
U.S. Appl. No. 29/539,419 Including its prosecution history, filed Sep. 14, 2015, Dang et al.
U.S. Appl. No. 29/510,154 Including its prosecution history, filed Nov. 25, 2014, Mophie, Inc.
U.S. Appl. No. 29/510,153 Including its prosecution history, filed Nov. 25, 2014, Mophie, Inc.
U.S. Appl. No. 29/522,987 Including its prosecution history, filed Apr. 6, 2015, Gjøvik et al.
U.S. Appl. No. 29/510,839 Including its prosecution history, filed Dec. 3, 2014, Mophie, Inc.
U.S. Appl. No. 29/523,211 Including its prosecution history, filed Apr. 7, 2015, To et al.
U.S. Appl. No. 29/523,209 Including its prosecution history, filed Apr. 7, 2015, Mophie, Inc.
U.S. Appl. No. 29/528,266 Including its prosecution history, filed May 27, 2015, Gjøvik et al.
U.S. Appl. No. 29/534,901 Including its prosecution history, filed Jul. 31, 2015, Dang et al.
International Preliminary Report on Patentability for PCT/US2013/057276, dated Mar. 3, 2015.
International Preliminary Report on Patentability for PCT/US2014/017781, dated Aug. 25, 2015.
International Preliminary Report on Patentability for PCT/US2014/023592, dated Sep. 15, 2015.
International Search Report and Written Opinion for PCT/US2014/067470, dated Mar. 31, 2015.
Defendants Dharmesh Shah and Serve Global, LLC's Memorandum of Points and Authorities in Support of Defendants's Motion for Attorney's Fees, filed Mar. 21, 2015, in *Mophie, Inc. v. Source Vista*, Case No. 8:13-CV-01321 in the United States District Court for the Central District of California.
Memorandum of Points and Authorities in Support of Livingsocial, Inc.'s Motion for Legal Fees and Costs, filed Mar. 20, 2015, in *Mophie, Inc. v. Source Vista*, Case No. 8:13-CV-01321 in the United States District Court for the Central District of California.
Plaintiff Mophie, Inc.'s Opposition to Defendants Dharmesh Shah and Serve Global, LLC's Motion for Attorneys' Fees, filed Apr. 3, 2015, in *Mophie, Inc. v. Source Vista*, Case No. 8:13-CV-01321 in the United States District Court for the Central District of California.
Plaintiff Mophie, Inc.'s Opposition to Defendant Livingsocial, Inc.'s Motion for Attorneys' Fees, filed Apr. 3, 2015, in *Mophie, Inc. v. Source Vista*, Case No. 8:13-CV-01321 in the United States District Court for the Central District of California.
Reply to Plaintiff's Opposition to Defendants Dharmesh Shah and Serve Global, LLC's Motion for Attorney's Fees, filed Apr. 10, 2015, in *Mophie, Inc. v. Source Vista*, Case No. 8:13-CV-01321 in the United States District Court for the Central District of California.
Reply in Support of Livingsocial, Inc.'s Motion for Legal Fees and Costs, filed Apr. 10, 2015, in *Mophie, Inc. v. Source Vista*, Case No. 8:13-CV-01321 in the United States District Court for the Central District of California.
Amended Final Judgment and Permanent Injunction, dated Dec. 11, 2015, in *Mophie, Inc. v. Source Vista*, Case No. 8:13-CV-01321 in the United States District Court for the Central District of California.
Order Re Motions for Attorneys' Fees, Motion to Amend Permanent Injunction, Motions for Judgment as a Matter of Law, Motion for Relief From Judgment, and Motion for New Trial, dated Dec. 11, 2015, in *Mophie, Inc. v. Source Vista*, Case No. 8:13-CV-01321 in the United States District Court for the Central District of California.
Mophie's Complaint, filed Dec. 16, 2015, in *Mophie, Inc. v. Cute Mobile Inc.*, Case No. 8:15-cv-02086 in the United States District Court for the Central District of California.
Daniel Huang Deposition Transcript (Redacted) with Exhibit 121, dated Aug. 21, 2014, in *Mophie, Inc. v. Source Vista*, Case No. 8:13-CV-01321 in the United States District Court for the Central District of California.
U.S. Appl. No. 15/130,196 including its prosecution history, filed Apr. 15, 2016, Huang.
U.S. Appl. No. 15/223,683 Including its prosecution history, filed Jul. 29, 2016, Huang et al.
U.S. Appl. No. 15/223,735 Including its prosecution history, filed Jul. 29, 2016, Diebel et al.
International Preliminary Report of Patentability for PCT/US2014/067470, dated Jun. 9, 2016.
International Search Report and Written Opinion for PCT/US2015/065800, dated Apr. 21, 2016.
Amazon.com, "Galaxy S6 Battery Case, i-Blason External Protective Battery Case/Cover for Samsung Galaxy S6 2015 Release." Customer Review published Mar. 29, 2015. Retrieved from internet at <http://www.amazon.com/Case-i-Blason-External-Protective-Versions/dp/B00SNS4LME>, Accessed on Apr. 28, 2016, 7 pages.
Mophie's First Amended Complaint, filed May 25, 2016 in *Mophie, Inc. v. Cute Mobile Inc.*, Case No. 8:15-cv-02086 in the United States District Court for the Central District of California.
U.S. Appl. No. 29/556,805, filing date Mar. 3, 2016, Dang et al.
U.S. Appl. No. 29/556,807, filing date Mar. 3, 2016, Dang et al.
U.S. Appl. No. 29/556,809, filing date Mar. 3, 2016, Dang et al.
International Preliminary Report on Patentability for PCT/US2015/065800, dated Jun. 29, 2017.

\* cited by examiner

PROTECTIVE CASE FOR MOBILE DEVICE

CROSS-REFERENCE TO RELATED APPLICATIONS

This application claims the benefit under 35 U.S.C. §119(e) of U.S. Provisional Patent Application No. 61/802,181, titled "DURABLE PROTECTIVE BATTERY CASE," and filed on Mar. 15, 2013; and U.S. Provisional Patent Application No. 61/923,590, titled "PROTECTIVE CASE WITH SWITCH COVER," and filed on Jan. 3, 2014. The above-identified patent applications are incorporated by reference in their entirety and made a part of this specification for all that they disclose.

INCORPORATION BY REFERENCE

The following U.S. Patents and Patent Applications are incorporated by reference in their entirety and made a part of this specification for all that they disclose: U.S. Design patent application No. 29/406,346, titled "MULTI-PIECE CASE," and filed Nov. 11, 2011; U.S. patent application Ser. No. 12/357,262, titled "BATTERY PACK, HOLSTER, AND EXTENDIBLE PROCESSING AND INTERFACE PLATFORM FOR MOBILE DEVICES," and filed Jan. 21, 2009, now U.S. Pat. No. 8,367,235; U.S. Provisional Patent Application No. 61/768,538, titled "SWITCH COVER AND EXTERNAL CASE INCORPORATING A SWITCH COVER," and filed Feb. 25, 2013; U.S. patent application Ser. No. 14/187,046, titled "PROTECTIVE CASE WITH SWITCH COVER," and filed Feb. 21, 2014; U.S. Provisional Patent Application No. 61/696,139, titled "WIRELESS COMMUNICATION REPEATER ANTENNA FOR A MOBILE DEVICE PERIPHERAL," and filed Sep. 1, 2012; and U.S. patent application Ser. No. 14/014,095, titled "WIRELESS COMMUNICATION ACCESSORY FOR A MOBILE DEVICE," and filed Aug. 29, 2013.

BACKGROUND

Field

Various aspects of this disclosure relate to protective cases for mobile electronic devices, and more particularly to protective cases for mobile electronic devices incorporating a supplemental battery.

Description of the Related Art

Many mobile devices (e.g., mobile phones, digital assistants, mobile communication devices, handheld video game devices, handheld computing devices, personal music/video/content players, navigation systems, sensors, and storage devices) may be expensive, may have fragile equipment such as breakable glass touchscreens and lenses, may have easily scuffed decorative finishes, may have delicate internal electronic components, and may have easily broken or lost buttons and/or switches. People have also become more and more dependent on the data, contacts, and calendars stored in their mobile devices, even as the devices shrink and incorporate more expensive and more sensitive components. These expensive devices and the critical stored data can be protected with a relatively inexpensive protective case. Additionally as the mobile device form factor shrinks, the mechanical controls can similarly shrink.

The mobile devices are often powered by battery power sources. Such battery power sources are often housed within the mobile device and may be changed and/or recharged as needed. However, as more powerful mobile devices are designed, these tend to consume power more quickly, thereby shortening the time between charges. This can limit the usefulness of the mobile device since the user may need to find a power source to recharge the battery source and wait until it is recharged.

Additionally, such mobile devices are typically designed to satisfy the needs of a wide array of consumers. While some consumers are comfortable with no case or decorative cases providing minimal protection, for other consumers, these devices are frequently used in harmful environments such that external covers capable of protecting the internal device from liquid, dust, crushing, and impact are beneficial. Consequently, users who wish to protect their mobile device in harmful environments (e.g., military, law enforcement, construction workers, and outdoors enthusiasts) often protect their cases with bulky, durable cases. Further, in some instances, such mobile devices may have somewhat limited processing capabilities (e.g., to extend battery power) and limited input/output capabilities. Consequently, in some cases, users who wish to extend the capabilities of the mobile device to implement various types of solutions are prevented from doing so.

Users frequently attach separate after-market cases to their mobile devices, either as a form of expression or to protect the sensitive electronics, the breakable glass, and the important information inside. Some users have to expose their mobile devices to relatively harsh conditions, such as rain, mud, sand, bumps, and frequent drops. These users frequently opt for protective cases.

SUMMARY

Various embodiments of this disclosure relate to a water-resistant protective case for a mobile device with a touch screen. The protective case can include a first case portion and a second case portion configured to form a protective case around the mobile device, and the protective case can be configured to reveal the touch screen. The protective case can include a plurality of impact-absorbing regions fixed to the protective case. The protective case can include a battery and an internal interface capable of electrically coupling with the mobile device when the mobile device is in the protective case. The protective case can include a water-resistant seal formed between the first rigid case portion and the second rigid case portion when the first rigid case portion and the second rigid case portion are coupled to form the protective case.

The water-resistant seal can include a gasket.

In some embodiments, a first portion of the gasket is disposed between the internal interface and the first case portion and wherein a second portion of the gasket is disposed between the internal interface and the second case portion.

The protective case can include a plurality of openings and flexible port covers configured to correspond to ports and/or buttons on the mobile device when the mobile device is in the protective case.

The protective case can include a screen gasket capable of forming a water-tight seal around the touch screen when the mobile device is in the protective case.

The protective case can include a membrane attached to the protective case disposed in front of the touch screen when the mobile device is in the protective case. In some embodiments, a tactile input on one side of the membrane registers with the touch screen on the mobile device when the mobile device is in the protective case.

The plurality of impact-absorbing regions can include over-molded thermoplastic.

The protective case can include a flexible sleeve configured to stretch around the protective case.

The protective case can include an external interface electrically coupled to the internal interface. The external interface can be a different connection type from the internal interface.

The first battery and a second battery in the mobile device can be configured to be charged through the external interface.

The protective case can include comprising a battery information display.

The battery can be enclosed within the first case portion.

Various embodiments disclosed herein relate to a protective case for a mobile device with a touch screen. The protective case can include a first rigid case portion and a second rigid case portion configured to form a protective case around the mobile device, and the protective case can be configured to reveal the touch screen. The protective case can include a first battery and an internal interface capable of electrically coupling with the mobile device when the mobile device is in the protective case. The protective case can include a water-resistant seal formed between the first rigid case portion and the second rigid case portion when the first rigid case portion and the second rigid case portion are coupled to form the protective case. In some embodiments, the protective case can include a flexible sleeve configured to stretch around the protective case.

The water-resistant seal can include a gasket. In some embodiments, a first portion of the gasket can be disposed between the internal interface and the first case portion, and a second portion of the gasket can be disposed between the internal interface and the second case portion.

The protective case can include a plurality of openings and flexible port covers configured to correspond to ports and/or buttons on the mobile device when the mobile device is in the protective case.

The protective case can include a screen gasket capable of forming a water-tight seal around the touch screen.

The protective case can include a membrane attached to the protective case disposed in front of the touch screen when the mobile device is in the protective case. An input on one side of the membrane opposite the touch screen can register with the touch screen on the mobile device when the mobile device is in the protective case.

The protective case can include a waterproof microphone port.

The protective case can include an external interface electrically coupled to the internal interface.

The battery of the protective case and a battery in the mobile device are configured to be charged through the external interface.

The protective case can include a battery information display.

The protective case can include comprises a third case portion.

The battery can be enclosed within the first case portion.

Various embodiments of this disclosure relate to a water-resistant protective case for a mobile device with a touch screen. The protective case can include a first rigid case portion and a second rigid case portion configured to form a protective case with a plurality of openings configured to correspond to the ports and/or buttons of the mobile device when the mobile device is in the protective case. The protective case can be configured to reveal the touch screen. The protective case can include a flexible sleeve configured to stretch around the protective case, and the flexible sleeve can include flexible port covers capable of sealing the plurality of openings. The protective case can include a membrane attached to the protective case disposed in front of the touch-screen. A tactile input on one side of the membrane can register with the touch screen on the mobile device when the mobile device is in the protective case. The protective case can include a battery, an internal interface capable of electrically coupling with the mobile device when the mobile device is in the protective case, and an external interface electrically coupled to the internal interface. The protective case can include a water-resistant seal formed between the first rigid case portion and the second rigid case portion when the first rigid case portion and the second rigid case portion are coupled to form the protective case.

Various protective cases described above and disclosed herein can include a switch cover that can be rotatable between a first position and a second position. The switch cover can be configured to move a switch on the mobile device linearly to a first switch position when the switch cover is rotated to the first position, and the switch cover can be configured to move the switch linearly to a second switch position when the switch cover is rotated to the second position.

The switch cover can include a base having a first portion and a second portion, and the switch cover can be configured to rotate about an axis of the base. The first portion can be configured to face the switch of the mobile device when the mobile device is in the case, and the second portion can be configured to face away from the switch. A guide on the first portion of the base, the guide configured to engage the switch of the portable electronic device when the portable electronic device is in the case.

The protective case can have an opening that engages the switch cover while allowing the switch cover to rotate about the axis of the base. The switch cover can be configured such that when the mobile device is in the case and the cover is rotated about the axis of the base, the guide moves the switch of the mobile device.

Various embodiments of this disclosure relate to a protective case for use with a mobile electronic device having a switch that is configured to move linearly between a first switch position and a second switch position. The case can include a housing configured to at least partially enclose the mobile device and a switch cover rotatable between a first position and a second position. The switch cover can be configured to move the switch to the first switch position when the switch cover is rotated to the first position, and the switch cover can be configured to move the switch to the second switch position when the switch cover is rotated to the second position.

Various embodiments of this disclosure relate to a case comprising a cover for use with a switch of a portable electronic device. The case can include a cover that can have a base with a first portion and a second portion. The cover can be configured to rotate about an axis of the base. The first portion can be configured to face a switch of a portable electronic device when the portable electronic device is in the case, and the second portion can be configured to face away from the switch. A guide on the first portion of the base can be configured to engage the switch of the portable electronic device when the portable electronic device is in the case. An opening in the case can engage the cover while allowing the cover to rotate about the axis of the base. The cover can be configured such that when the portable electronic device is in the case and the cover is rotated about the axis of the base, the guide moves the switch of the portable electronic device.

At least a portion of the base and/or at least a portion of the opening can be generally cylindrical.

The case can include a gasket on the base of the cover.

The gasket can engage the opening in the case to form a seal between the cover and the case. The seal can inhibit contact of external environment elements with the portable electronic device when the portable electronic device is in the case.

The base can include a channel engaging the gasket to position the gasket relative to the base of the cover.

The gasket and channel can be generally circular.

The base can include a flange on a side of the base, and the flange can protrude beyond a periphery of the opening of the case to secure, or inhibit movement of, the cover within the opening along the axis of the base.

The base can include a gap that can be configured to allow at least a part of the base to flex inward to allow the flange to slide within the opening of the case when the cover is inserted into the opening of the case.

The case can include a stop positioned to abut the flange as the cover is rotated, wherein the flange abutting the stop inhibits further rotation of the cover.

The guide can include a first guiderail on the first portion of the base and a second guide rail on the first portion of the base. The first guiderail can correspond to a first side of the switch of the portable electronic device, and the second guide rail can correspond to a second side of the switch of the portable device. The first side of the switch can be opposite the second side of switch. When the cover is rotated in a first direction, the first guiderail can rotate about the axis and can push the first side of the switch to move the switch towards a first switch position. When the cover is rotated in a second direction, the second guiderail can rotate about the axis and can push the second side of the switch to move the switch towards a second switch position.

The first and second guiderails can form a pathway between the first and second guiderails to allow the switch to slide between the first and second guiderail when the portable electronic device is inserted into the case.

The first and second guiderails can have rounded ends contacting the switch when the portable electronic device is inserted into the case, and the rounded ends can facilitate positioning the cover to correspond to a position of the switch as the portable electronic device is inserted into the case.

The guide can engage a portion of the switch while allowing another portion of the switch to move over a wall of the base as the cover is rotated.

The base can include a back support on the first surface of the base. The guide and the back support can have surfaces facing the portable electronic device when the portable electronic device is inserted into the case. The surfaces can be on a same plane to position the cover at a predetermined position relative to the portable electronic device.

The guide can slide along a wall of the switch as the cover is rotated and the guide is correspondingly rotated about the axis.

The guide can roll along a wall of the switch as the cover is rotated and the guide is correspondingly rotated about the axis.

The case can include a groove in the case about a periphery of the opening. The cover can include a knob projecting into the groove. The knob can be configured to move within the groove of the case when the cover is rotated about the central axis of the base. The range of rotation of the cover can be limited to a range of motion of the knob within the groove.

The cover can include a handle on the second portion to allow a user to rotate the cover about the axis.

The switch cover can include a handle on the second portion to allow a user to rotate the cover about the axis.

The case can include a handle cutout, and the handle cutout can engage the handle to inhibit rotation of the handle beyond a periphery of the handle cutout.

The handle can include a handle stop protruding into the handle cutout of the case to inhibit rotation of the handle beyond the periphery of the handle cutout when the handle stop abuts the periphery of the handle cutout.

Movement for the switch can be a translational direction.

The foregoing is a summary and contains simplifications, generalization, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein.

The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The foregoing and other features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

DESCRIPTION

Figure 1:
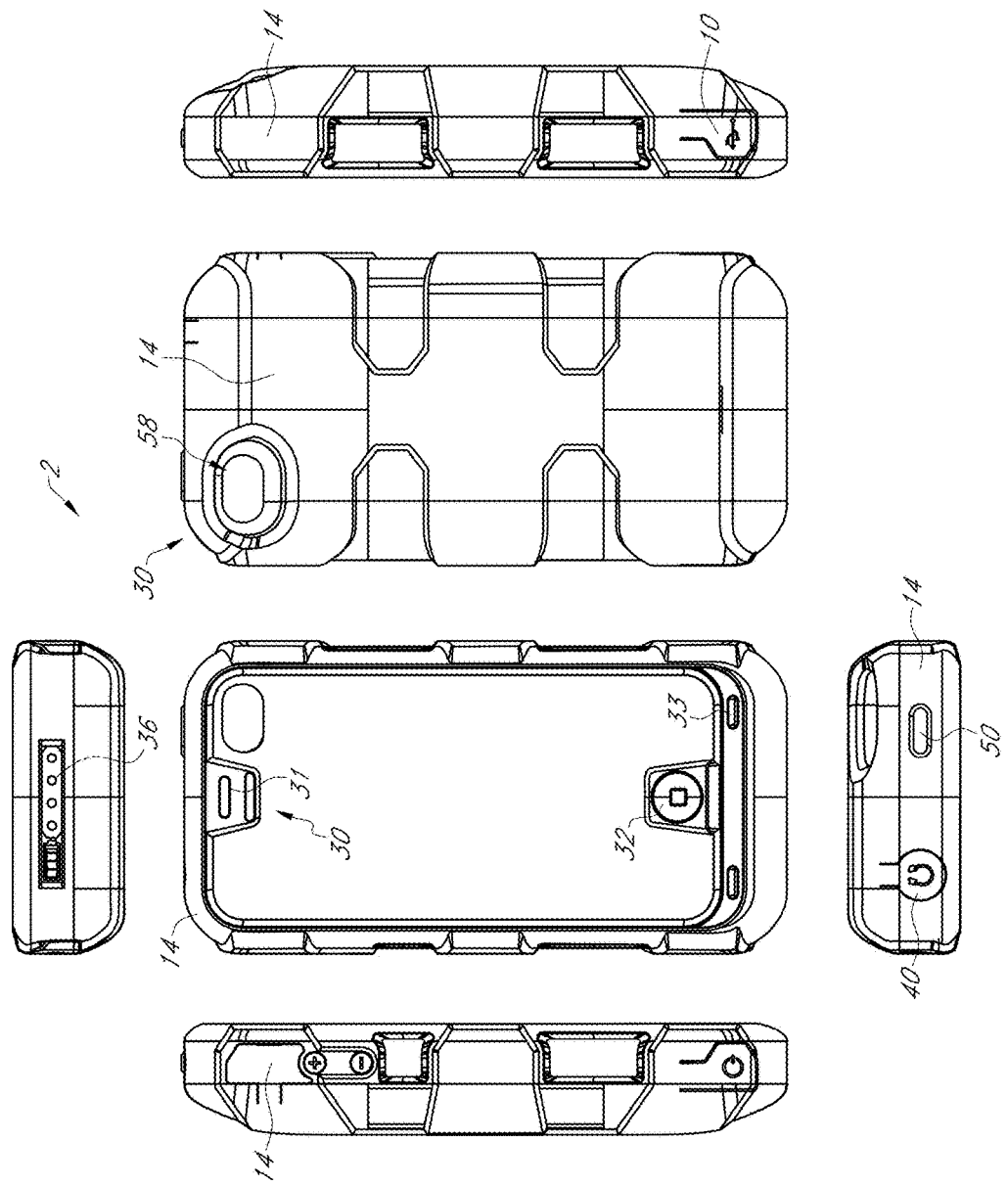
FIG. 1 illustrates various views of an example embodiment of a protective case for a mobile device.

In the following description, reference is made to the accompanying drawings, which form a part hereof. In the drawings, similar symbols typically identify similar components, unless context dictates otherwise. The illustrative embodiments described in the description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made a part of this disclosure.

Further, the following description contains, by necessity, simplifications, generalization, and omissions of detail; consequently, those skilled in the art will appreciate that the description is illustrative only and is not intended to be in any way limiting. This description is not intended to identify key features or essential features of any subject matter described herein.

Embodiments disclosed herein generally relates to protective cases for mobile electronic devices, and more particularly to protective cases for mobile electronic devices (e.g., smart phones) incorporating a supplemental battery. The protective case incorporating the supplemental battery can allow for charging the mobile device without a connection to an electrical power outlet while providing protection to the mobile device. Embodiments disclosed in this application also relate to covers for mechanical switches, particularly to covers for mechanical switches on mobile devices. The covers can be incorporated into cases or shells protecting the mobile device. The covers can allow for convenient access to a mobile device switch or toggle (e.g., without reducing protection, interrupting aesthetic, and/or reducing performance/accessibility).

Figure 2:
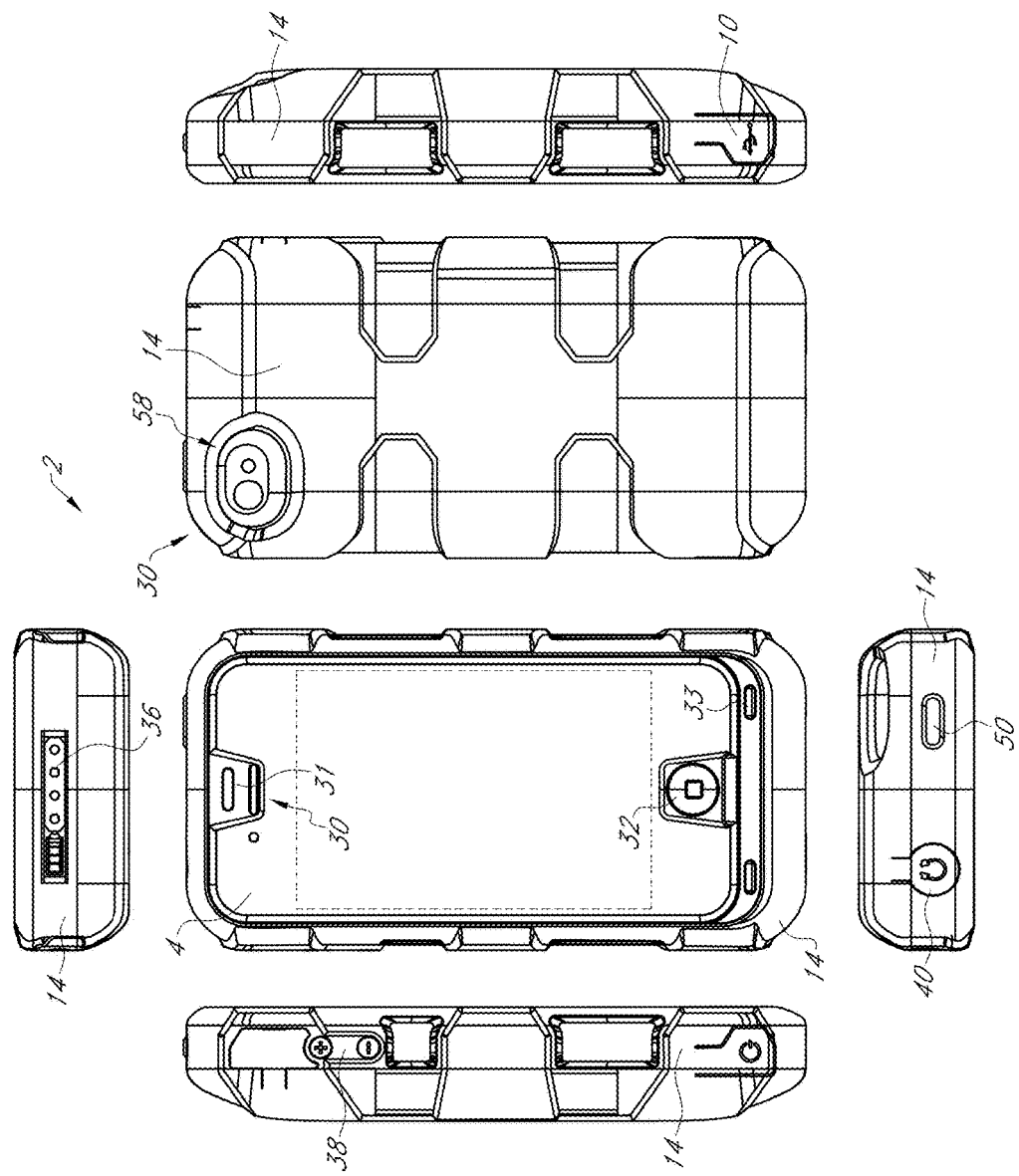
FIG. 2 illustrates various views of an example embodiment of a protective case and a mobile device.
Figure 3:
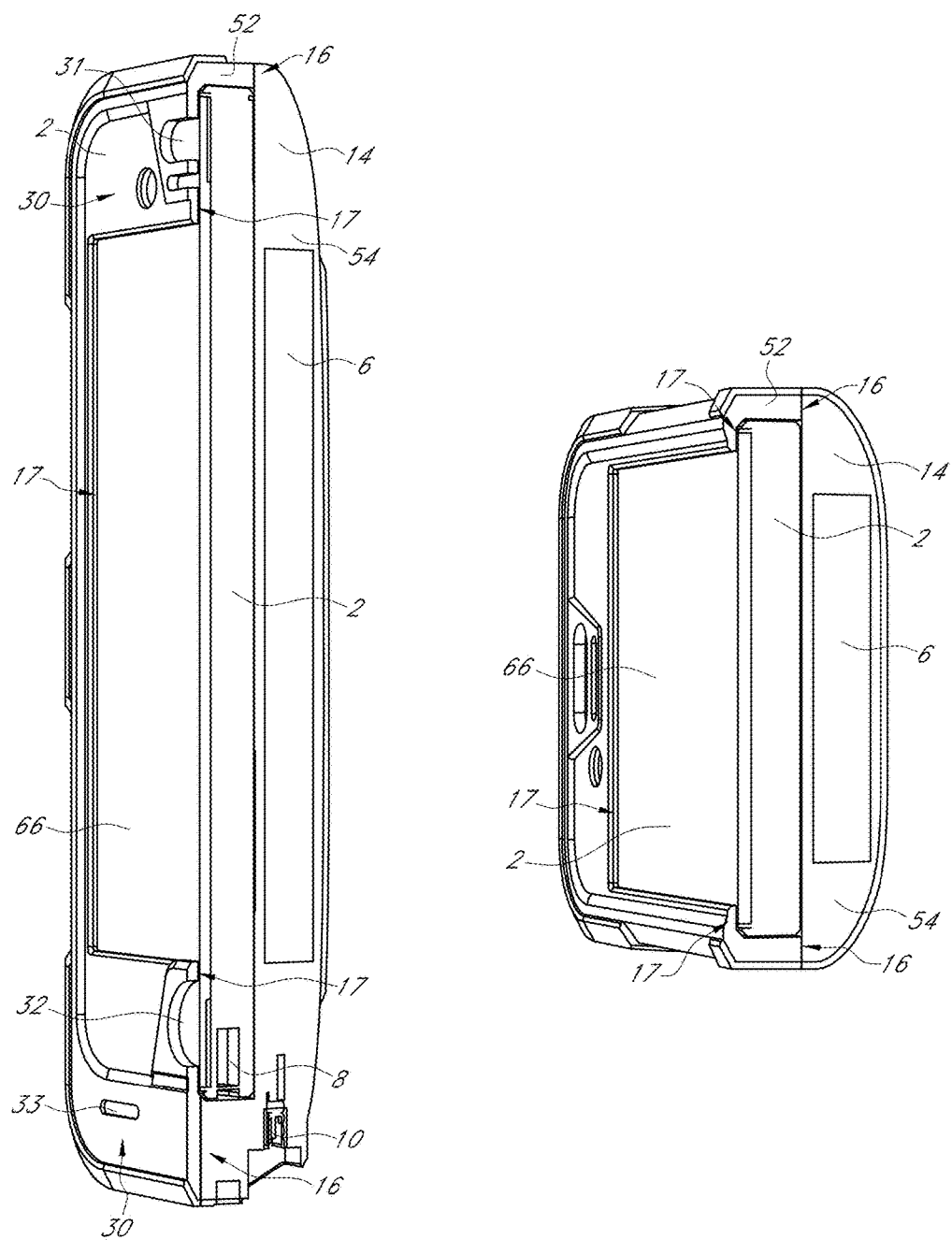
FIG. 3 illustrates cross-sectional views of an example embodiment of a protective case and a mobile device.
Figure 4:
FIG. 4 illustrates an exploded perspective view of an example embodiment of a protective case and a mobile device.
Figure 5:
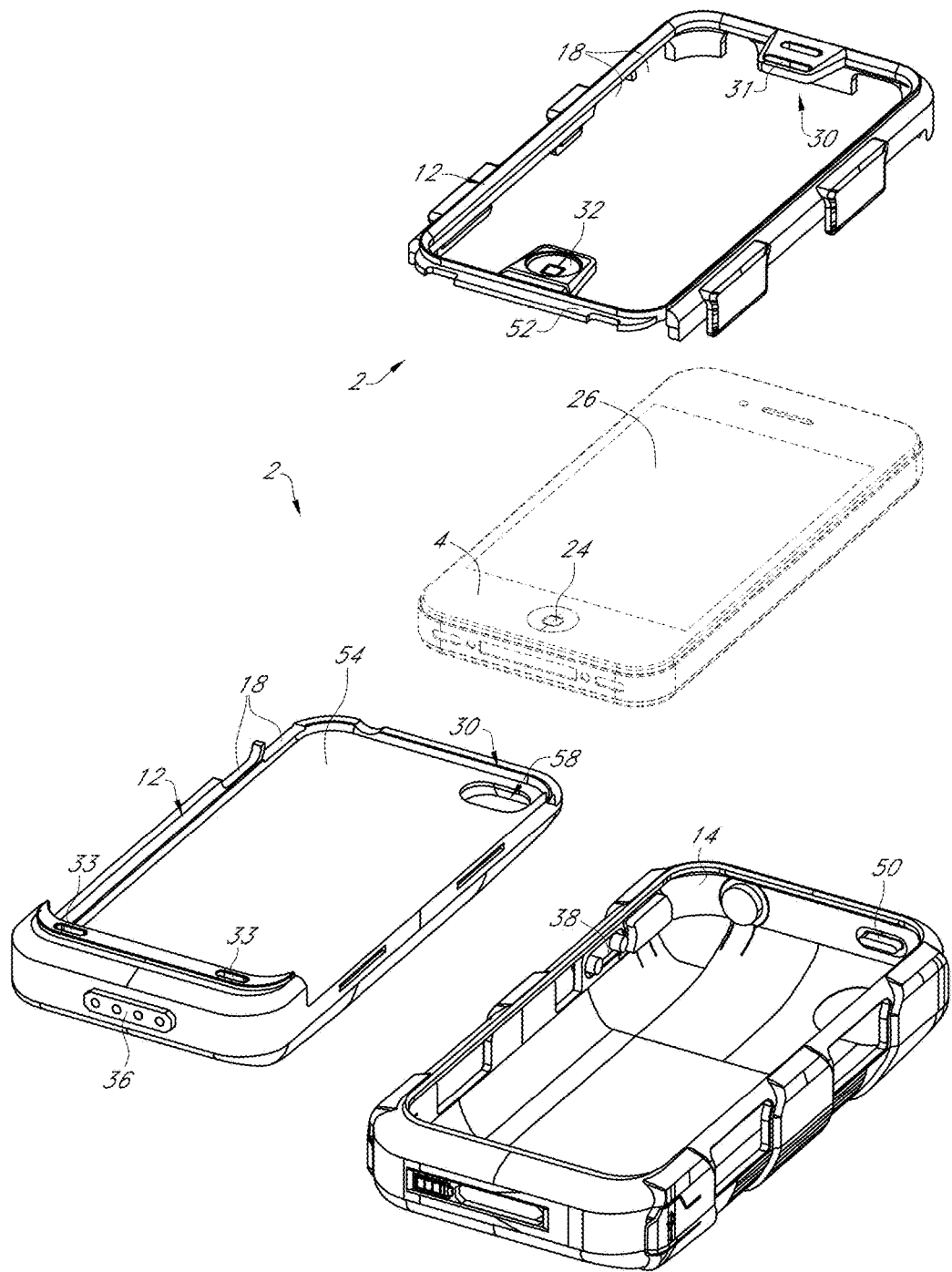
FIG. 5 illustrates an exploded perspective view of an example embodiment of a protective case and a mobile device.
Figure 6:
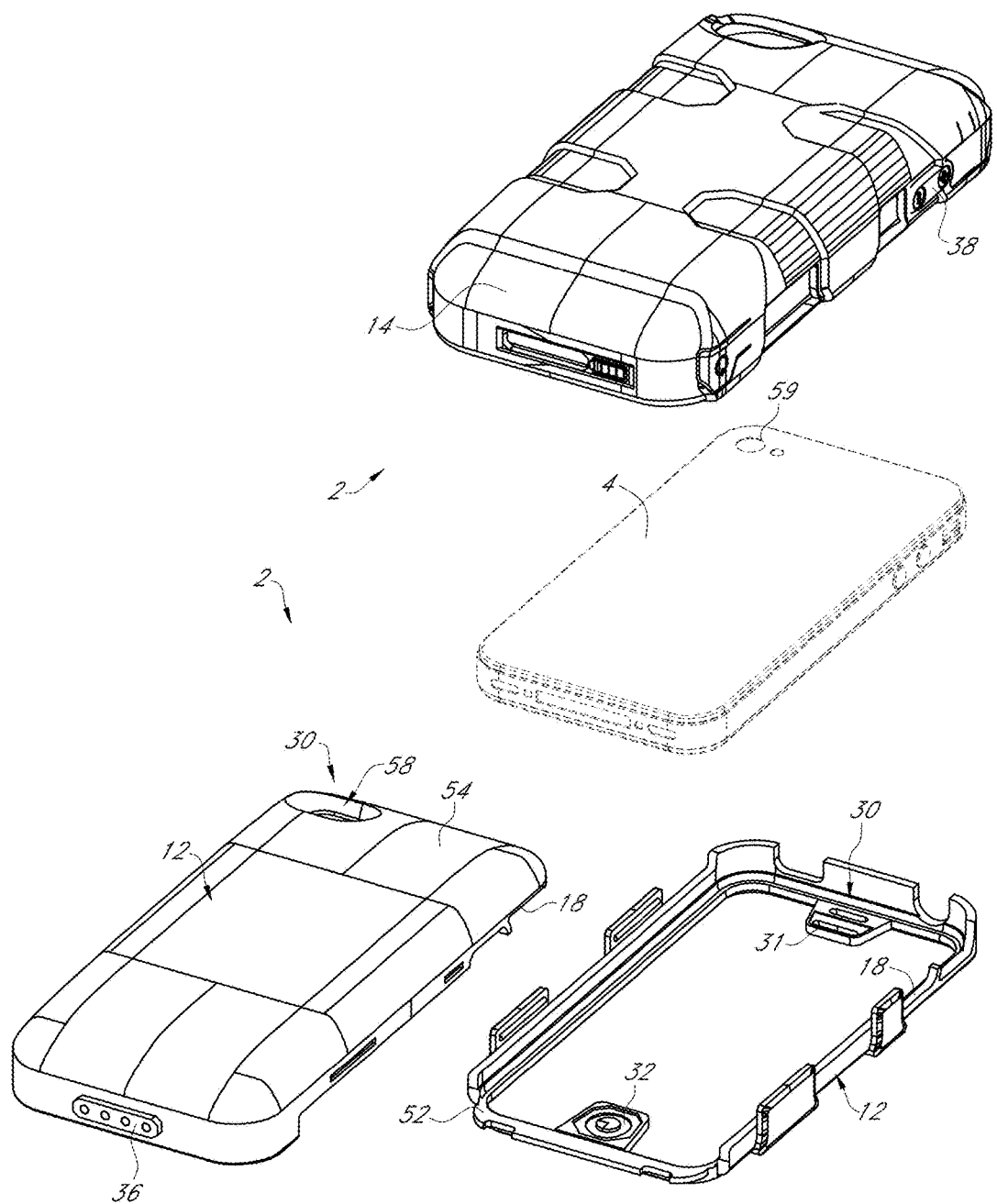
FIG. 6 illustrates an exploded perspective view of an example embodiment of a protective case and a mobile device.

FIG. 1 illustrates multiple views of an example embodiment of a protective case (e.g., a shell) 2. FIG. 2 illustrates multiple perspective views of an example embodiment of a protective case 2 with a mobile device 4. FIG. 3 illustrates cross-section side and bottom perspective views of an example embodiment of a case 2 having a battery 6. FIG. 4 illustrates a side, top, perspective view with various exploded components of an example embodiment of a case 2. FIG. 5 illustrates a perspective view with various exploded components of an example embodiment of a case 2. FIG. 6 illustrates a perspective view with various exploded components of an example embodiment of a case 2. FIGS. 7-12 illustrate various views of an example embodiment of a case 2, with some views illustrating a mobile device 4 and/or a belt clip 60. The protective case 2 can provide protection against harsh conditions while also extending the life of a battery of a mobile device 4 with a back-up battery 6 built into the case 2. The protective cases 2 can have additional space to adequately protect the mobile device 4. This additional space can provide space to contain a rechargeable (e.g., lithium ion) battery 6 as, for example, illustrated in FIG. 3. The case 2 can transmit and/or receive information and/or power to and/or from the mobile device 4 through an internal interface 8 (, as, for example, illustrated in FIGS. 3 and 4. The internal interface 8 can be an electrical interface (e.g., a plug), and can be configured to engage a corresponding electrical interface (e.g., a port) on the mobile device 4. For example, the battery 6 can supply electrical power to the mobile device 4 (e.g., to recharge the battery of the mobile device 4 or to power the mobile device 4). Information can be transferred to and/or from the mobile device 4 via the internal interface 8 (e.g., when syncing the mobile device 4 with a computer or other electronic device). The durable protective battery case 2 can transmit and receive information or power through an external interface 10 that is illustrated in, for example, FIGS. 1, 2, 24, and 25. The external interface 10 can be an electrical interface (e.g., a port), which can be configured to receive a corresponding electrical interface (e.g., a plug) from an external source (e.g., another device or a charging source such as an electrical outlet). The internal interface 8 and the external interface 10 can be different connection types. The internal and external interfaces 8 and 10 can comply to different standards. For example, the external interface 10 can be a micro-USB while the internal interface 8 could be a Lightning connector or a 30-pin connector, both of which are frequently found on devices sold by Apple computers. The external interface 10 can allow for charging of the mobile device 4 and/or battery 6 and allow syncing with other devices or applications.

FIGS. 1-12 illustrate example embodiments of a case 2 that include a rigid case portion 12 that provides crush-resistance surrounded by a malleable outer layer 14. In some embodiments, the malleable outer layer 14 can be stretched over the rigid case portion 12 to provide impact-resistance and to increase water-resistance. The malleable outer layer 14 can include flexible port covers 19 corresponding to ports and/or buttons on the mobile device 4 as discussed herein.

FIGS. 13-28 illustrate example embodiments of a case 2 that include a rigid case portion 12 that provides crush-resistance and has over molded impact absorbing regions 22. In some embodiments, the rigid case portion 12 can include impact absorbing regions 22 as illustrated in FIGS. 13-28. These impact absorbing regions 22 can be over molded to directly attach to the rigid case portion 12 as discussed herein.

Figure 13:
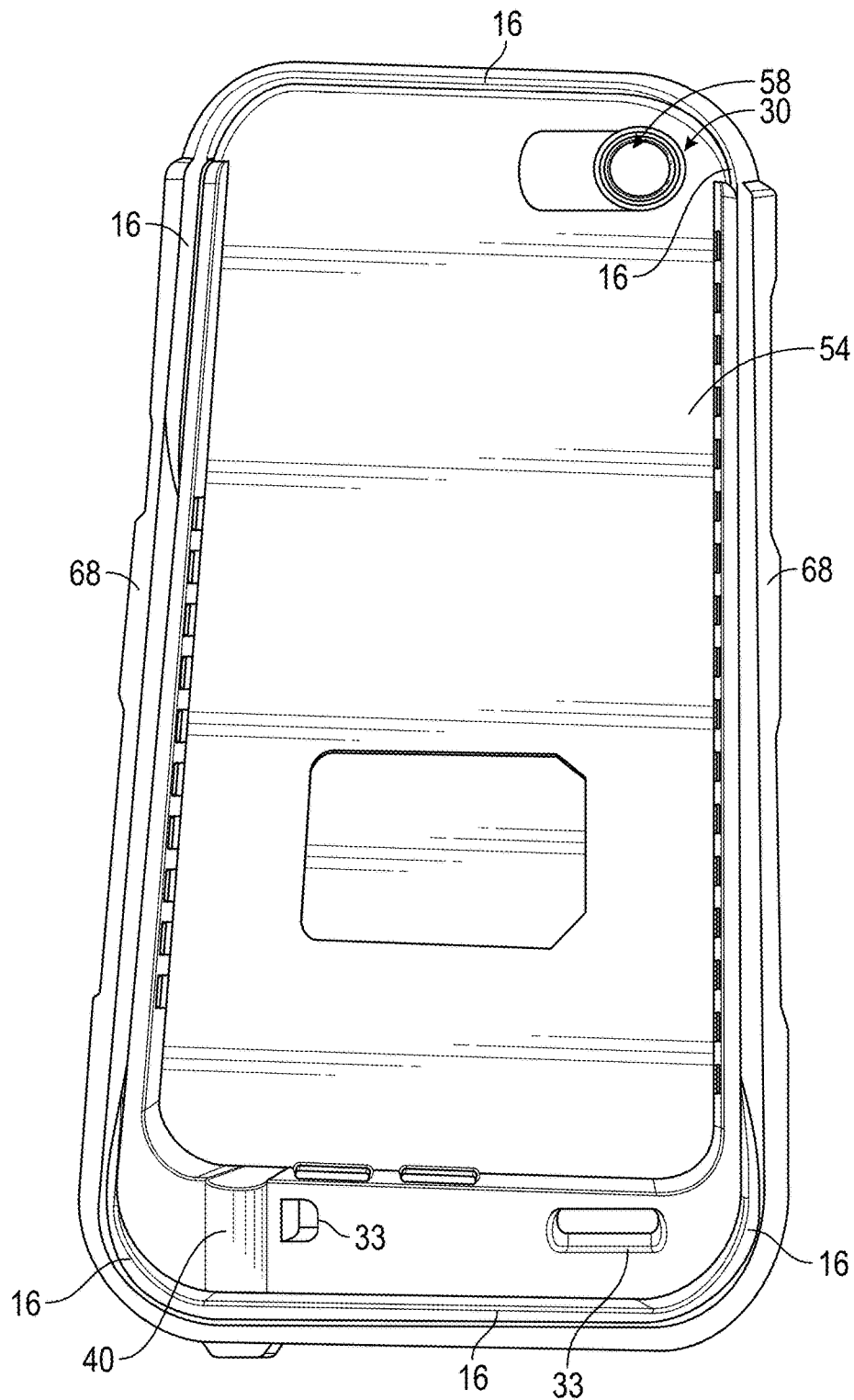
FIGS. 13-21 illustrate an example embodiment of a protective case for a mobile device.
Figure 14:
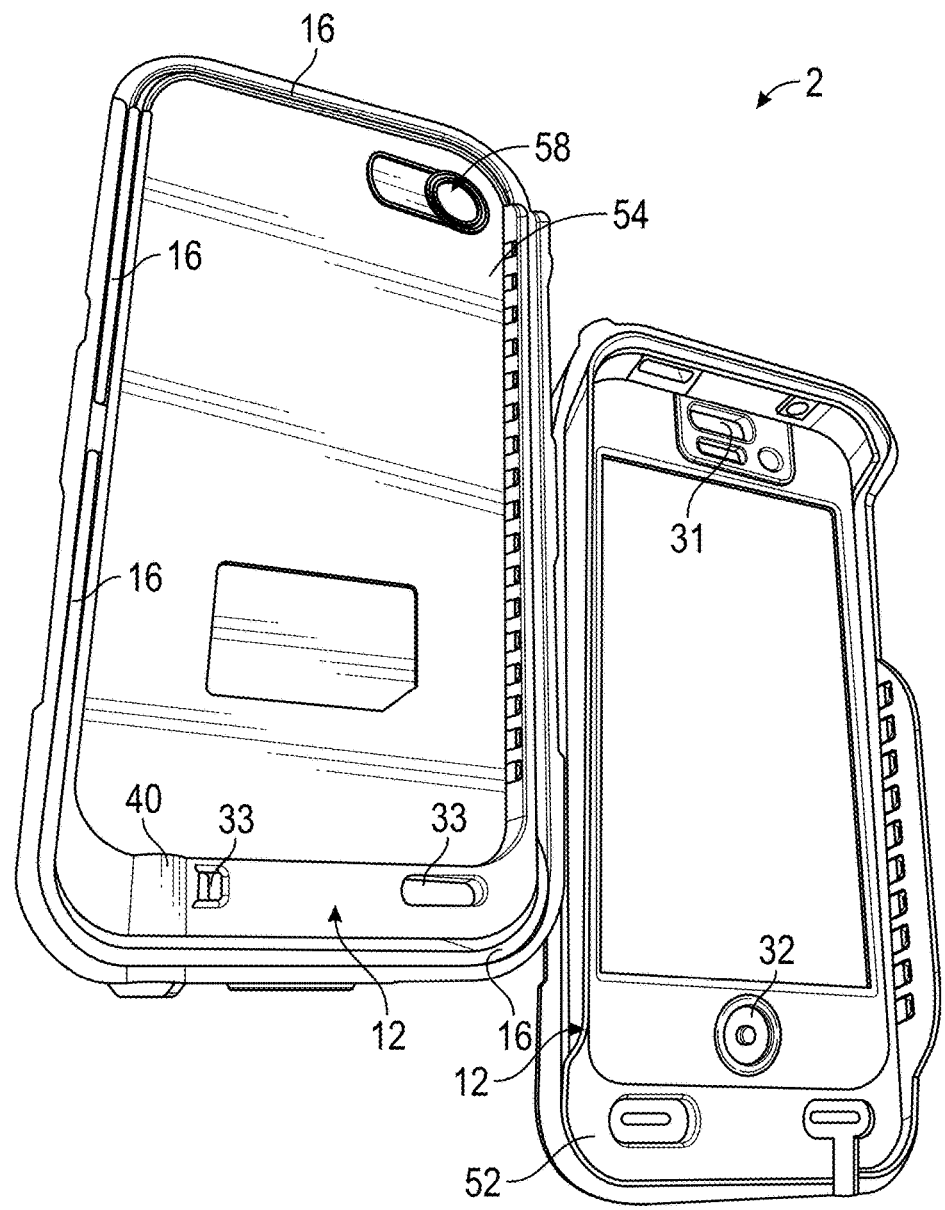
Figure 15:
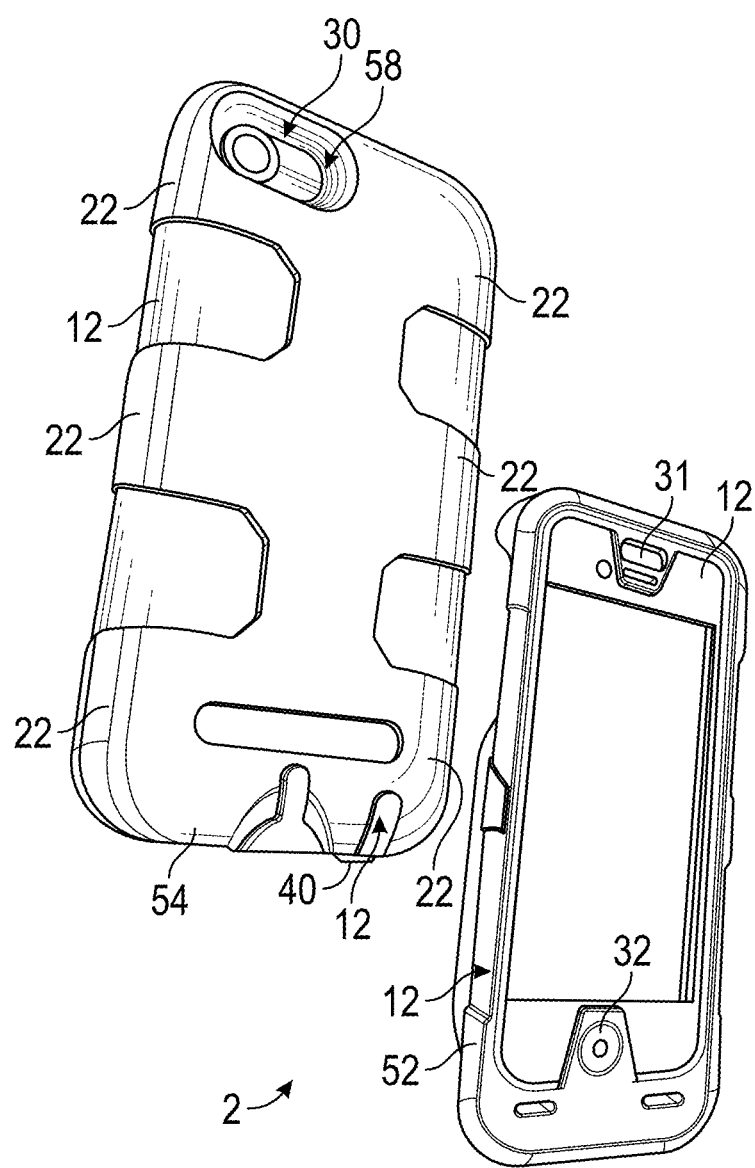
Figure 16:
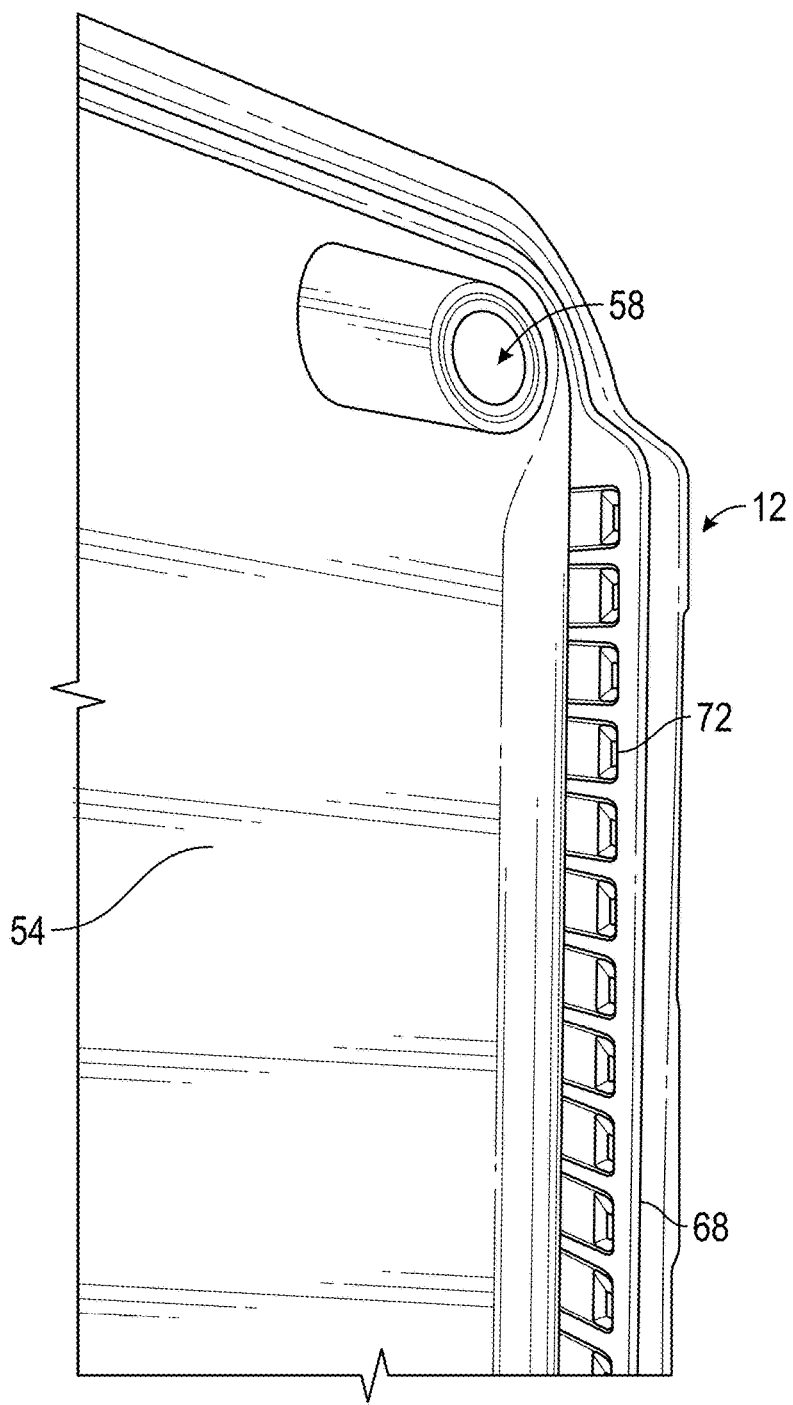
Figure 17:
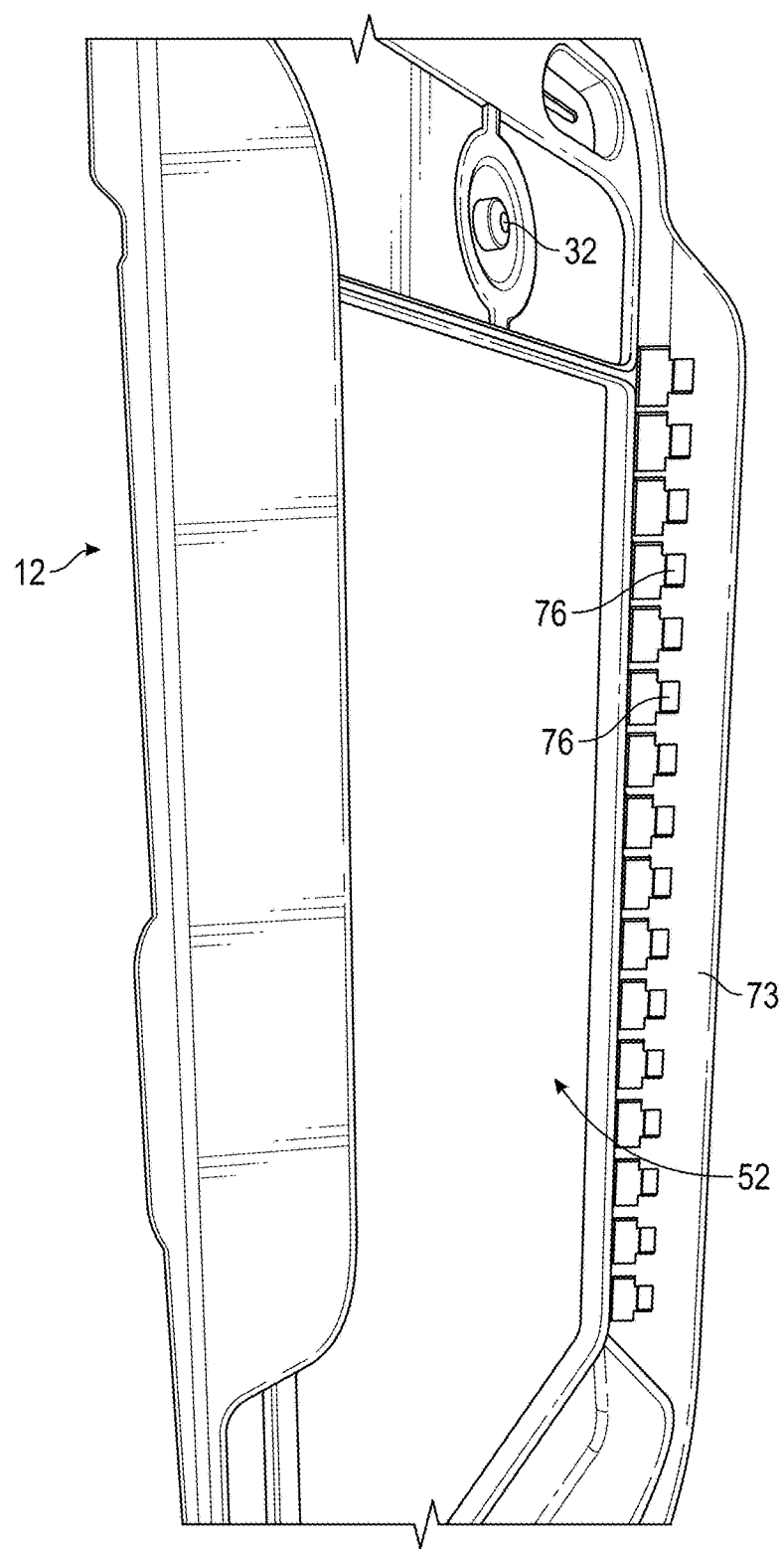
Figure 18:
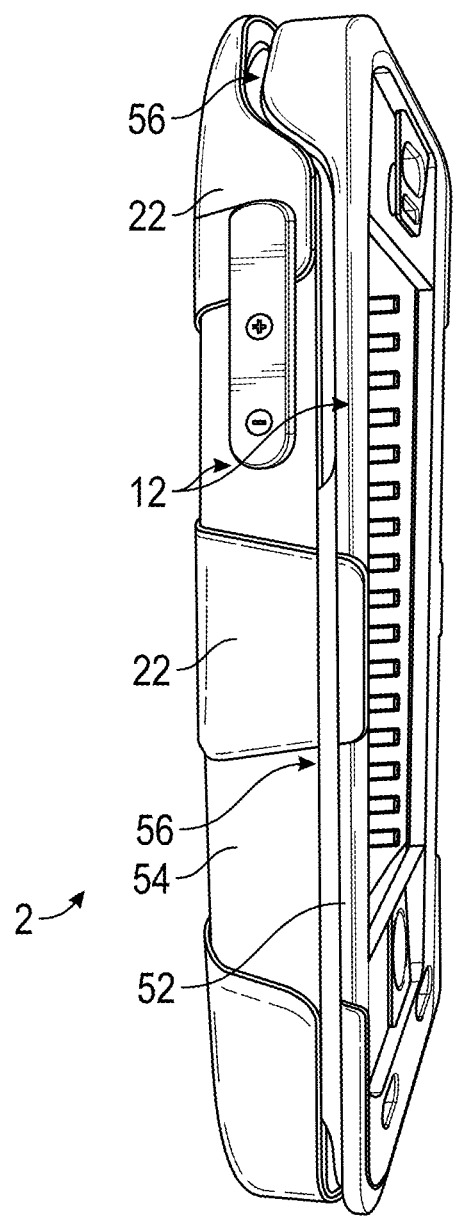
Figure 19:
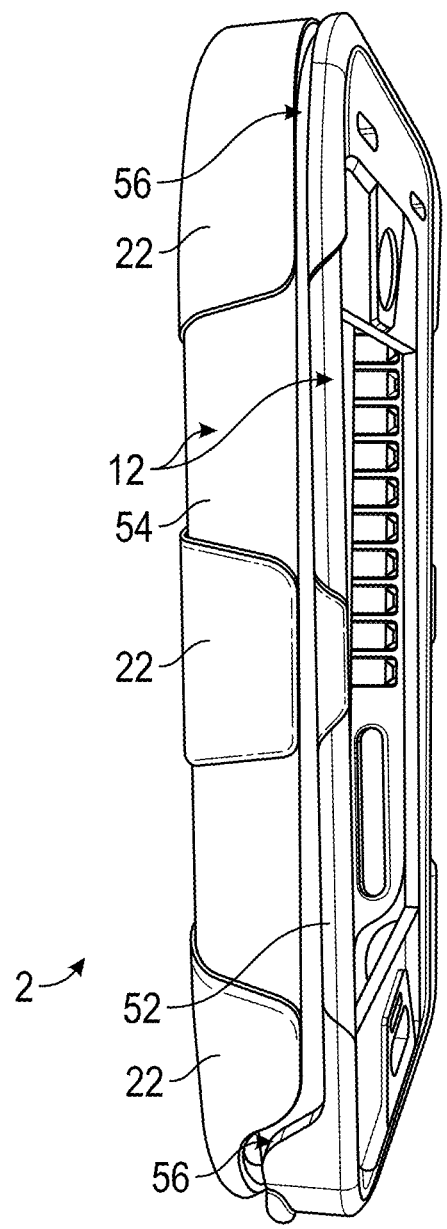
Figure 20:
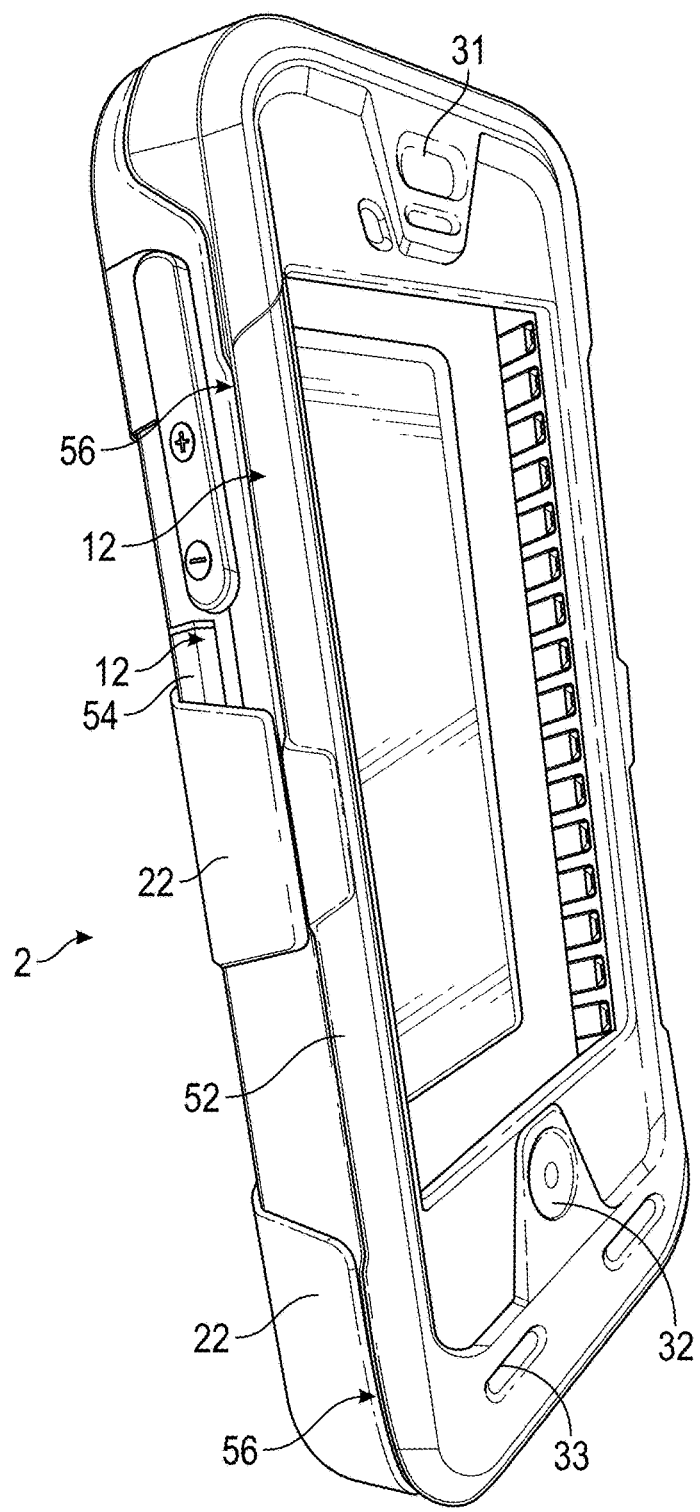
Figure 21:
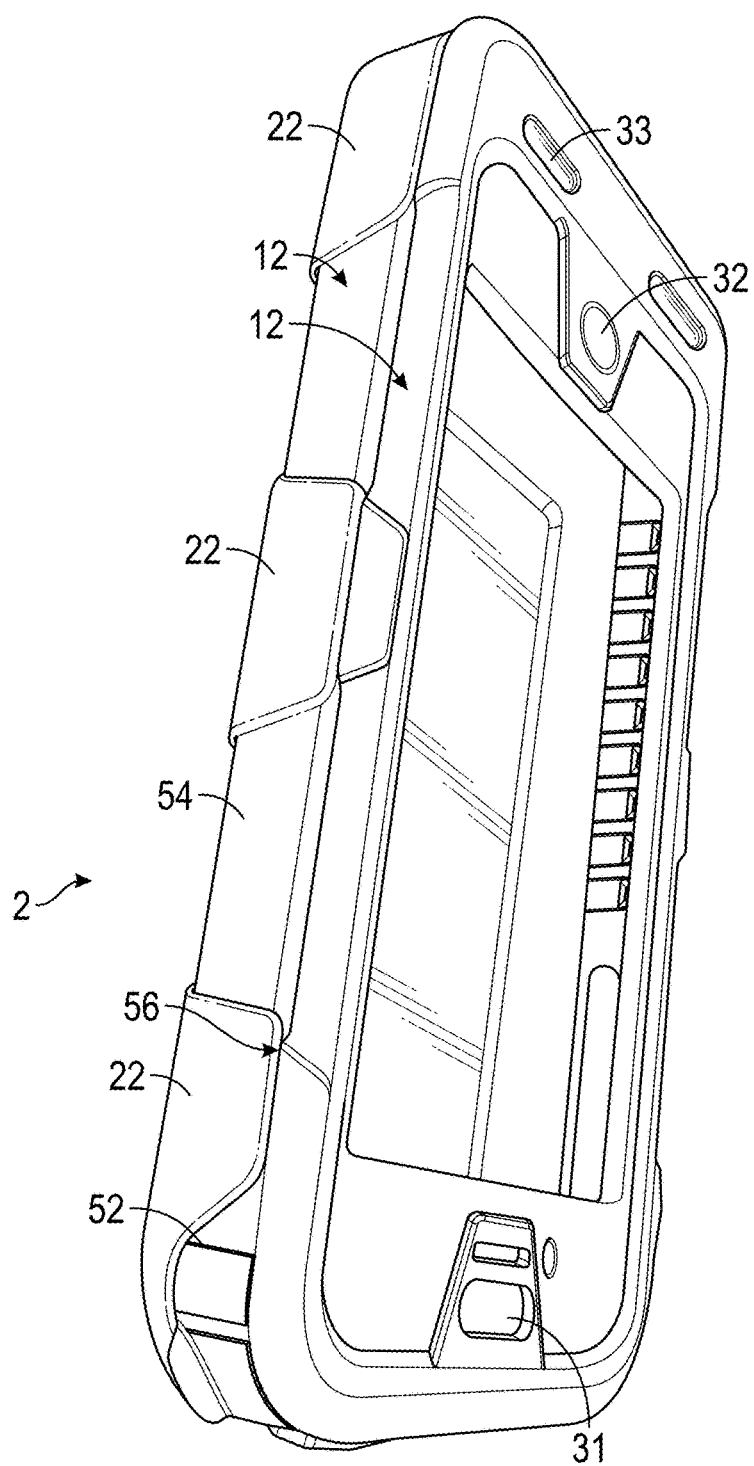
Figure 22:
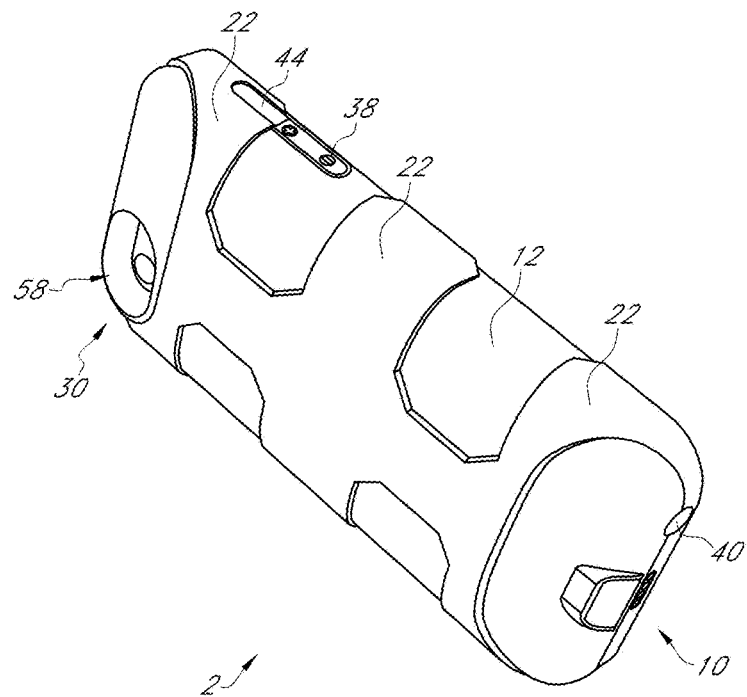
FIG. 22 illustrates an example embodiment of a protective case with a mobile device.
Figure 22:
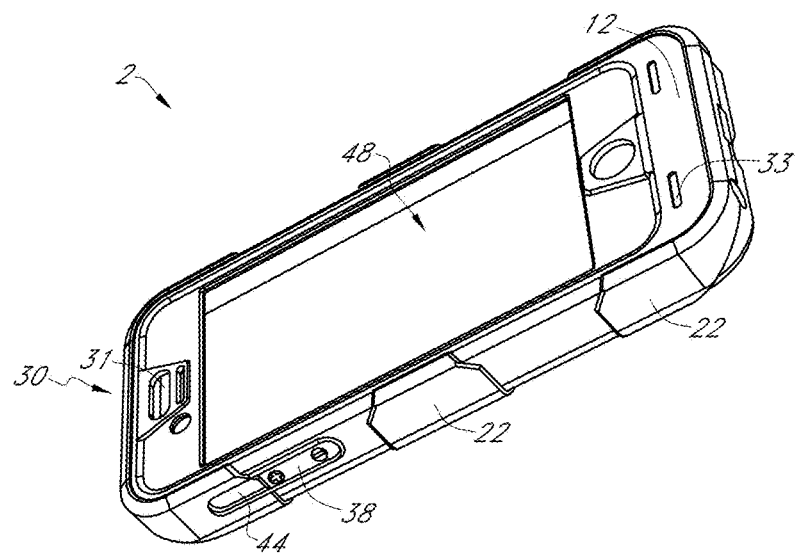
Figure 23:
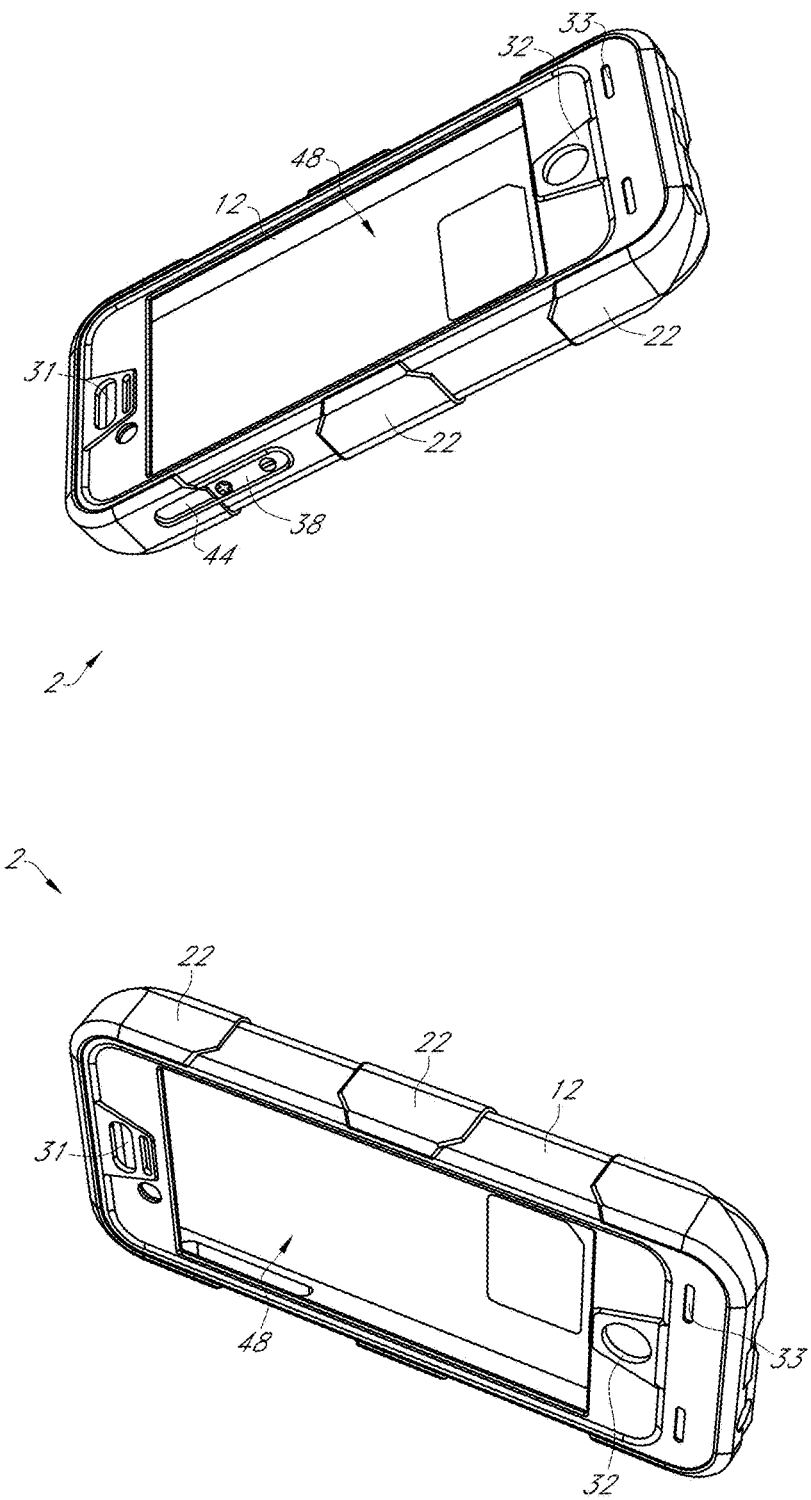
FIG. 23 illustrates an example embodiment of a protective case for a mobile device.
Figure 24:
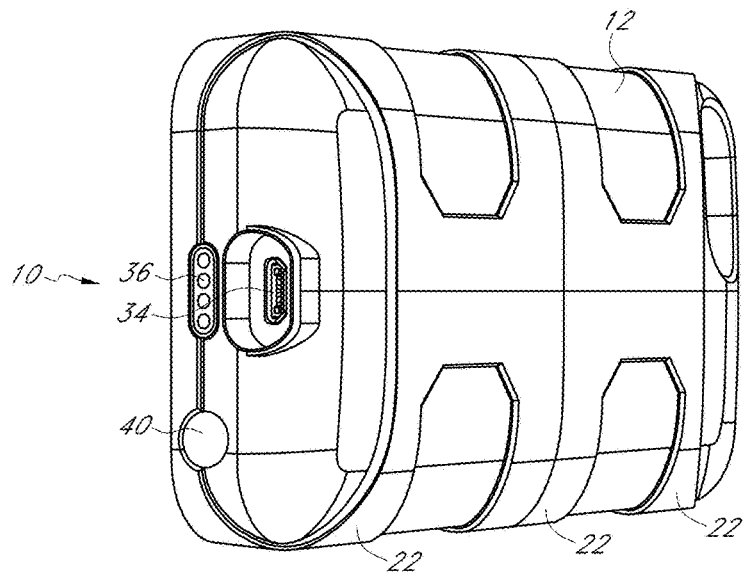
FIG. 24 illustrates an example embodiment of a protective case for a mobile device.
Figure 24:
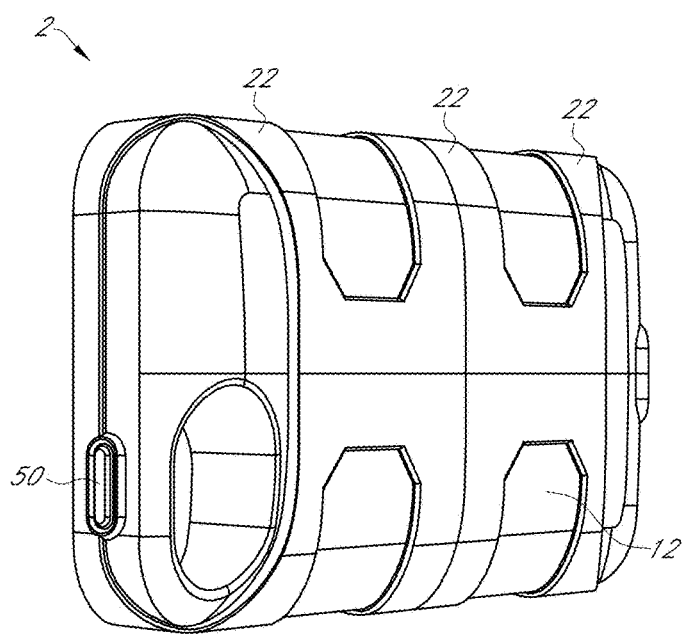
Figure 25:
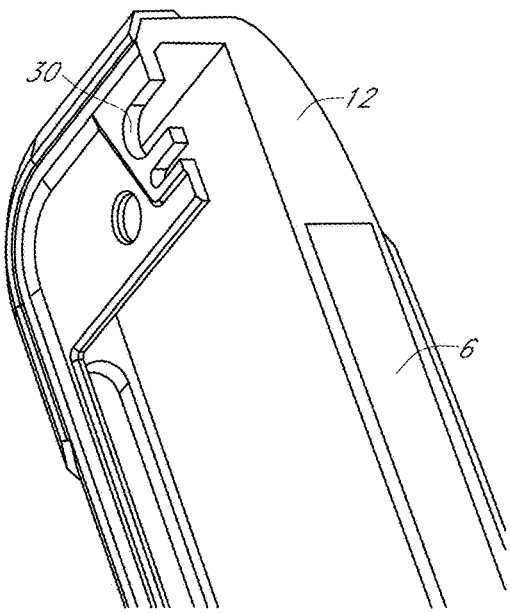
FIG. 25 illustrates cross-sectional views of an example embodiment of a protective case for a mobile device.
Figure 25:
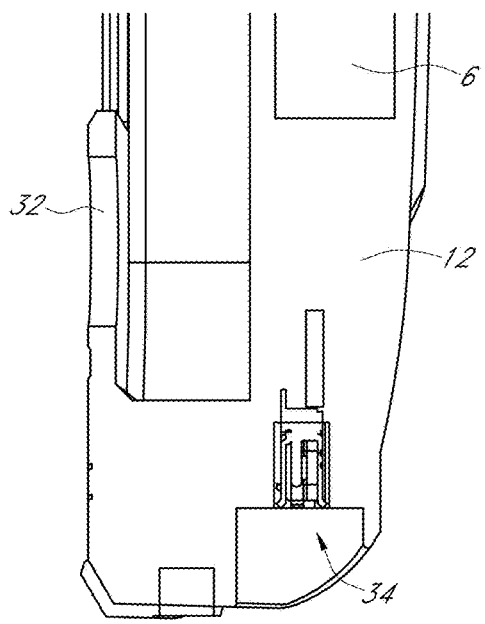
Figure 26:
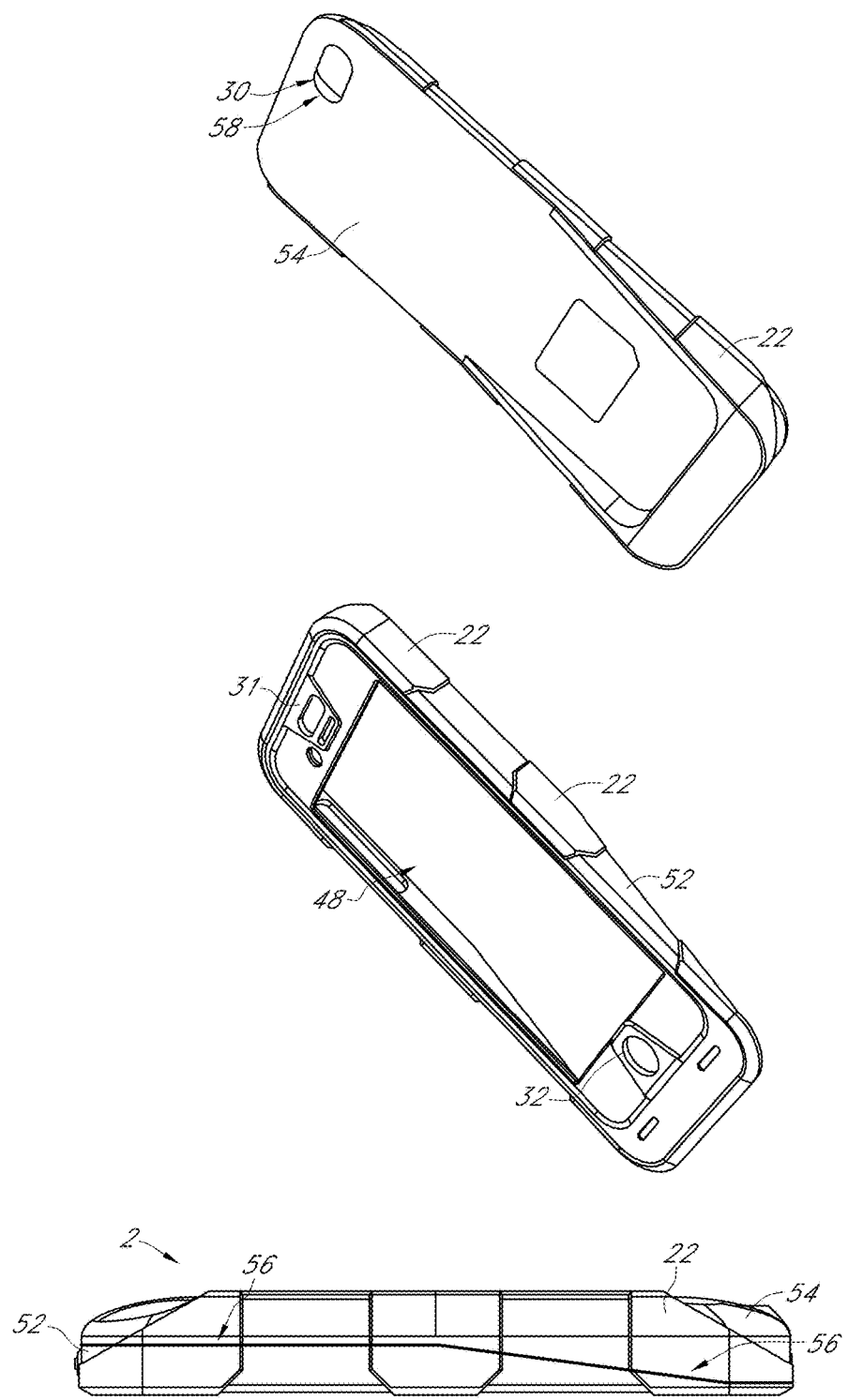
FIG. 26 illustrates an example embodiment of a protective case for a mobile device.
Figure 27:
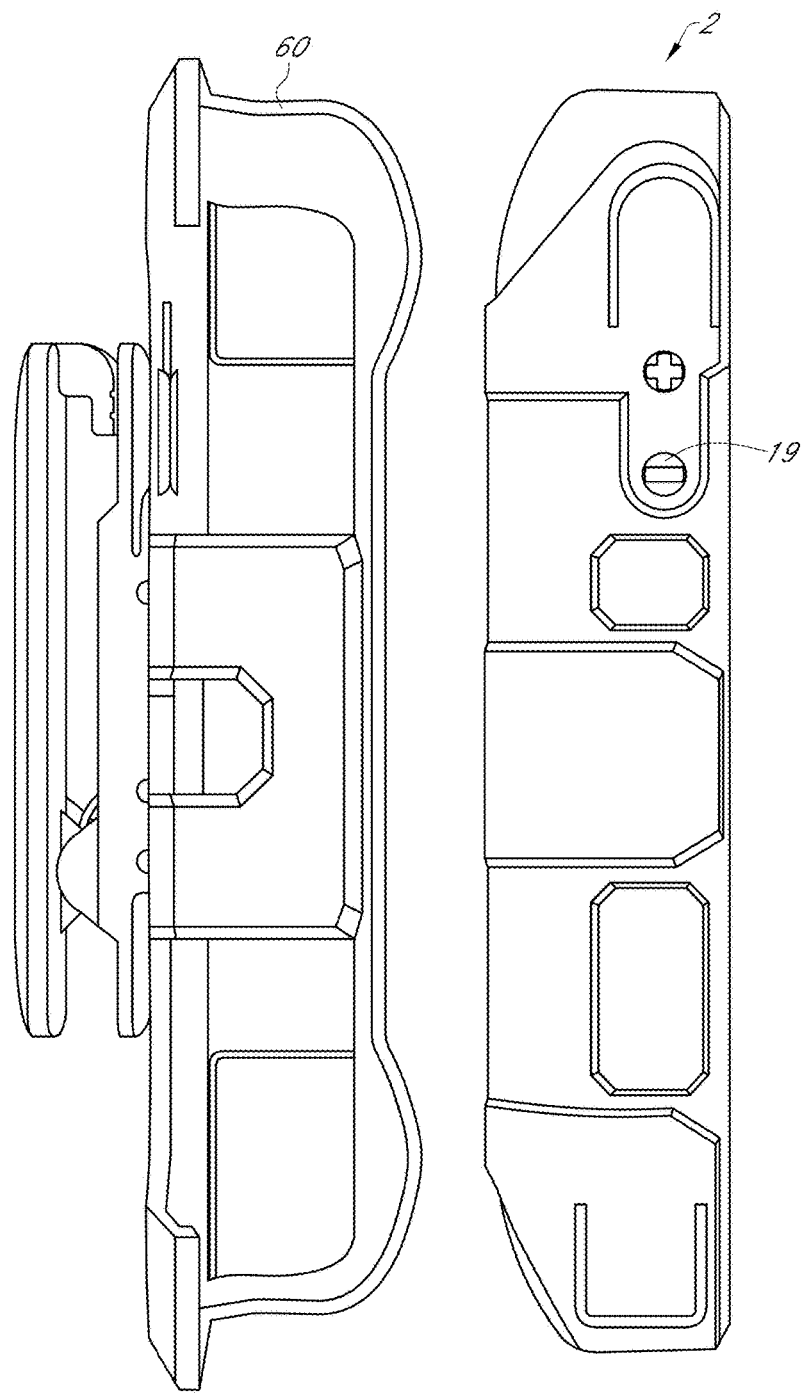
FIG. 27 illustrates an example embodiment of a belt clip and protective case for a mobile device.
Figure 28:
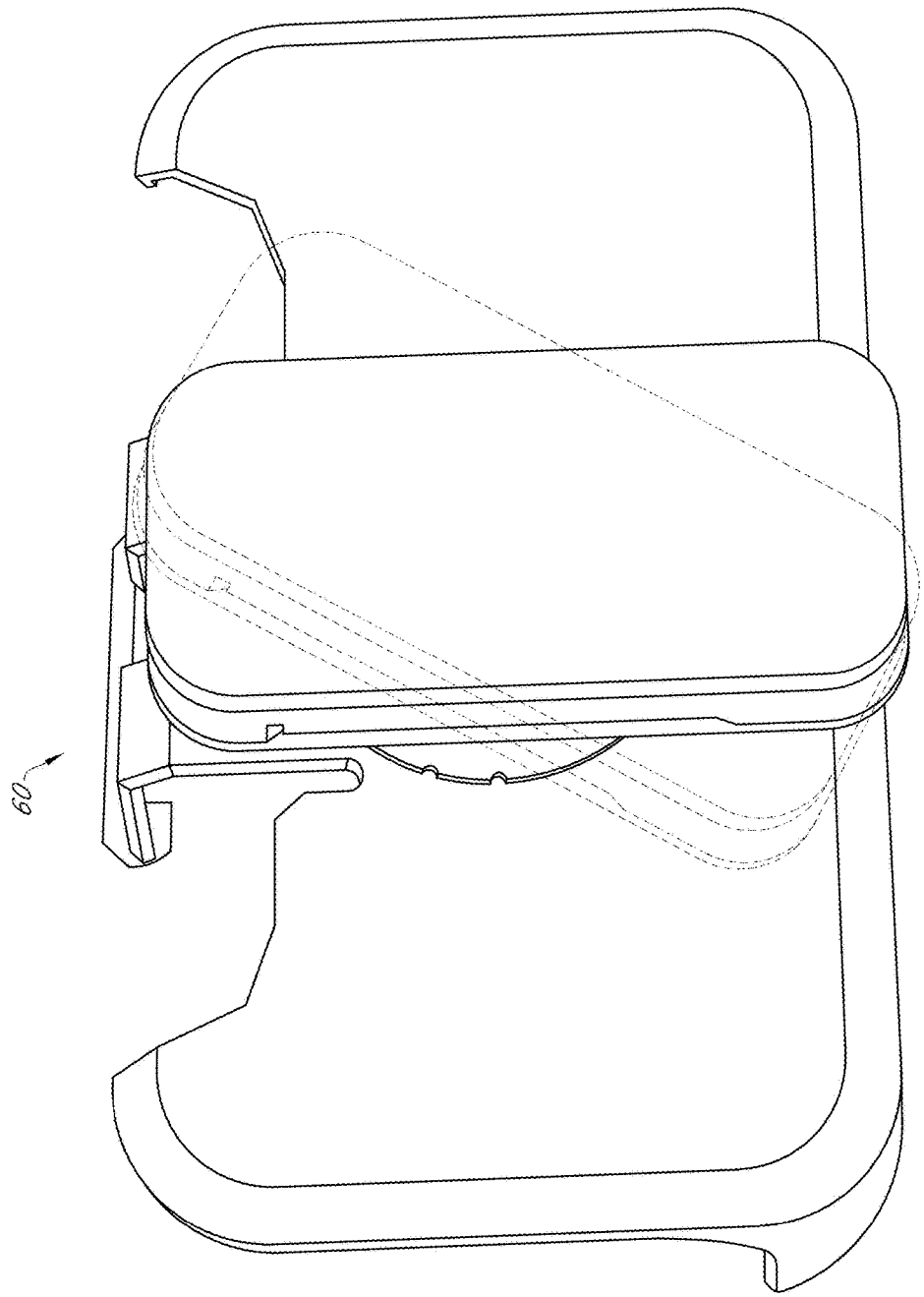
FIG. 28 illustrates an example embodiment of a belt clip and protective case for a mobile device.

FIG. 13 is an inside view of an example embodiment of a main housing 54 of a case 2. FIG. 14 shows the inside of an example embodiment of a top cover 52 and a main housing 54 of a case 2. FIG. 15 shows the outside of an example embodiment of a main housing 54 and a top cover 52 of a case 2. FIGS. 16 and 17 are enlarged views of the inside of example embodiments of a main housing 54 and top cover 52 of a case 2. FIGS. 18-21 illustrate example embodiments of a top cover 52 and a main housing 54 of a case 2. FIGS. 22-24 illustrate various views of an example embodiment of a case 2 with over molded impact absorbing regions 22. FIG. 25 illustrates cross-section side views of an example embodiment of a case 2 having a battery 6. FIG. 26 illustrates an example embodiment a top cover 52 and a main housing 54 that can be connected at a part line 56. FIG. 27 illustrates an example embodiment of a belt clip 60 and a case 2. FIG. 28 illustrates an example embodiment of a belt clip 60 for use with a protective case 2.

FIG. 13 illustrates a connecting flange 68 of the main housing 54 as discussed herein. The connecting flange 68 can be formed from two parallel walls rising toward the top cover 52 when the top cover 52 and the main housing 54 are engaged. FIG. 16 illustrates the connecting flanges 68 can have slots 72 as discussed herein. FIG. 17 illustrates the top cover wall 73 can have locking knobs 76 as discussed herein. In some embodiments, the top cover wall 73 can engage or nest between the two parallel walls of the connecting flange 68 to secure the relative positions of the main housing 54 and top cover 52. The locking knobs 76 can engage, mate, and/or interlock with the slots 72 as discussed herein to secure the top cover 52 with the main housing 54.

In some embodiments, the rigid case portion 12 is comprised of multiple pieces as illustrated, for example, in FIGS. 4-6 13-15, 18-21, and 26. The multiple pieces can connect as discussed herein and include one or more gaskets (e.g., a first or main gasket) 16 as illustrated in FIGS. 4, 13 and 14 to maintain moisture and dust resistance. As illustrated in FIG. 26, the case 2 can have a top cover 52 and a main housing 54. The main housing 54 can be waterproof or water resistant. An interior for housing the mobile device 4 within the case 2 can be formed and can be sealed from the external environment when the top cover 52 and the main housing 54 are joined or connected as discussed herein. The top cover 52 and the main housing 54 can form the case or shell 2, having a part line 56 between the top cover 52 and the main housing 54 as illustrated, for example, in FIGS. 18-21 and 26. The part line 56 can be fully sealed with a gasket 16 (sometimes referred to as a main gasket 16). The main gasket 16 can be over molded onto the rigid case portion 12 (e.g., onto the main housing 54 or the top cover 52). The gasket 16 can be separately formed and adhered, or otherwise coupled, to the main housing 54 or top cover 52.

The main housing 54 can have a camera opening 58 for a camera 59 of the mobile device 4 as shown in FIG. 6. The camera opening 58 can have a film/mesh over the opening 58 for water and dust resistance. Referring to FIG. 4, the main housing 54 may comprise the battery as, for example, illustrated in FIGS. 3 and 25.

The rigid case portion 12 can include one or more gaskets (e.g., a second or screen gasket) 17 to form a water-tight seal around a touch screen 26 of a mobile device 4, membrane 28, or transparent member 66. The screen gasket 17 can be over molded onto the rigid case portion 12 (e.g., the top cover 52). The screen gasket 17 can be separately formed and adhered or otherwise coupled to the top cover 52.

The rigid case portion 12 can include pass-through holes 18, as for example shown in FIG. 4, to allow access to controls and ports on the mobile device 4 (e.g., volume control 41, power button 51, mute switch 46, home button 24, micro-USB port, and headphone port 42).

The case 2 can allow or permit access to controls on the front of a device 4, including a home button 24 and/or a touch screen 26 as illustrated, for example, in FIG. 5. The touch screen 26 can be protected with a waterproof gasket 17 as illustrated, for example, in FIG. 3 and/or a membrane 28 as illustrated, for example, in FIG. 4, that allows inputs on the front of the membrane 28 to be passed through to the touch screen 26. In some embodiments, an inductive, capacitive, or tactile touchscreen 26 will register inputs through the membrane 28 without substantial impedance.

The case 2 can have sensor cutouts or openings 30 for sensors of the mobile device 4. The sensor cutouts or openings 30 can be sealed with mesh/film as discussed herein. The mesh/film (e.g., watertight material) can be connected or attached (e.g., adhered as discussed herein) on inside/interior surfaces of the rigid case portion 12 to seal the cutouts/openings 30 such as, for example, a speaker port 31, audio/microphone ports 33, and a noise canceling microphone port 37. In some embodiments, the mesh/film material can be, for example, expanded (e.g., stretched) polytetrafluoroethylene (e.g., Gore-Tex®). Materials such as expanded polytetrafluoroethylene can provide water and dust resistance while allowing audio vibrations through for the speakers and microphone of the mobile device 4. The case 2 can have an over molded home button cover 32 for depressing the home button 24 of the mobile device 4. The home button cover 32 can be over molded over the rigid case portion 4 as discussed herein.

In some embodiments, the case 2 can have two external interfaces 10 as illustrated, for example, in FIG. 24. The case 2 can have a micro USB input 34 and charge pad input 36. In some embodiments, the case 2 can have light emitting diodes (LEDs) in addition or in place of charge pad inputs 36. The LEDs can indicate, for example, a charge status or level of the supplemental battery 6 of the case 2.

The case 2 can have over mold pass through buttons 38 to access controls and ports on the mobile device 4 as discussed herein. An auxiliary port 40 can provide access to a headphone port 42 of the mobile device 4 shown in FIG. 4.

Figure 7:
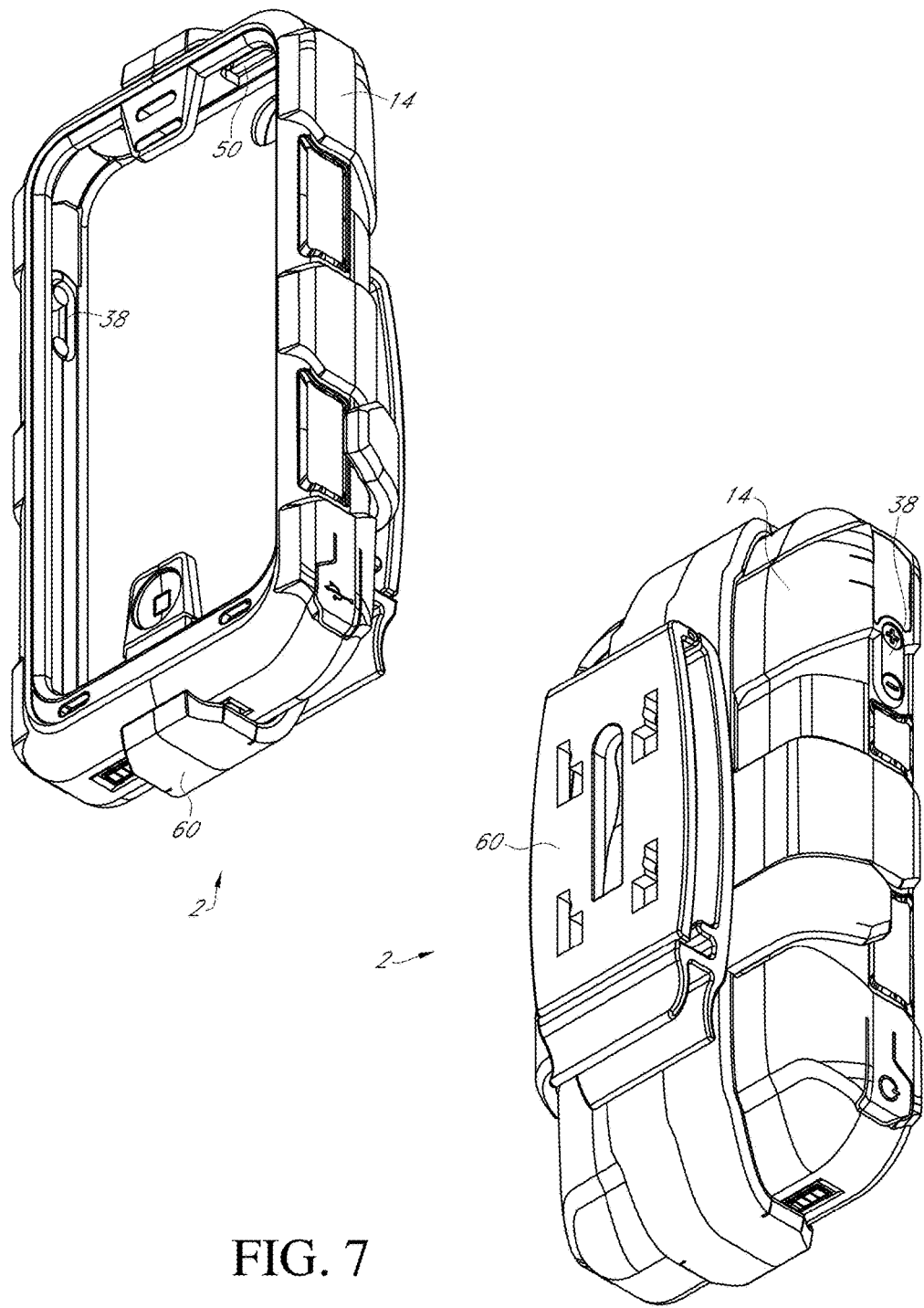
FIG. 7 illustrates an example embodiment of a belt clip and protective case for a mobile device.
Figure 8:
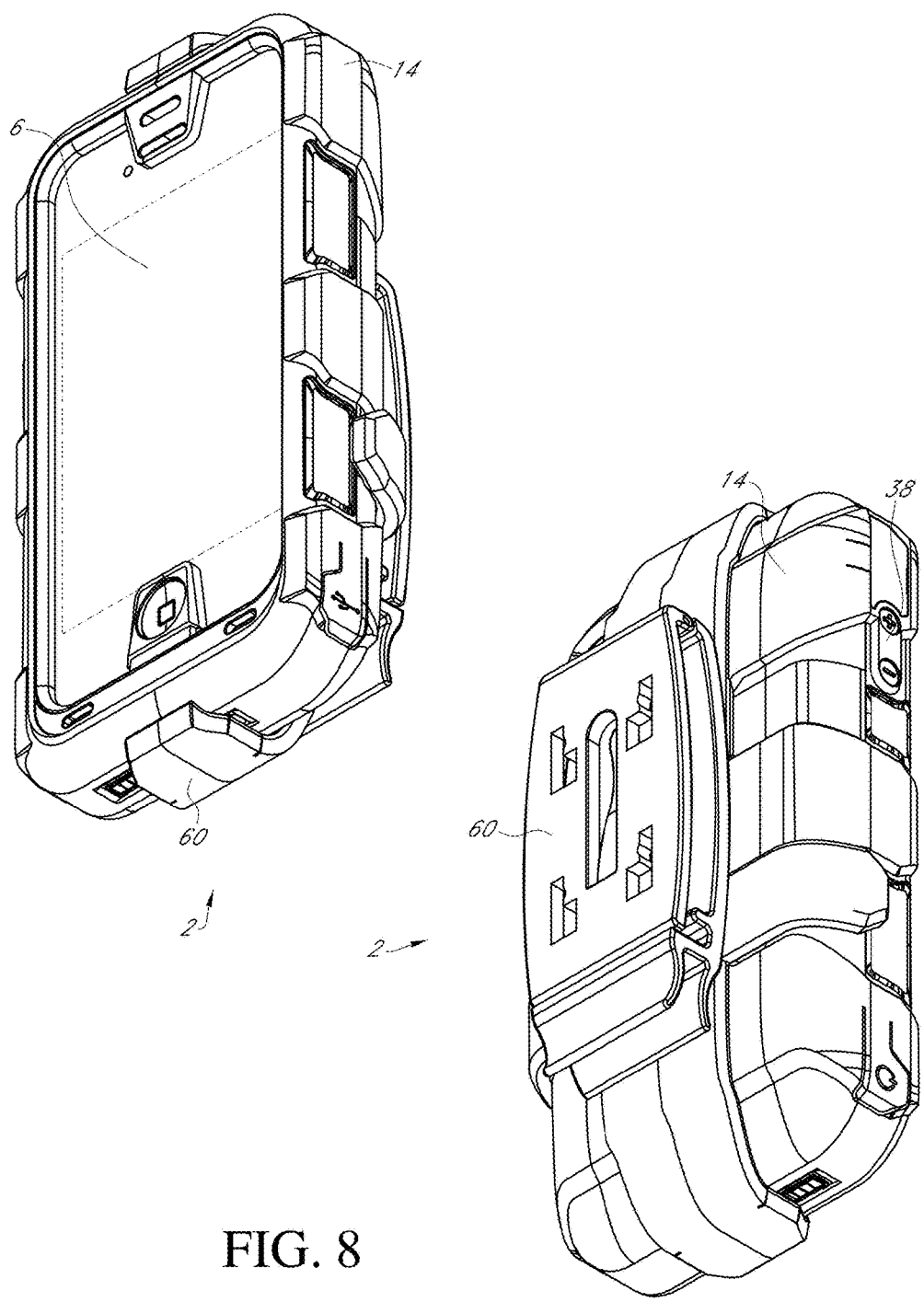
FIG. 8 illustrates an example embodiment of a belt clip and protective case with a mobile device.
Figure 9:
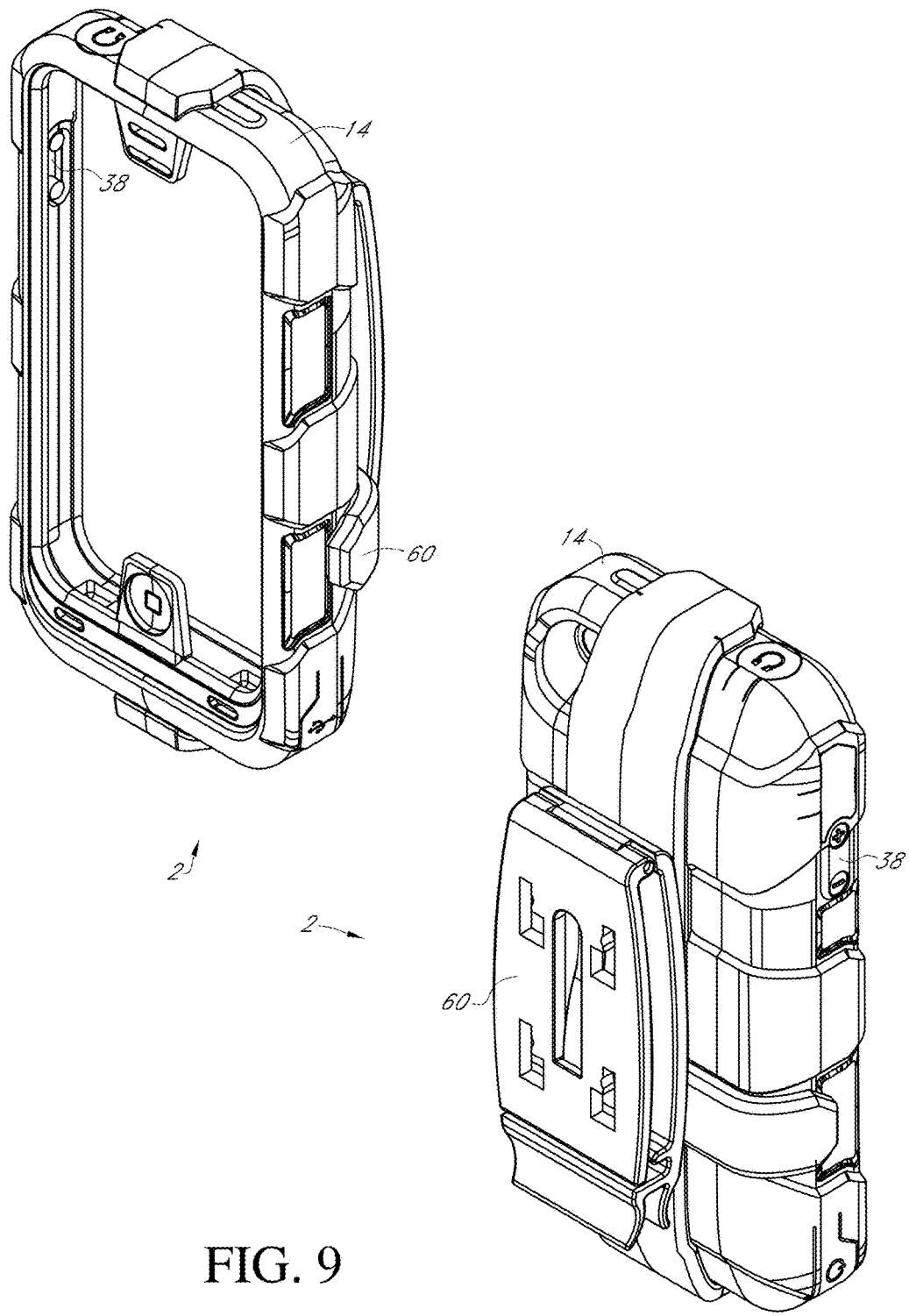
FIG. 9 illustrates an example embodiment of a belt clip and protective case for a mobile device.
Figure 10:
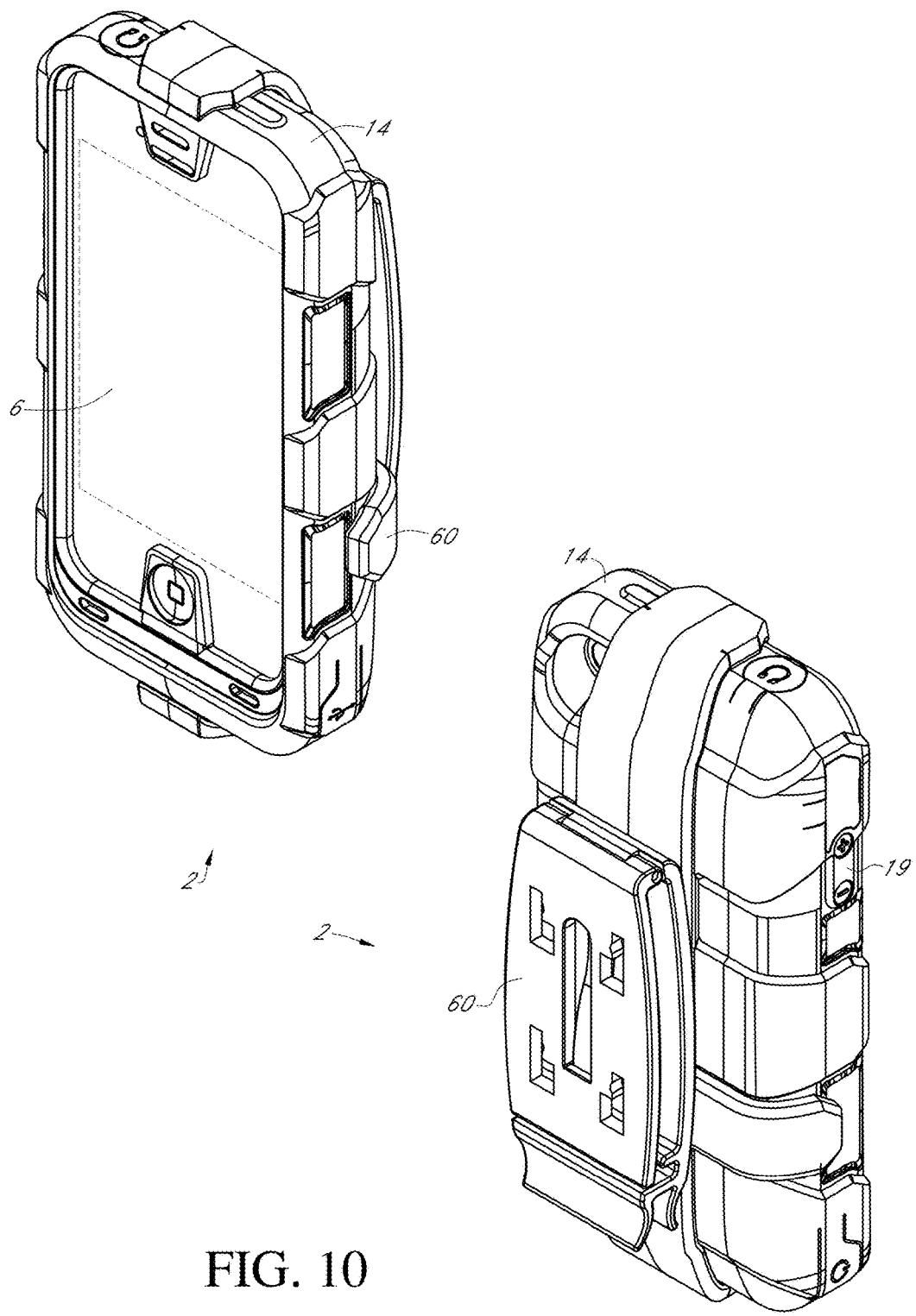
FIG. 10 illustrates an example embodiment of a belt clip and protective case with a mobile device.
Figure 11:
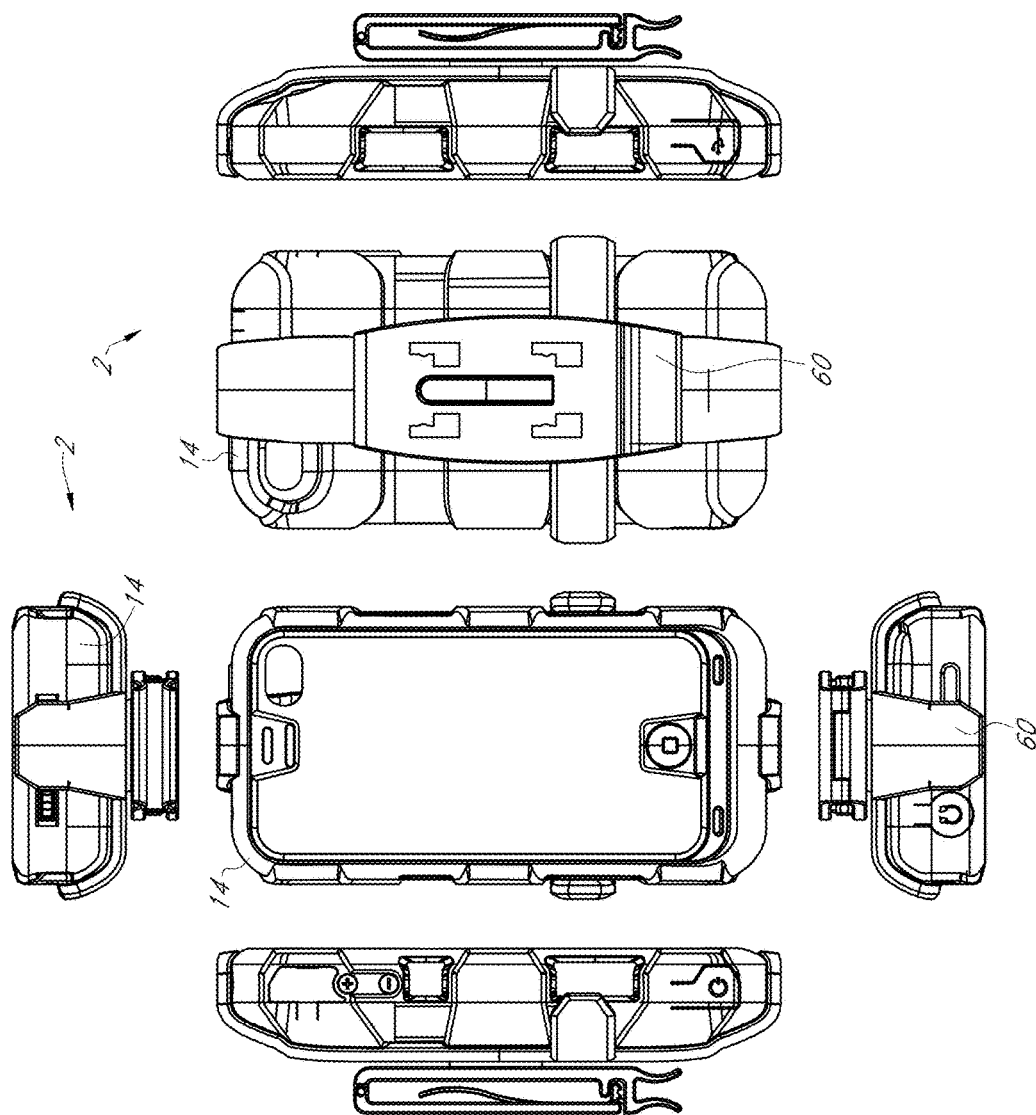
FIG. 11 illustrates an example embodiment of a belt clip and protective case for a mobile device.
Figure 12:
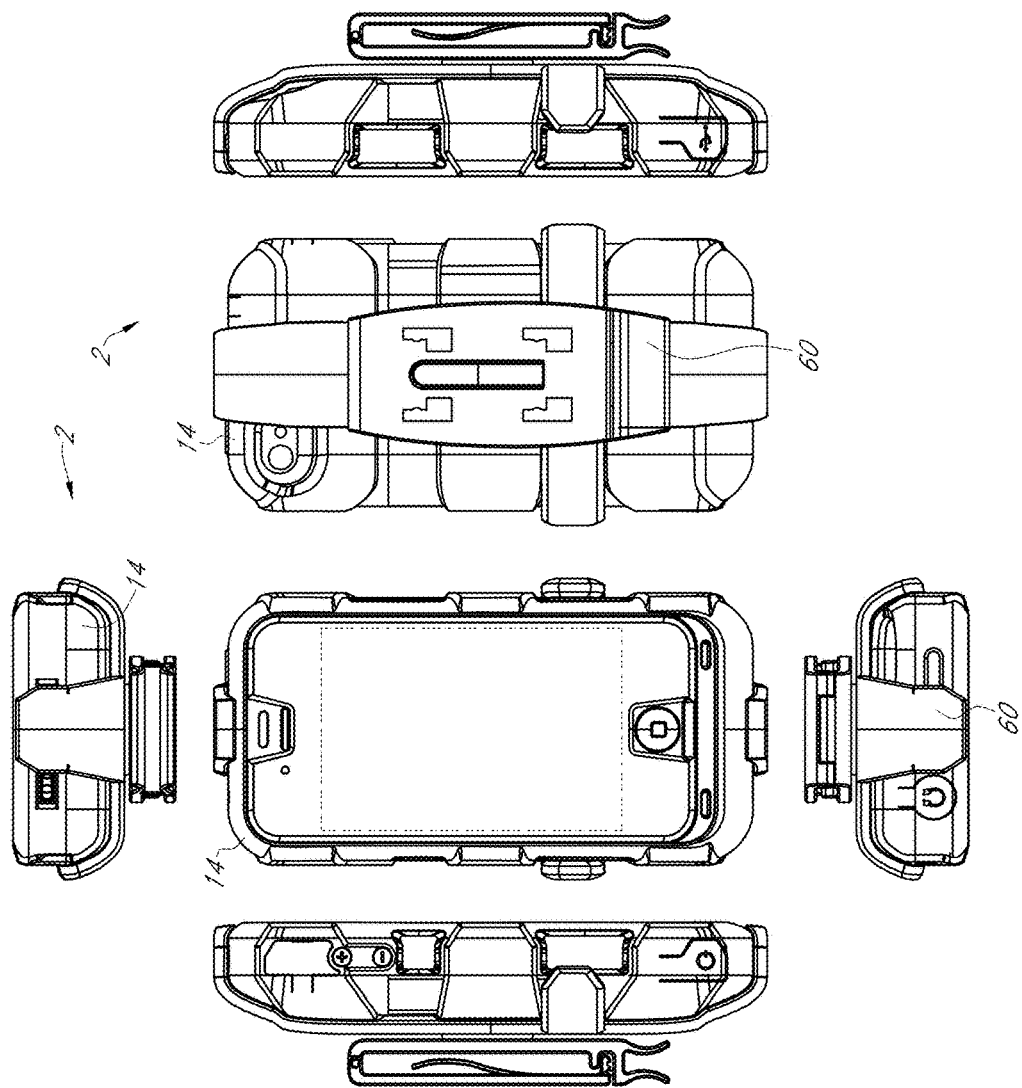
FIG. 12 illustrates an example embodiment of a belt clip and protective case with a mobile device.

As illustrated in, for example, FIGS. 7 and 24, the case 2 can have a pass through button 50 (e.g., a double injection pass through power button 50) for pressing a power button 51 of the mobile device 4 as shown, for example in FIG. 4. As illustrated in FIG. 25, a wall of the rigid case portion 12 can be around the USB input port 34 to allow for the use of an O-ring type of gasket seal to provide water and dust resistance as discussed herein, and in particular in reference to FIGS. 41A and 41B. As illustrated in, for example, FIGS. 22 and 23, the case 2 can have a thin membrane area 44 for covering, for example, a mute switch 46 of the mobile device 4. The case 2 can have a rectangular opening 48 for the touch screen 26 of the mobile device 4 shown in FIG. 4.

FIGS. 7-12, 27, and 28 illustrate a belt clip 60 that can keep the case 2 securely on, for example, a hip of a user. In some embodiments, the case 2 can include a standby switch 62 to allow a user to choose when the battery 6 of the case 2 charges the mobile device 4. The case 2 can include light emitting diodes (LEDs) that indicate a remaining power of the battery 6. In some embodiments, the battery can be rechargeable for over 500 full cycles, with partial charges not counting as full cycles. In some embodiments, the dimensions of the case can be about 5.26 in×2.78 in×1.02 in. The case 2 can occupy a volume of between about 10 cubic inches and about 20 cubic inches, or of about 15 cubic inches. The exterior shape of the protective case 2 can generally conform to the shape of the mobile device 4. The battery capacity can be between about 2,000 mAh and about 3,000 mAh, or about 2,500 mAh.

As discussed herein, the case 2 can include various features, such as a waterproof speaker cover, waterproof microphone cover, waterproof button, crush resistance, impact resistance, lithium ion batteries, LED indicators, NFC capabilities, NFC boost antenna (see e.g., U.S. Provisional Patent Application No. 61/696,139 and U.S. patent application Ser. No. 14/014,095), three-part case, and/or clam-shell case design. The impact resistance can exceed military specifications (e.g., MIL-STD 810G). The embodiments discussed herein can offer splash and rain protection, sand and dust protection, impact and drop protection, and/or vibration and shock protection.

Figure 29:
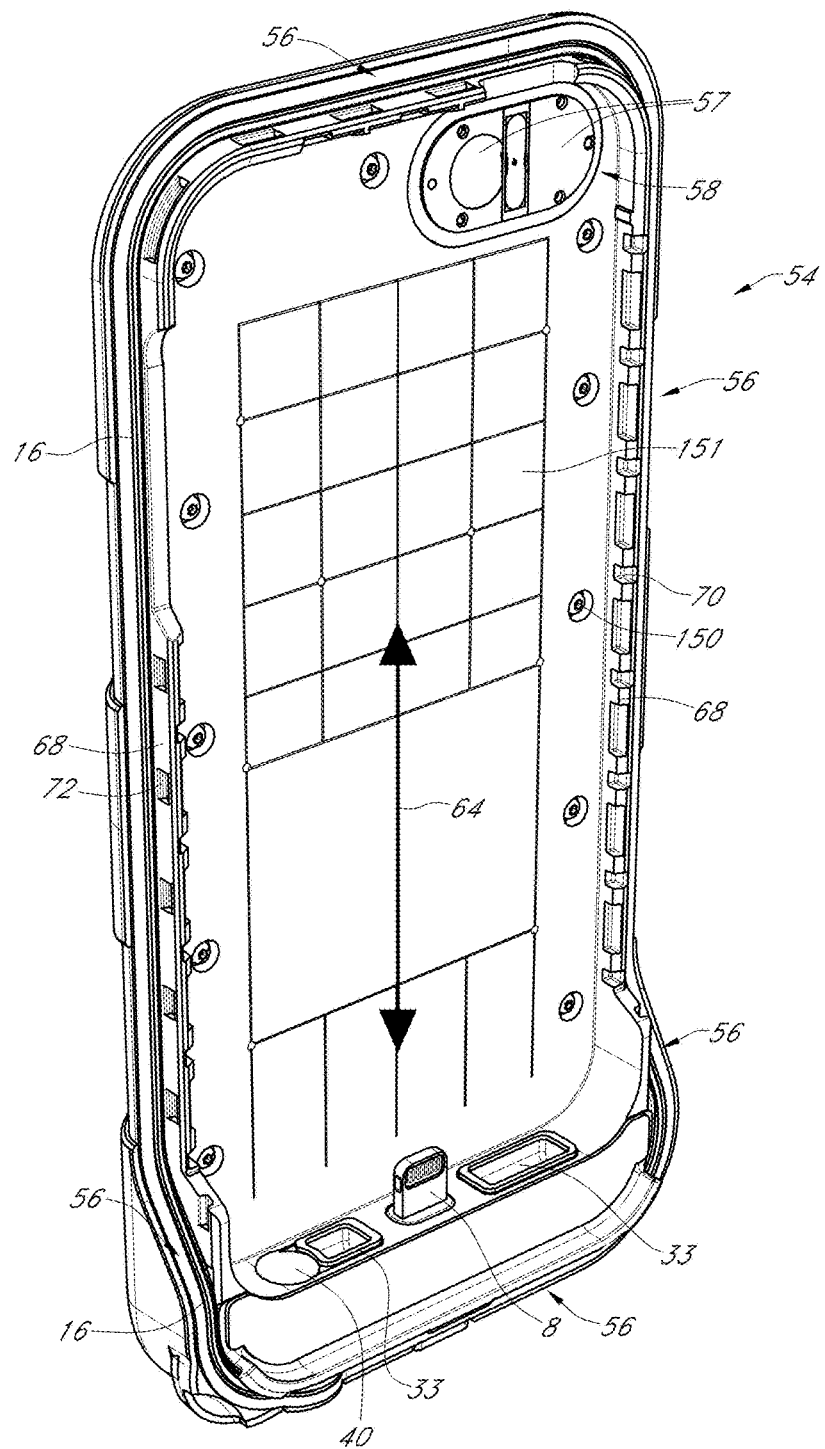
FIG. 29 illustrates an example embodiment of a main housing portion of a protective case.
Figure 30:
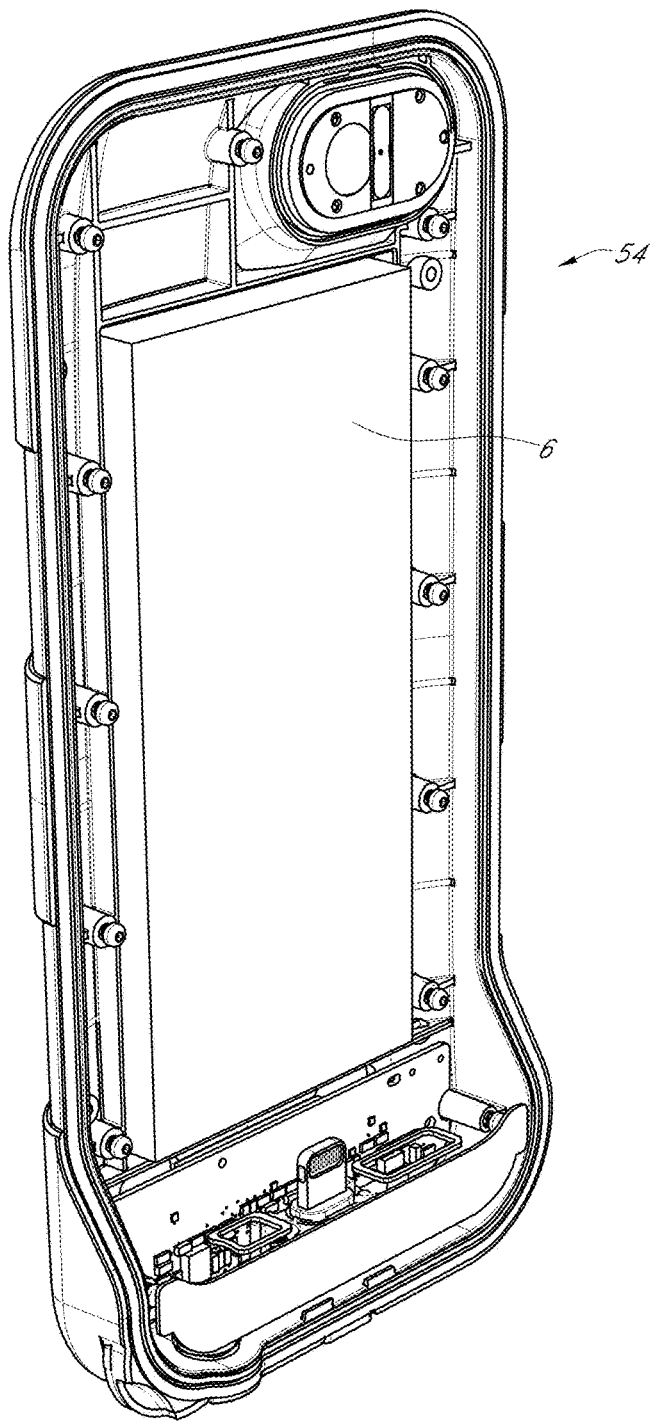
FIG. 30 illustrates the main housing portion of FIG. 29 with a battery cover removed.

FIG. 29 illustrates a side, top, perspective view of an example embodiment of main housing 54. The main housing 54 can have a battery cover 151 (e.g., mobile device positioner as discussed in reference to FIG. 49). The battery cover 151 can separate the mobile device 4 and the battery 6 within the main housing 54. The battery cover 151 can be connected to the main housing 54 with screws 150, fasteners, adhesive, and/or any other suitable methods. The battery cover 151 can be sized and shaped to facilitate the insertion and removal of the mobile device 4 as discussed herein (e.g., along a travel direction 64 of the mobile device 4). The battery cover 151 can have padding (e.g., soft padding) positioned (e.g., adhered or otherwise attached) to provide a soft contact surface for the mobile device 4 when the mobile device is in the case 2. FIG. 30 illustrates the main housing 54 with the battery cover 151 removed for illustration purposes.

Referring to FIG. 23, the main housing 54 can have an internal interface 8 that is electrically connected or coupled to the battery 6. The internal interface 8 can interface or electrically connect/couple to an interface of the mobile device 4. The internal interface 8 can be oriented generally along a travel direction 64 of the mobile device 4. The mobile device 4 can be inserted and removed from the case 4 (e.g., main housing 54) along the travel direction 64 of the mobile device 4.

A part line 56 of the main housing 54 can undulate as illustrated in FIG. 29. The gasket 16 can follow the path of the part line 56, and the discussion herein regarding the shape and path of the part line 56 also applies to the shape and path of the gasket 16. The part line 56 can be defined as an outline of where the main housing 54 and a top cover 52 meet or join when the main housing 54 and the top cover 52 are assembled to form the case 2. The part line 56 is formed from the corresponding perimeters or peripheries where the main housing 54 and the top cover 52 directly interface, engage, connect, abut, and/or join to form the form the case 2.

The part line 56 and/or gasket 16 can undulate or transition about the periphery or perimeter of the main housing 54 to facilitate or allow the movement of the mobile device 4 along the travel direction 64 relative to the main housing 54. In particular, the part line 56 recedes toward the exterior of the main housing 54 (e.g., exterior of the case 2 on which impact absorbing regions 22 are positioned on as discussed herein) at a distal portion of the main housing 54 relative to the internal interface 8. Stated differently, the part line 56 relative to the main housing 54 generally recedes away from the top cover 52 proximate to the internal interface 8.

As the part line 56 approaches the internal interface 8, the part line 56 undulates away from the exterior of the main housing 54 (e.g. toward the top cover 52). The part line 56 undulates away from the exterior of the main housing 54 to, for example, accommodate electronics and features of the case 2 that are, for example, positioned in the main housing 54. The electronics and features can include the internal interface 8, audio ports 33, the auxiliary port 40, and/or the like.

The part line 56 can undulate away or toward (depending on direction along the travel direction 64) the exterior of the main housing 54 (or vice versa relative to the exterior of the top cover 52) at any position along the side of the main housing 54 (or top cover 52) parallel to the travel direction 64. For example, as shown in an embodiment illustrated in FIGS. 13-21, the part line 56 can undulate near the distal portion of the main housing 54 relative to the internal interface 8 (e.g., near the power button 50). Such an undulation away or toward the exterior surface of the main housing 54 at the distal portion of the main housing 54 relative to the internal interface 8 allows for linear travel of the mobile device 4 along travel direction 64, while still allowing for the top cover 52 and the main housing 54 to interface as discussed herein to form a water and/or dust resistant case 2. Such an arrangement allows for a substantially linear engagement between the internal interface 8 and an interface of the mobile device 4 without having to tilt internal interface 8 to meet the interface of the mobile device 4 (e.g., the mobile device 4 is inserted into the main housing 54 at an angle relative to the battery cover 151). A first portion of the gasket 16 (e.g., the portion of the gasket near the bottom of FIG. 29) can be disposed between the internal interface 8 and the top cover 52, and a second portion of the gasket 16 (e.g., the portion of the gasket near the top of FIG. 29) can be disposed between the internal interface 8 and the main housing 54. With the case 2 oriented such that the touchscreen 26 of the mobile device 4 would face forward, the first portion of the gasket 16 can be disposed above the internal interface 8 and rearward of the internal interface 8, and the second portion of the gasket 16 can be disposed below the internal interface 8 and forward of the internal interface 8.

As illustrated in FIG. 29, the main housing 54 can have a camera opening 58. In some embodiments, the camera opening 58 can be covered from inside of the main housing 54 (relative to the mobile device 4 being inside the main housing 54 or the case 2). The camera opening 58 can be covered by one or more lenses 57. The one or more lenses 57 can be of sufficient clarity to allow photography and/or flash by the camera 59 of the mobile device 4. The lenses can engage, mate, and/or connect with the main housing 54 with a direct connection to form a water and dust resistant seal (e.g., such as discussed in reference to transparent member 66). In some embodiments, there can be one or more gaskets disposed between the one or more lenses 57 and the main housing 54 to form a water and dust resistant seal as discussed herein. The one or more gaskets can be disposed or formed between the one or more lenses 57 and the main housing 54 with any suitable method as discussed herein, including over molding or an adhesive.

Figure 31:
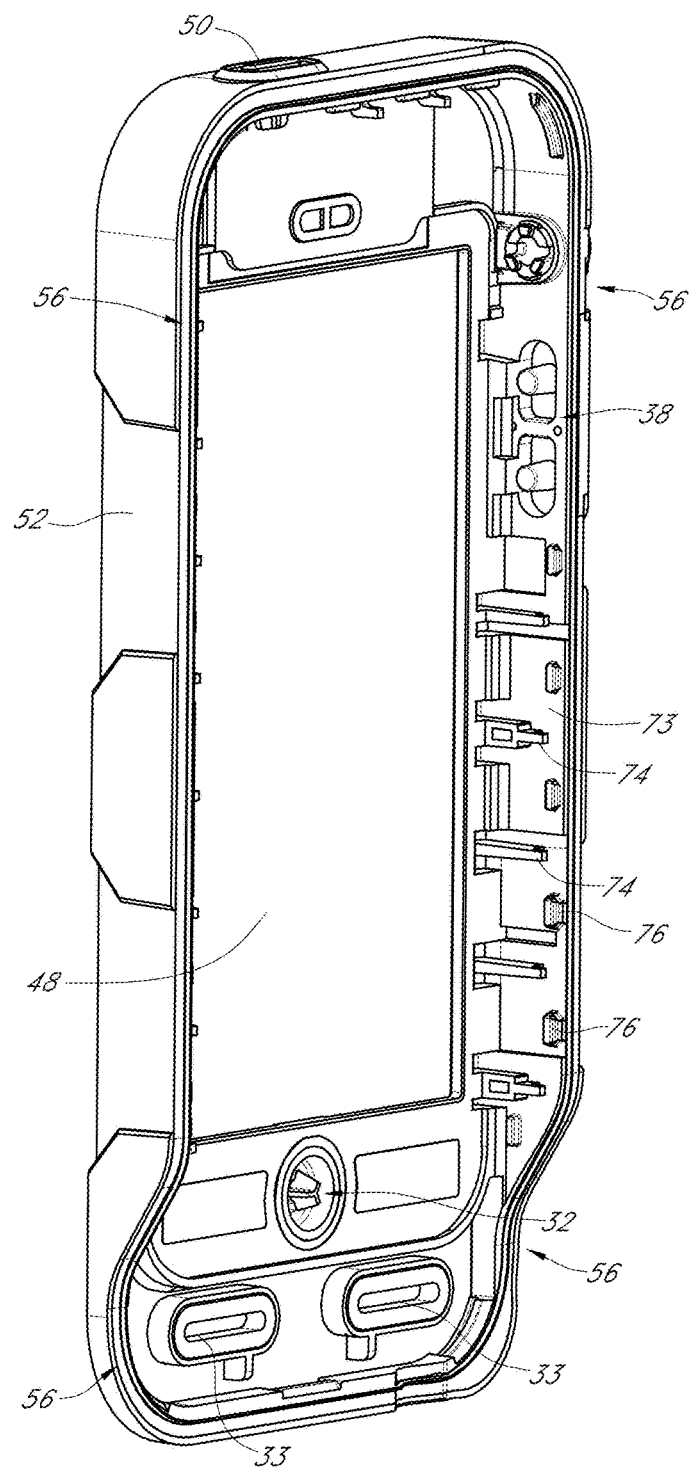
FIG. 31 illustrates an example embodiment of a top cover portion of a protective case.

FIG. 31 illustrates a side, top, perspective view of an example embodiment of a top cover 52. The top cover 52 forms a part line 56 that corresponds to the part line 56 of the main housing 54 as discussed herein. A perimeter or periphery where the main housing 54 and the top cover 52 directly interface, engage, connect, abut, and/or join to assemble the case 2 can form the part line 56 as discussed herein. The part line 56 can undulate or transition about the periphery or perimeter of the top cover 52. The periphery of the top cover 52 can mirror the periphery of the main housing 54. For example, a portion of the top cover 52 proximate to the internal interface 8 where the top cover 52 and the main housing 54 interface undulates or transitions to recede toward the exterior of the top cover 52. Stated differently, the part line 56 relative to the top cover 52 generally recedes away from the main housing 54 proximate to the internal interface 8.

Figure 32:
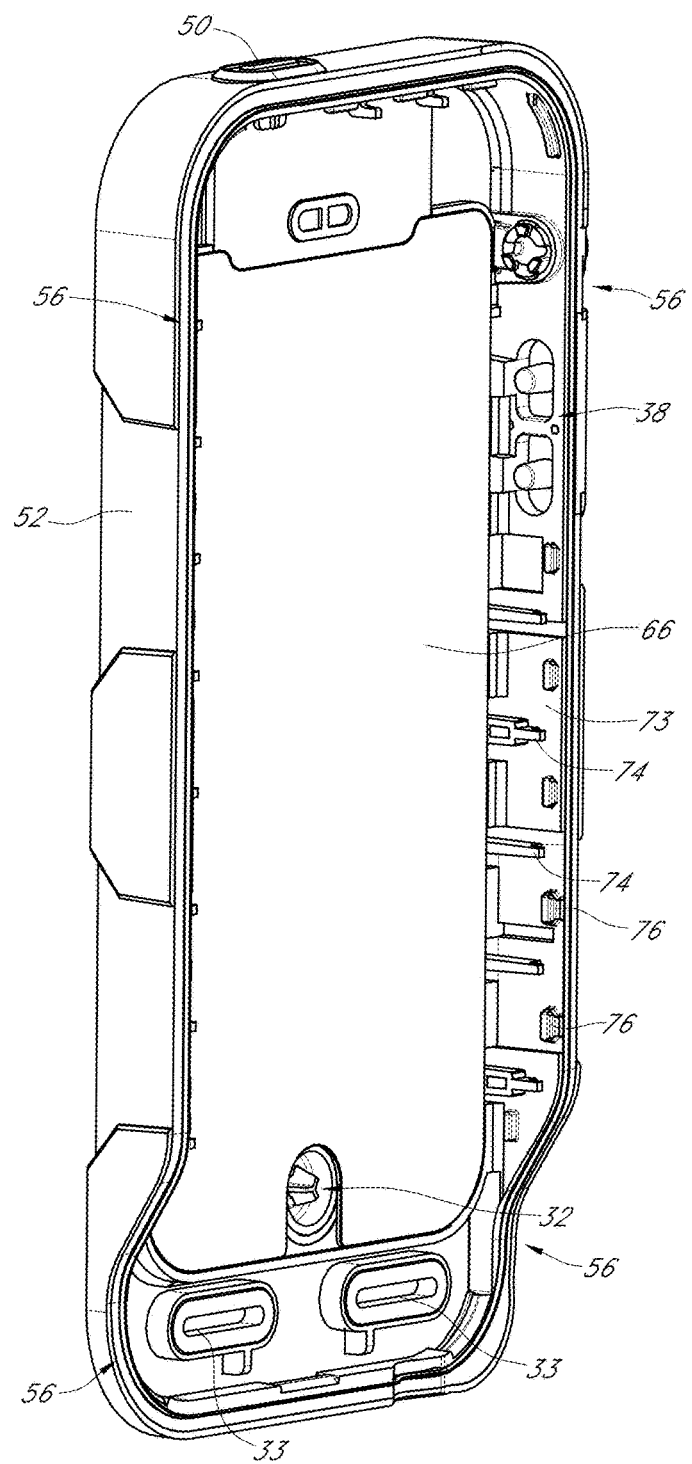
FIG. 32 illustrates an example embodiment of a top cover portion of a protective case having a transparent member coupled thereto.

FIG. 32 illustrates a side, top, perspective view of an example embodiment of a top cover 52. FIG. 32 illustrates a transparent member 66 disposed in the top cover 52. The transparent member 66 can receive input (e.g., touch input) from a user on one side (opposite the touch screen 26) and transfer the touch input to the touch screen 26 of the mobile device 4 such that the touch screen 26 of the mobile device 4 registers the touch input.

In some embodiments, the transparent member 66 is different from the membrane 28 as discussed herein, and in particular, in reference to FIG. 4. For example, the transparent member 66 can be made from different materials than the membrane 28. The transparent member 66 can be made from a rigid material such as rigid plastic or glass (e.g., silicon dioxide ($SiO_2$), sodium oxide ($Na_2O$) from soda ash, calcium oxide, lime (CaO), and/or other suitable materials). The transparent member 66 can enable the touch screen 26 to register the touch input through the transparent member 66 while protecting the touch screen 26 of the mobile device 4. The membrane 28 can be made from flexible plastic material.

The transparent member 66 can be positioned on an interior of the top cover 52. For example, the transparent member 66 can have portions that extend beyond the opening 48 of the top cover 52 and overlap from the inside, certain portions of the top cover 52. In some embodiments, the transparent member 66 can rest against the overlapped portions of the top cover 52 to form a water and dust resistant seal. In some embodiments, the top cover 52 can include a screen gasket that engages and/or mates with the transparent member 66 to form a water and dust resistant seal. In some embodiments, the screen gasket can be over molded onto the top cover 52 or coupled thereto using an adhesive or other suitable coupling element, as discussed herein.

Figure 33:
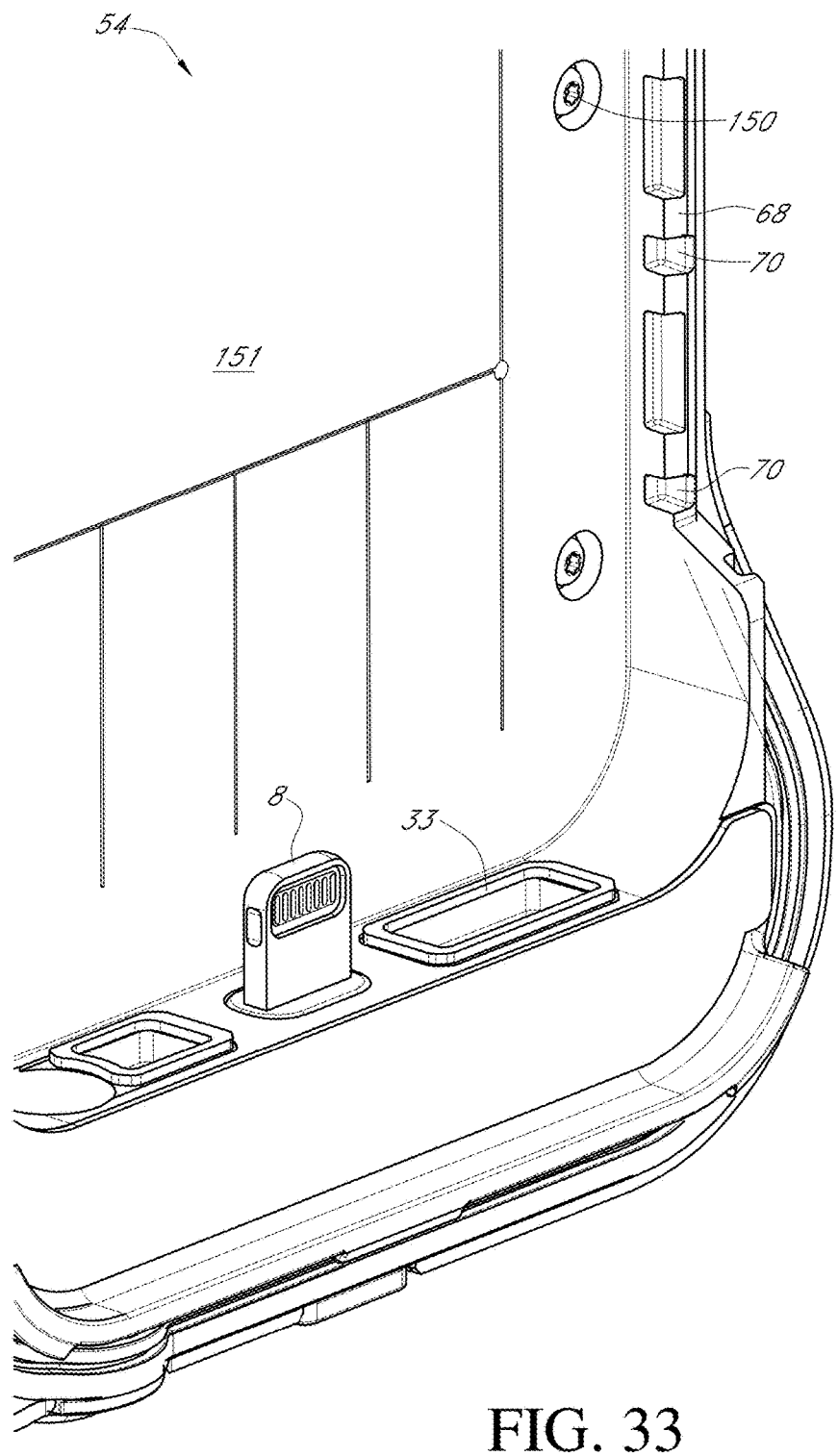
FIG. 33 illustrates an enlarged, side, top, perspective view of an example embodiment of a main housing portion of a case.

FIG. 33 illustrates an enlarged, side, top, perspective view of an example embodiment of a main housing 54. As discussed herein, the main housing 54 can have a battery cover 151. The battery cover 151 can have a connecting flange 68. The connecting flange 68 can have main housing guides 70 (sometimes referred to as guides 70) for interfacing with the top cover 52 as discussed herein. The guides 70 can be indentations or cutouts in the connecting flange 68 that are open toward an interior of the case 2 as illustrated in FIG. 33.

Figure 34:
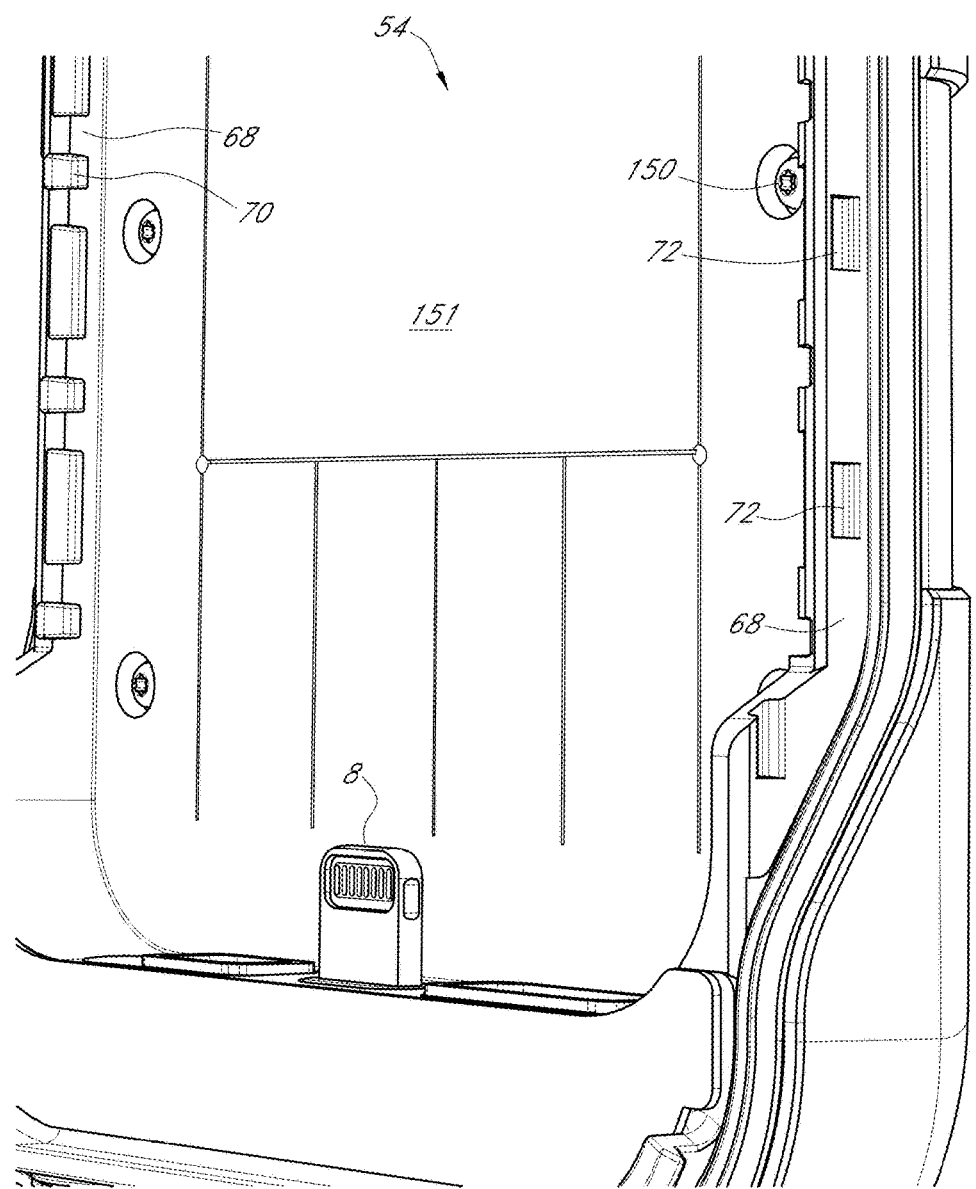
FIG. 34 illustrates an enlarged, side, top, perspective view of an example embodiment of a main housing portion of a case.

FIG. 34 illustrates an enlarged, side, top, perspective view of an example embodiment of a main housing 54. The connecting flanges 68 can have main slots 72 (sometime referred to as slots 70) for interfacing with the top cover 52 as discussed herein. The slots 72 can be indentations or cutouts in the connecting flange 68 of the battery cover 151 that are closed on all sides, including toward an interior of the case 2 as illustrated in FIG. 34.

Figure 35:
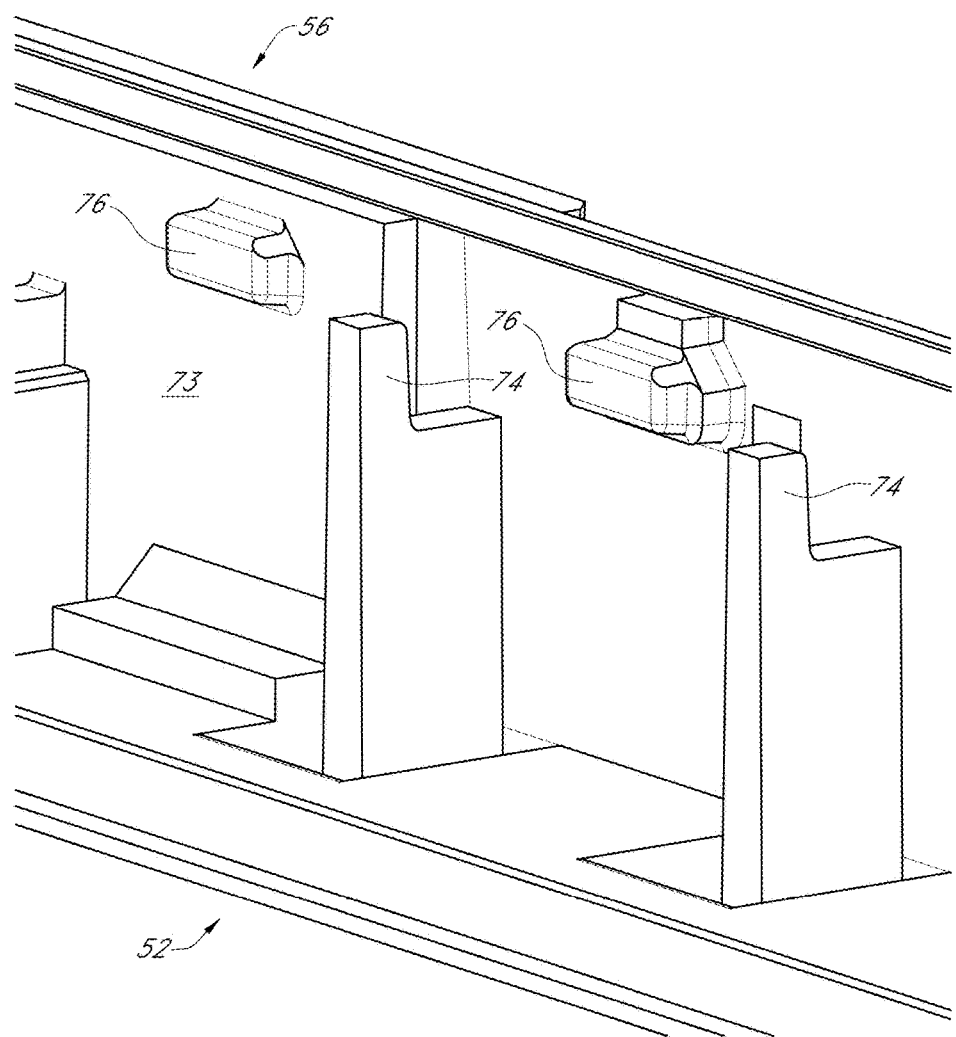
FIG. 35 illustrates an enlarged, side, top perspective view of an example embodiment of a top cover portion of a case.

FIG. 35 illustrates an enlarged, side, top perspective view of an example embodiment of a top cover 52. The top cover 52 can have a top cover wall 73 of the top cover 52 that extends toward the main housing 54 to interface with the main housing 54 as discussed herein. The top cover wall 73 can have guide hooks 74 (sometimes referred to as guides 74). The guide 74 can be sized and shaped to engage, mate, and/or connect with the main housing guides 70 of the connecting flange 68 of the main housing 54. The guide hooks 74 can slide into the guides 70 such that the connecting flange 68 lies between the guides 74 and the top cover wall 73. The connecting flange 68 being positioned and nesting between the guides 74 and the top cover wall 73 can aid in securing the relative positions of the main housing 54 and the top cover 52 as discussed herein.

The top cover wall 73 can have locking protrusions or locking knobs 76. The locking knobs 76 can engage, mate, and/or connect with the slots 72 of the connecting flange 68. When the main housing 54 and the top cover 52 interface as discussed herein to form the case 2, the locking knobs 76 can enter and nest within the slots 72. Because the slots 72 are closed on all sides, the locking knobs 76 can be biased to stay positioned within the slots 72. The locking knobs 76 biased in position within the slots 72 can secure the main housing 54 and the top cover 52 to each other to form the case 2.

The locking knobs 76 and/or slots 72 can have cross-sectional shapes that vary depending on the desired engagement force between the locking knobs 76 and the slots 72 (e.g., force required to separate the top cover 52 and the main housing 54). For example, a cross-section of the locking knobs 76 and/or slots 72 can be substantially triangular. A triangular the cross-section allows for the surfaces of the locking knobs 76 and/or slots 72 to slide past each other when the main housing 54 and the top cover 52 are disassembled. For example, in some configurations, the more triangular the cross-sections or more tapered the locking knobs 76, the less force required to remove the top cover 52 from the main housing 54. In some embodiments, the locking knobs 76 and/or slots 72 can be substantially rectangular in cross-section to more securely retain the connection between the top cover 52 and the main housing 54. For example, in some configurations, the more rectangular (e.g., less tapered) the cross-sections, the more force required to remove the top cover 52 from the main housing 54.

Figure 36:
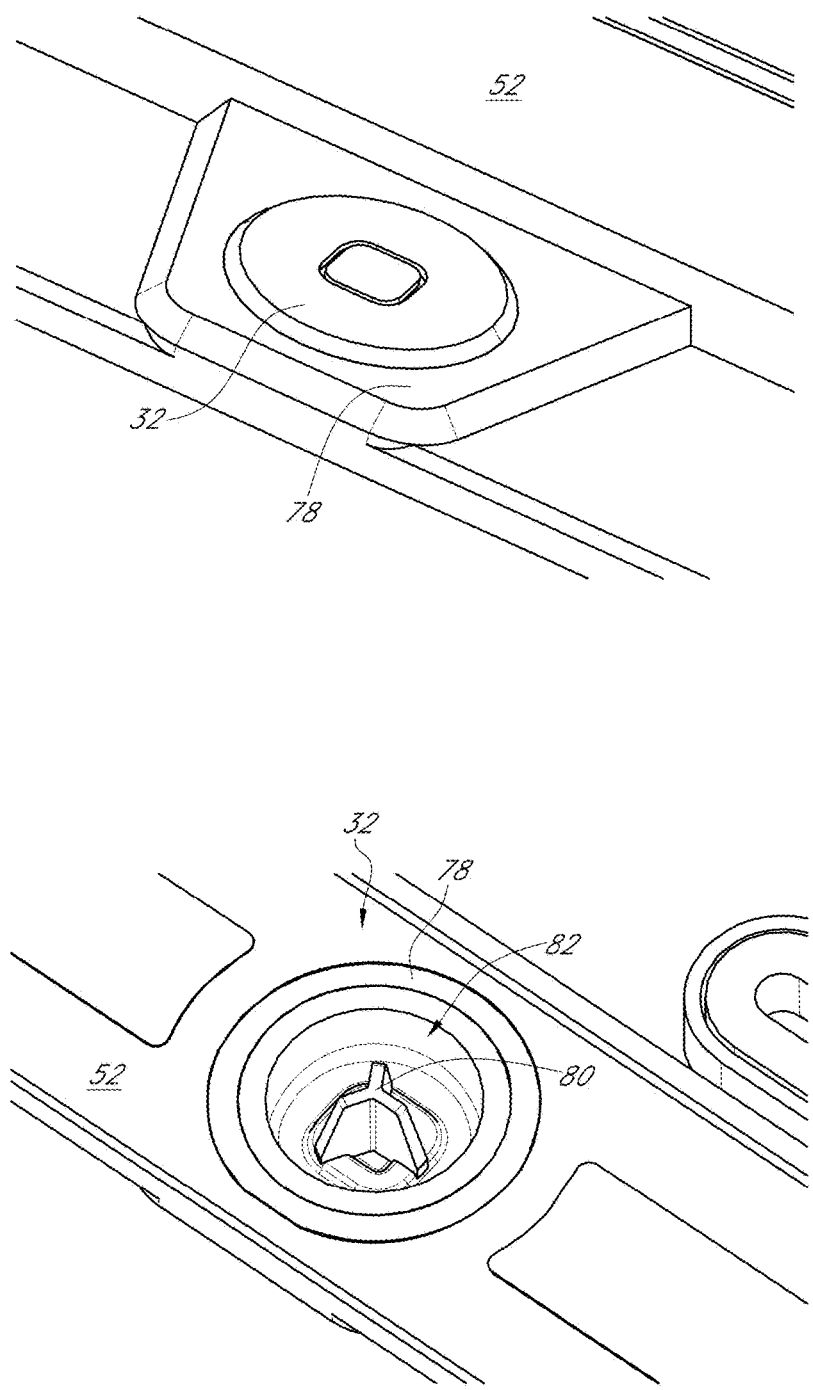
FIG. 36 illustrates an embodiment of a button cover on a top cover portion of a case.

FIG. 36 illustrates side, top, perspective views of an embodiment of a button cover 32 on a top cover 52. The button cover 32 can be formed in the top cover 52 to correspond with the home button 24 of the mobile device 4. The button cover 32 can be double injection molded and can pass through a hole in the top cover 52. The button cover 32 can be formed on the top cover 52 with an over-molding or double injection molding method. The button cover 32 can be coupled to the top cover 52 using an adhesive or any other suitable method.

In some embodiments, the material for the top cover 52 can be injected into a mold and formed from, for example, a rigid plastic, using a first mold for the top cover 52. For example, the rigid plastic of the top cover 52 can include polyvinyl chloride (PVC). Once the top cover 52 is formed, the button cover 32 can be injected to form around or in a wall of the top cover 52, using a second mold that can accommodate the top cover 52 and provide the contours/outline for the over mold features, such as the button cover 32. The button cover 32 can be formed from elastic plastic or rubber. For example, the button cover 32 can include thermoplastic that can be deformed with a force and return to its original shape upon removal of that force. Thus, as the button cover 32 is depressed by a user, the top cover 52 generally retains its shape to allow the home button 24 of the mobile device to be pressed without substantial deformation of the case 2.

The top cover 52 and/or the button cover 32 can be made from any suitable materials such as, but not limited to integrally thermoformed plastic, including polyethylene terephthalate (PET), metalized PET, low-density polyethylene, high-density polyethylene, nylon, polyolefin, blends of polyolefin, polystyrene, blends of polyolefin and polystyrene, polyester, blends of polyester, and/or the like. The top cover 52 and/or h button cover 32 can be fabricated using any suitable or known process or processes, including injection extrusion, molding, compression molding, and/or thermoforming techniques.

As illustrated in FIG. 36, the button cover 32 can be raised above an exterior surface of the top cover 52 to form a base 78 to, for example, provide further resiliency and elasticity to the button cover 32. In some embodiments, the base 78 can be substantially flush with the exterior surface of the top cover 52. As illustrated in FIG. 36, the base 78 can have a greater area relative to the opening (e.g., cavity 82) in the top cover 52 housing the base 78 to secure the button cover 32 in a predetermined position in the top cover 52. The over molding or double injection forming technique can allow the base 78 and/or button cover 32 to securely form in position relative to the top cover 52. For example, the top cover 52 can have indentation or features that the material of the button cover 32 flows into during injection molding or other technique to provide a connection between the top cover 52 and the button cover 32 as discussed herein. In some embodiments, the h button cover 32 and the top cover 52 can be joined using any suitable or known process or processes, including permanent adhesive, thermal bonds, ultrasonic bonds, spot welds, thermal weld points, a stitch or stitches, strip welds, tacks formed by crimping, and so forth, including any combination thereof.

As illustrated in FIG. 36, the button cover 32 can pass through the top cover 52 to be proximate and/or flush to an interior surface of the top cover 52 to, for example, contact a button (e.g., the home button 24) of the mobile device 4 when the mobile device 4 is in the case 2. The button cover 32 of the top cover 52 can have a push knob 80. The push knob 80 can be formed from, for example, three flanges, although other configurations are possible. The push knob 80 can be configured to push the button (e.g., the home button 24) of the mobile device 4 as discussed herein. The three flanges can depress the home button 24 of the mobile device 4 when the button cover 32 may be unevenly pushed by a user or from the side. At least one of the flanges of the push knob 80 will correspond to and push the home button 24 of the mobile device 4. Any number of flanges can be used to form the push knob 80, including 2, 4, 5, 6, 7, 8, or greater than 8.

The push knob 80 can be contained in a cavity 82 formed by an extension of the base 78 through the top cover 52 to secure the home button 32 as discussed herein. The combination of a button cover 32, a pass through base 78, and push knob 80 can form an elastic, drum-like membrane on the top cover 52 that can depress the button (e.g., the home button 24) of the mobile device 4 as discussed herein. In some embodiments, the button cover 32 may be formed in a separate process (e.g., a separate injection molding process) from the top cover 52 and inserted into the top cover 52 at a desired location with interlocking features to keep the button cover 32 in a desired position as discussed herein. The button cover 32 can be coupled to the top cover 52 to form a water-tight seal that can impede water from entering the case 2 at the button cover 32.

Figure 37:
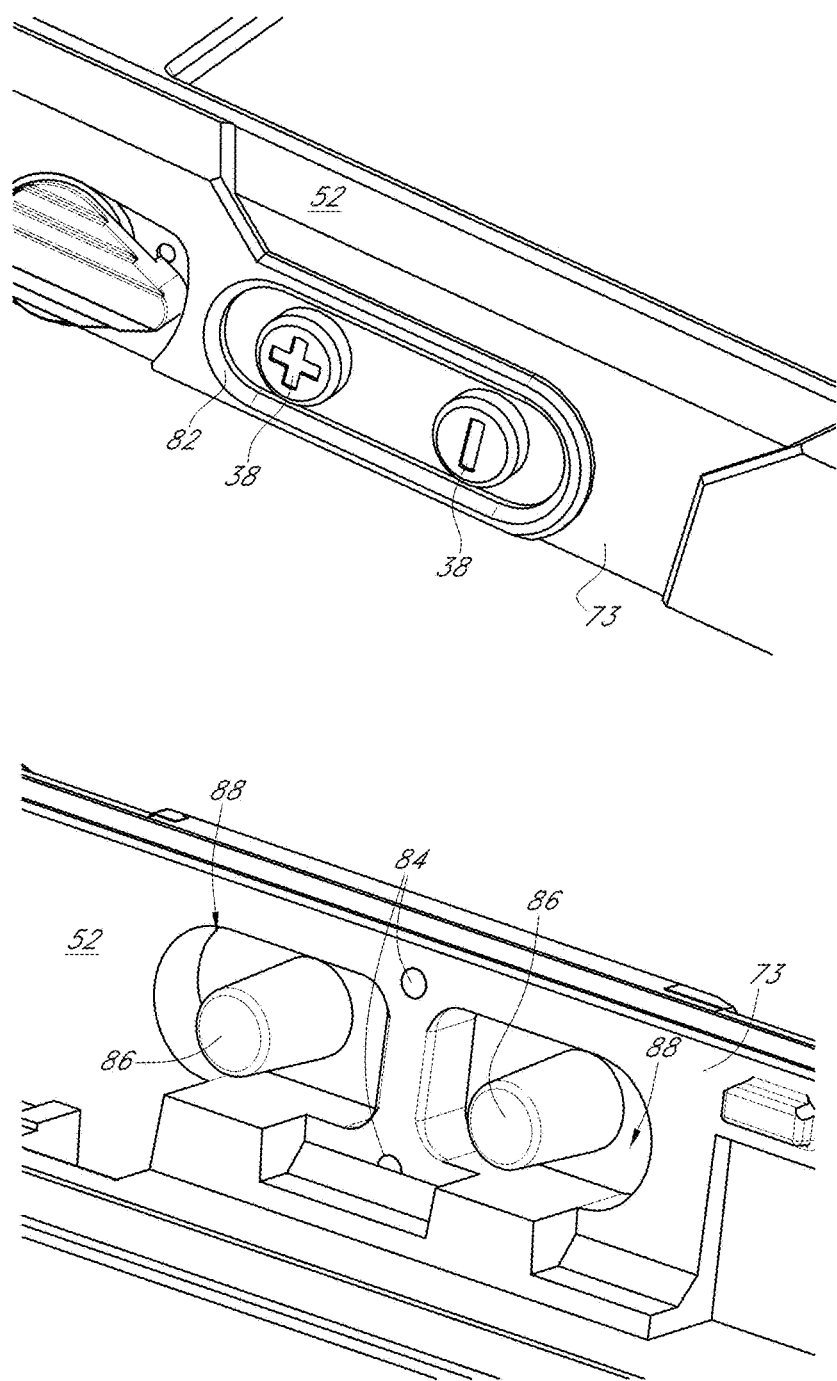
FIG. 37 illustrates an example embodiment of volume button covers on a top cover portion of a case.

FIG. 37 illustrates side, top, perspective views of an embodiment of one or more volume button covers 38 in a top cover 52. The volume button covers 38 can be formed in the top cover 52 to correspond with the volume buttons 41 of a mobile device 4. The volume button covers 38 can be formed using a double injection molding process, or various other suitable processes. The volume button covers 38 can pass through the top cover 52 (e.g., through a hole in a wall of the top cover 52).

In some embodiments, the material for the top cover 52 can be injected into a mold and formed from, for example, a rigid plastic as discussed herein. Once the top cover 52 is formed, the material for the volume button covers 38 can be injected to form around or in the top cover 52. The volume button covers 38 can be formed from elastic plastic or rubber. For example, the volume buttons 38 can include thermoplastic that can be deformed with a force and return to its original shape upon removal of that force. Thus, as the volume button covers 38 are depressed by a user, the top cover 52 generally retains its shape to allow the volume buttons 41 of the mobile device to be pressed without or minimal deformation of the case 2.

The top cover 52 and/or the volume button covers 38 can be made from any suitable materials such as discussed herein, and in particular, in reference to the home button cover 32. The top cover 52 and/or volume button covers 38 can be fabricated using any suitable or known process or processes as discussed herein, and in particular in reference to the home button cover 32.

As illustrated in FIG. 37, the volume button covers 38 can be raised above an exterior surface of the top cover 52 to form a volume base 82 to, for example, provide further resiliency and elasticity to the volume button covers 38. In some embodiments, the volume base 82 can be substantially flush with the exterior surface of the top cover 52. As illustrated in FIG. 37, the volume base 82 can have a greater area relative to the opening (e.g., cavity 88) in the top cover 52 housing the volume base 82 to secure the volume button covers 38 in a predetermined position in the top cover 52. An over molding or double injection molding technique can allow the volume base 82 and/or volume button covers 38 to securely form against the top cover 52. For example, the top cover 52 can have connecting indentations and/or cutouts 84 that the material of the volume buttons 38 flows into during injection molding process. Other technique can be used to provide a connection between the top cover 52 and the one or more volume button covers 38. In some embodiments, the volume button covers 38 and the top cover 52 can be can be joined using an adhesive or any suitable method as discussed herein, and in particular, in reference to the home button cover 32 and the top cover 52.

As illustrated in FIG. 37, the volume button covers 38 can pass through the top cover 52 to be proximate and/or substantially flush to an interior surface of the top cover 52. The volume button covers can, for example, contact the volume buttons 41 of the mobile device 4 when the mobile device 4 is in the case 2. The volume button covers 38 of the top cover 52 can have volume push knobs 80. The volume push knobs 80 can be formed from, for example, a cylinder extending toward the volume buttons 41 of the mobile device 4 to correspond to and push the volume buttons 41 of the mobile device 4 as discussed herein. The cylinders 80 can depress the volume buttons 41 of the mobile device 4 when the volume button covers 38 may be unevenly pushed by a user or from the side. At least some surface of the cylinder of the volume push knob 38 will correspond to and push the volume buttons 41 of the mobile device 4.

The volume push knob 86 can be contained in a cavity 82 formed in the top cover 52. The combination of a volume button covers 38, a base 78, connecting cutouts 84, and volume push knob 86 can form an elastic, drum-like membrane on the top cover 52 that can depress the volume buttons 41 of the mobile device 4 as discussed herein. In some embodiments, the volume button covers 38 may be formed in a separate injection process and inserted into the top cover 52 at a desired location with interlocking features to keep the volume button covers 38 in a desired position as discussed herein. The volume button covers 38 can be coupled to the top cover 52 to form a water-tight seal that can impede water from entering the case 2 at the volume button covers 38.

Figure 38:
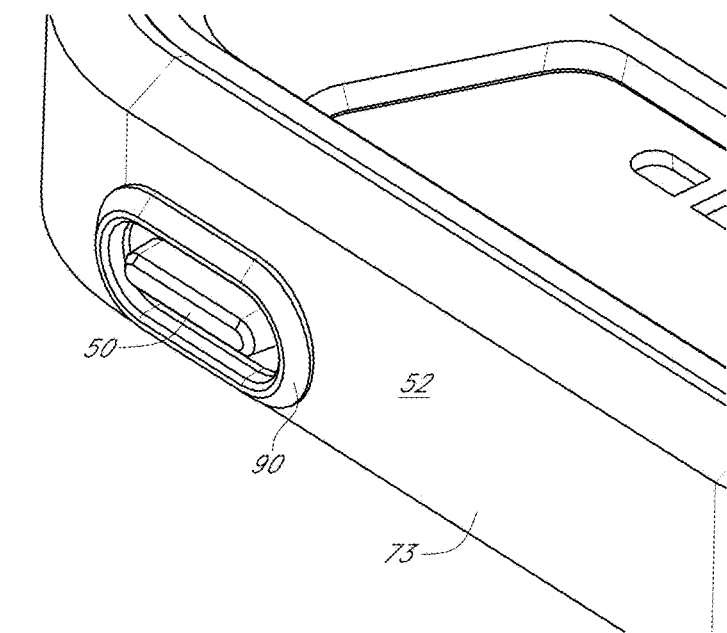
FIG. 38 illustrates an example embodiment of power button cover on a top cover portion of a case.
Figure 38:
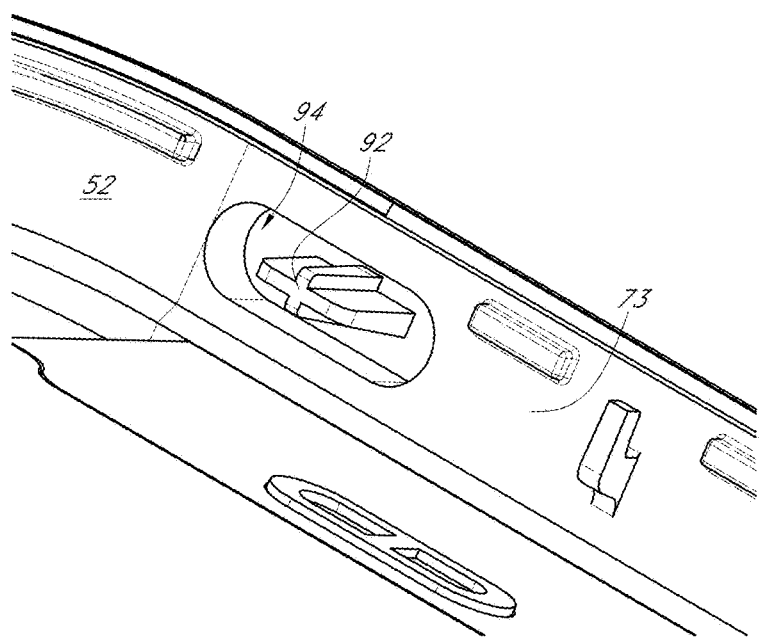

FIG. 38 illustrates side, top, perspective views of an embodiment of power button cover 50 in a top cover 52. The power button 50 can be formed in the top cover 52 to correspond with the power button 51 of the mobile device 4. The power button cover 50 can be double injection molded, or can be formed by various other processes. The power button cover 50 can pass through the top cover 52 (e.g., through a hole in the wall of the top cover 52). The power button cover 50 can be formed in the top cover 52 with a double injection molding method or any other suitable method.

In some embodiments, the material for the top cover 52 can be injected into a mold and formed from, for example, a rigid plastic as discussed herein. Once the top cover 52 is formed, the material for the power button cover 50 can be injected to form around or in the top cover 52. The power button cover 50 can be formed from elastic plastic or rubber. For example, the power button cover 50 can include thermoplastic that can be deformed with a force and return to its original shape upon removal of that force. Thus, as the power button cover 50 is depressed by a user, the top cover 52 generally retains its shape to allow the power button 51 of the mobile device to be pressed without substantial deformation of the case 2.

The top cover 52 and/or the power button cover 50 can be made from any suitable materials such as discussed herein, and in particular, in reference to the home button cover 32. The top cover 52 and/or power button cover 50 can be fabricated using any suitable or known process or processes as discussed herein, and in particular in reference to the home button cover 32.

As illustrated in FIG. 38, the power button cover 50 can be raised above an exterior surface of the top cover 52 to form a power base 90 to, for example, provide further resiliency and elasticity to the power button cover 50. In some embodiments, the power base 90 can be substantially flush with the exterior surface of the top cover 52. As illustrated in FIG. 38, the power base 90 can have a greater area relative to the opening (e.g., cavity 94) in the top cover 52 that houses the power base 90 to secure the power button 50 in a predetermined position in the top cover 52. The over molding or double injection molding technique can allow the power base 90 and/or power button cover 50 to securely form against the top cover 52. For example, the top cover 52 can have connecting indentations and/or features that the material of the power button 50 flows into during injection molding or other technique to provide a connection between the top cover 52 and the power button cover 50. In some embodiments, the power button 50 and the top cover 52 can be can be joined using any suitable method as discussed herein, and in particular, in reference to the home button cover 32 and the top cover 52.

As illustrated in FIG. 38, the power button cover 50 can pass through the top cover 52 to be proximate and/or substantially flush to an interior surface of the top cover 52 to, for example, contact the power button 51 of the mobile device 4 when the mobile device 4 is in the case 2. The power button cover 50 of the top cover 52 can have power push knob 92. The power push knob 92 can be formed from, for example, four flanges, although other configurations are possible. The power push knob 92 can to correspond to and push the power button 51 of the mobile device 4 as discussed herein. The four flanges can depress the power button 51 of the mobile device 4 when the power button 50 may be unevenly pushed by a user or from the side. At least one of the flanges of the power push knob 92 can correspond to and push the power button 51 of the mobile device 4. Any number of flanges can be used to form the power push knob 92, including 2, 3, 5, 6, 7, 8, or greater than 8.

The power push knob 86 can be contained in a cavity 94 formed in the top cover 52. The combination of a power button cover 50, a base 90, and power push knob 92 can form an elastic, drum-like membrane on the top cover 52 that can depress the power button 51 of the mobile device 4 as discussed herein. In some embodiments, the power button cover 50 may be formed in a separate injection molding process and coupled to the top cover 52, such as using an adhesive or by interlocking features on the top cover 52 and the power button cover 50. The power button cover 50 can be coupled to the top cover 52 to form a water-tight seal that can impede water from entering the case 2 at the power button cover 50.

Figure 39:
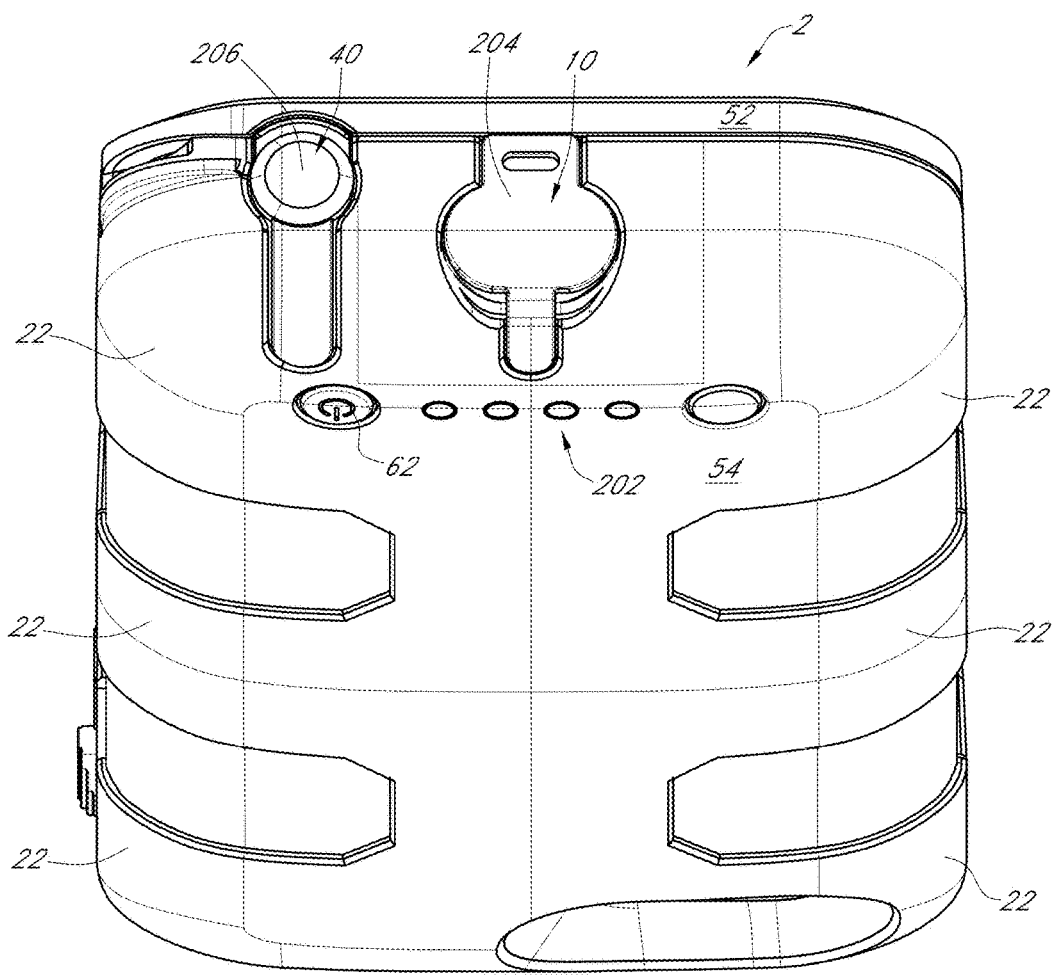
FIG. 39 illustrates a bottom view of an example embodiment of a case with impact absorbing regions.
Figure 40:
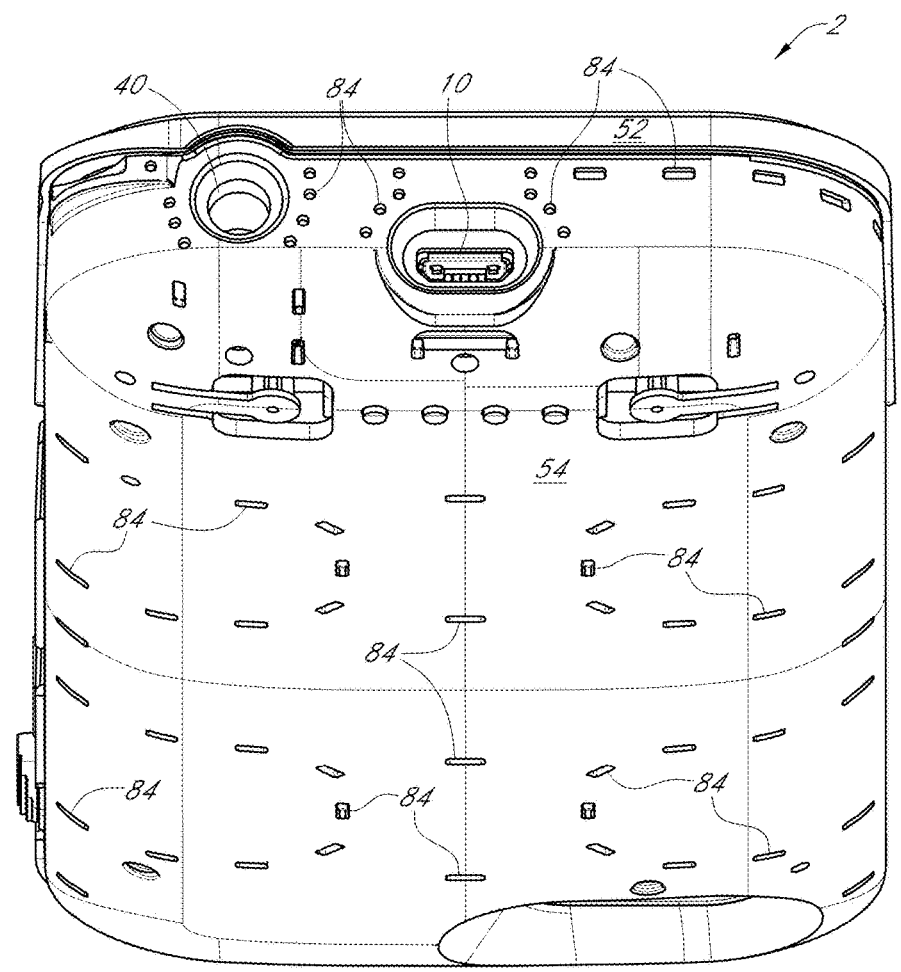
FIG. 40 illustrates an example embodiment of a shell portion of a protective case.

FIG. 39 illustrates a bottom view of an example embodiment of a case 2 with impact absorbing regions 22. FIG. 40 illustrates a bottom view of an example embodiment of a case 2 without impact absorbing regions 22 for illustration purposes. The case 2 can have a standby switch 62 to allow a user to select when the battery of the mobile device 4 is charged by the supplemental battery 6 of the case 2. The case 2 can have light emitting diodes (LEDs) 202 that indicate a charge level of the battery 6 and/or a charge status of the battery of the mobile device 4.

The case 2 can have an external interface 10 that electrically connects to the internal interface 8 and battery 6 as discussed herein. The external interface 10 can be covered by an interface cover 204 (e.g., an interface flexible port cover 204, which can correspond to the flexible port covers 19 discussed herein). Parts of the external interface 10 and/or interface flexible port cover 204 can be over molded as discussed herein. The interface flexible port cover 204 can provide water and dust resistance to the external interface 10 as discussed herein. The interface flexible port cover 204 can be attached to the case 2 (e.g., top cover 52 and/or main housing 54) with over molding techniques as discussed herein. The interface flexible port cover 204 can be attached by a friction fit or by mating certain features (e.g., protrusions or recesses) of the interface flexible port cover 204 with predetermined features (e.g., recesses or protrusions) of the case 2 to secure the interface flexible port cover 204. The interface flexible port cover 204 can be attached to the case 2 using any suitable mechanism as discussed herein, and in particular, as discussed in reference to the home button cover 32. The interface flexible port cover 204 can be formed from any suitable materials as discussed herein, and in particular, as discussed in reference to the home button 32.

The case 2 can have an audio port 40 that corresponds to a headphone port 42 of the mobile device 4 as discussed herein. The audio port 40 can be covered by an audio flexible port cover 206. Parts of the audio port 40 and/or audio flexible port cover 206 can be over molded as discussed herein. The audio flexible port cover 206 can provide water and dust resistance to the audio port 40 as discussed herein. The audio flexible port cover 206 can be made of any suitable materials and attached with any suitable mechanism as discussed herein, and in particular as discussed in reference to the interface flexible port cover 204.

As illustrated in FIG. 40, the case 2 can have cutouts 84 in the top cover 52 and/or main housing 54. The cutouts 84 can be similar or different from the cutouts 84 in the case 2 discussed in reference to FIG. 37. The cutouts 84 (shown in FIG. 40) can correspond to the impact absorbing regions 22 (shown in FIG. 39) of the case 2. The cutouts 84 can help position and maintain position of the impact absorbing regions 22. The impact absorbing regions 22 can be formed on the case 2 (e.g., on the top cover 52 and/or main housing 54) with a double injection molding method or any other suitable method as discussed herein.

The over molding or double injection molding technique can allow the impact absorbing regions 22 to be securely formed on the case 2. For example, the case 2 can have connecting indentations and/or cutouts 84 that the material of the impact absorbing regions flows into during injection molding or other technique to provide a connection between the impact absorbing regions 22 and the shell of the case 2. In some embodiments, the impact absorbing regions can be joined to the shell of the case 2 using any suitable method as discussed herein, and in particular, in reference to the home button cover 32 and the top cover 52 (e.g., molding techniques with case 2, top cover 52, and/or main housing 54 with over molded impact absorbing regions 22). In some embodiments, the impact absorbing regions 22 can be can be joined using any suitable or known process or processes, including permanent adhesive, thermal bonds, ultrasonic bonds, spot welds, thermal weld points, a stitch or stitches, strip welds, tacks formed by crimping, and so forth, including any combination thereof.

In some embodiments, the material for the shell of the case 2 (e.g., the top cover 52 and/or main housing 54) can be injected into a mold and formed from, for example, a rigid plastic, using a first mold for the top cover 52 and/or main housing 54. The rigid plastic can include PVC. Once the shell of the case 2 is formed, the material for the impact absorbing regions 22 can be injected to form around the case 2 (e.g., on the top cover 52 and/or main housing 54) and/or in the cutouts 84, using a second mold that can accommodate the top cover 52 and/or main housing 54 and provide the contours/outline for the over mold features, such as the impact absorbing regions 22. The impact absorbing regions 22 can be formed from elastic plastic or rubber. For example, impact absorbing regions 22 can include thermoplastic that can be deformed with a force and return to their original shape upon removal of that force. Thus, impact absorbing regions 22 can absorb forces and shocks to protect the integrity of the case 2 and protect the mobile device 4 within the case 2. The impact absorbing regions 22 can be formed of a material that is softer, more flexible, and/or more resilient than the material of the shell of the case 2.

The case 2 and/or impact absorbing regions 22 can be made from any suitable materials such as, but not limited to integrally thermoformed plastic, including polyethylene terephthalate (PET), metalized PET, low-density polyethylene, high-density polyethylene, nylon, polyolefin, blends of polyolefin, polystyrene, blends of polyolefin and polystyrene, polyester, blends of polyester, and/or the like. The case 2 and/or impact absorbing regions 22 can be fabricated using any suitable or known process or processes, including injection extrusion, molding, compression molding, and/or thermoforming techniques.

As discussed in reference to, for example, FIG. 36 regarding the home button cover 32, the impact absorbing regions 22 can pass through the case 2 to be proximate or flush to interior surfaces of the case 2. Such pass through injection molding of the impact absorbing regions 22 can allow for a more secure connection between the impact absorbing regions 22 and the case 2.

Figure 41A:
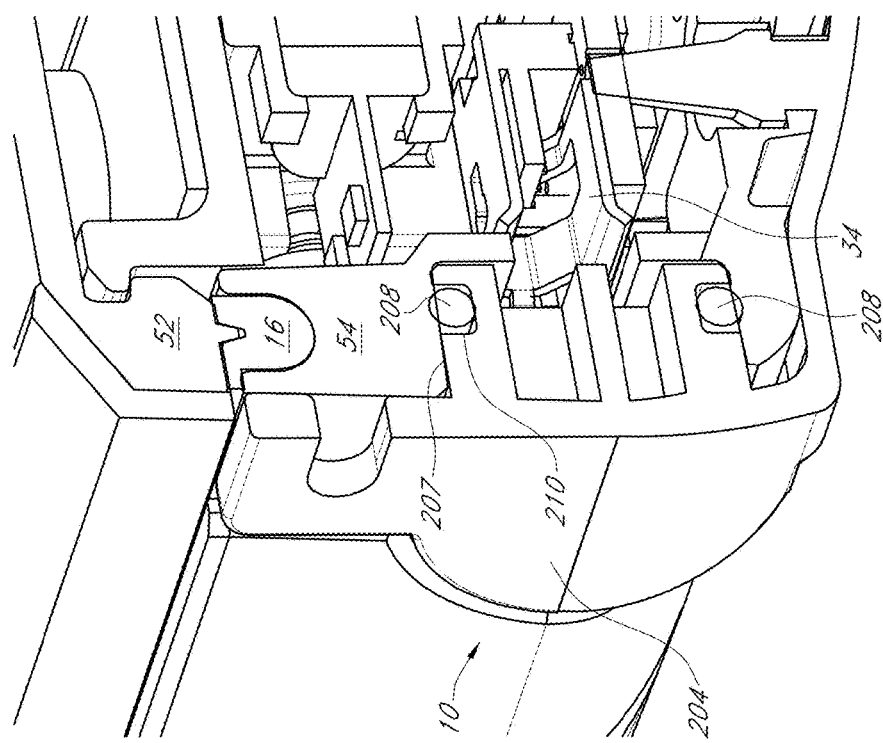
FIG. 41A illustrates a cross-sectional view of an example embodiment of an external interface and a port cover.

FIG. 41A illustrates a side, top, perspective view of a cross-section of an external interface 10 and an interface flexible port cover 204. In some embodiments, the external interface 10 can be a micro USB port 34. The external interface 10 can be housed in the main housing 54. The main housing 54 can have an external port opening 207. The external port opening 207 can be sized and shaped to accept the interface flexible port cover 204 to form a water and dust resistant seal. As illustrated, the external port opening 207 and interface flexible port cover 204 can have corresponding round/circular shapes (e.g., cylinders). In some embodiments, the shapes of the external port opening 207 and interface flexible port cover 204 can be generally any desired corresponding shape, such as, for example, rectangular, square, hexagonal, octagonal, and/or the like, including combinations of various shapes.

As illustrated in FIG. 41A, the interface flexible port cover 204 can have an interface gasket channel 210. The interface gasket channel 210 can be sized and shaped to accept, engage, and/or mate with an interface gasket 208. The interface gasket 208 can be sized and shaped to be compressed by the walls of the external port opening 207 when the interface flexible port cover 204 is positioned (e.g., inserted) within the external port opening 207. The compression of the interface gasket 208 against the main walls of the external port opening 207 and/or interface gasket channel 210 can create a water and dust resistant seal as discussed herein. The interface flexible port cover 204, the audio flexible port cover 206, and/or other flexible port covers 19 can form a water and dust resistant with or without a gasket as discussed herein in reference to the interface flexible port cover 204.

Figure 41B:
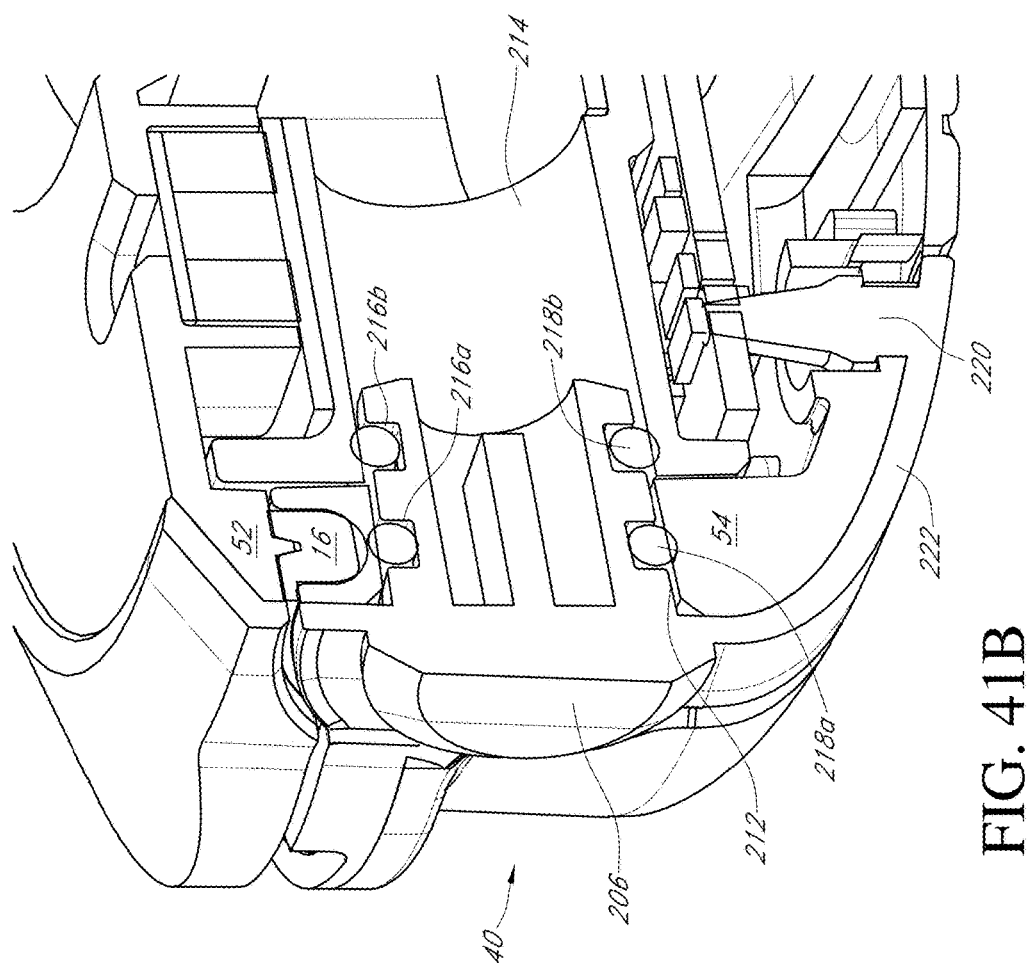
FIG. 41B illustrates a cross-sectional view of an example embodiment of a port and a port cover.

FIG. 41B shows a cross-sectional view of a port (e.g., the auxiliary port 40 for a headphone port 42) and a port cover 206. The port cover 206 can be similar to the port cover 204 and the features described in connection with the port cover 204 can apply to the port cover 206 as well. The port 40 can include a port opening 212 (e.g., which can be configured to receive a headphone jack). A sleeve 214 can be disposed inward of the port opening 212. The port cover 206 can include two gasket channels 216a and 216b that can support two gaskets (e.g., O-rings) 218a and 218b. The first gasket 218a can be configured to seal against a side wall of the main housing 54 when the port cover 206 is inserted into the port opening 212, and the second gasket 218b can be configured to seal against a side wall of the sleeve 214 when the port cover 206 is inserted into the port opening 212. A tether 222 can couple the port cover 206 to the case 2 such that when the port cover 206 is extracted from the port opening 212, the port cover 206 remains coupled to the case 2. An anchor member 220 can couple the tether 222 to the case 2. The anchor member 220 can be sized and shaped to allow the anchor member 220 to be inserted into a hole in the case (e.g., one of the holes 84), and to impede removal of the anchor member 220 from the hole. The tether 222 can be coupled to the case 2 by an adhesive, sonic weld, or various other securing methods discussed herein. The feature of the port cover 206 can be applied also to the port cover 204. For example, the port cover 204 can include a tether and/or an anchor member to couple the port cover 204 to the case 2 when the port cover 204 is extracted.

In some embodiments, the impact absorbing regions 22 can extend around the corners of the case 2. The impact absorbing regions 22 can be integrally formed with other components of the case, such as the tether 222 and/or the port cover 206, the port cover 204, the button covers 32, 38, and/or 50, and/or the membrane area 44. Some of all of these components can be formed together with each other and/or with the impact resistant regions 22 (e.g., during an over molding or double injection molding process).

Figure 42:
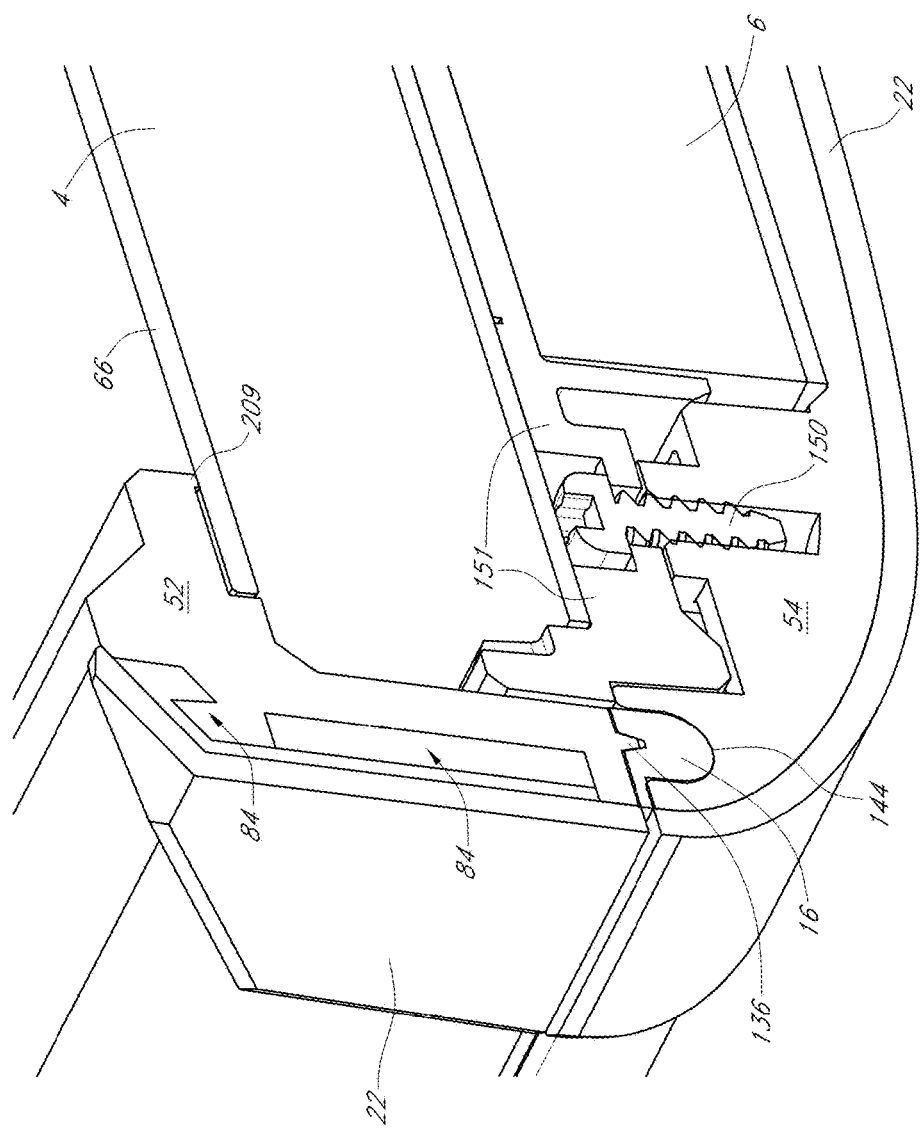
FIG. 42 illustrates a cross-sectional view of an example embodiment of a case and a mobile device.

FIG. 42 illustrates a side, top, perspective view of a cross-section of a case 2 and a mobile device 4 in the case 2. The top cover 52 can be secured to the main housing 54 as discussed herein. The battery cover 151 can be secured to the main housing 54 with screws 150 and/or other suitable fasteners as discussed herein. As illustrated in FIG. 42, the top cover 52 can have impact absorbing regions 22 as discussed herein. For example, the top cover 52 can have cutouts 84 as discussed herein. The cutouts 84 can be of various shapes and sizes to secure the impact absorbing regions 22 as discussed herein. As illustrated in FIG. 42, the cutout 84 on the side of the top cover 52 can be larger (e.g., longer in length in a dimension) than another cutout 84 in the top cover 52 proximate to, for example, the transparent member 66. Any variety of shapes and sizes of cutouts can be utilized to accommodate various over molded features and desired connections therebetween.

As illustrated in FIG. 42, a gasket 16 can be disposed in a gasket channel 144 of the main housing 54. The gasket 16 can be over molded, adhered, or disposed in the gasket channel 144 of the main housing 54. In some embodiments, the gasket 16 can be over molded, adhered, or disposed onto the top cover 52. The gasket 16 can extend substantially along the part line 56 as discussed herein. The gasket 16 can extend partially or an entirety of the periphery between the top cover 52 and the main housing 54 as discussed herein in reference to the undulating part line 56.

The top cover 52 can have a protrusion or perimeter flange 136. The perimeter flange 136 can be sized, shaped, and positioned to compress the gasket 16 when the main housing 54 is connected to the top cover 52 as discussed herein. The perimeter flange 136 can be sized smaller than the gasket channel 144 such that the perimeter flange 136 can compress the gasket 16 into the gasket channel 144, as well as can create crimp type seal (e.g., at a relatively concentrated point, area, and/or length) between the gasket 16 and perimeter flange 136, when the main housing 54 is connected to the top cover 52 as discussed herein. Such an arrangement of the gasket 16, perimeter flange 136, and gasket channel 144 can allow for the water and dust resistant seal as discussed herein.

In some embodiments, the gasket 16 can be arranged between the main housing 54 and the top cover 52 without a perimeter flange 136 and/or gasket channel 144. The gasket 16 can be compressed between the walls of the main housing 54 and top cover 52 to achieve water and dust resistance.

The top cover 52 can have a screen flange 209 that protrudes from a wall of the top cover 52 overlapping the mobile device 4 on the side of the mobile device 4 with a touch screen 26. The screen flange 209 can press against and/or contact the transparent member 66 (or membrane 28) to create a water and dust resistant seal. In some embodiments, the screen flange 209 can include a gasket 17 as discussed herein, which can be formed on the top cover 52 as discussed herein. The gasket 17 can contact and create a water and dust resistant seal directly against the touch screen 26, or directly against the membrane 28 or the transparent member 66 as discussed herein.

With protective cases, a solution to access buttons through the protective case is to been include depressible pass-through button covers that do not directly expose the device, thereby providing additional protection without noticeable access ports. However, some mobile devices incorporate switches or toggles, which mechanically move from a first position to a second position. Sometimes the switches or toggles visibly identify the present status, such as through a 1 and 0 or red and green indicator. In some instances, a depressible pass-through button cover on a case does not adequately control a switch or toggle on a mobile device and does not provide any visible identifier of the current switch or toggle status. Pass-through holes and thin membranes can reduce the protection provided by the case. As the size of mobile devices shrinks, the space available to access a switch or toggle is more and more restricted, and in some cases, pass-through holes and thin membranes can negatively impact the accessibility of a switch or toggle. Additionally, very small switches sometimes require fingernail operation, and repetitive fingernail access on a membrane can damage or pierce the membrane, reducing the functionality and eliminating and waterproof or protective benefit. Further, pass-through holes and membranes can interrupt the aesthetics of the external case.

Figure 43:
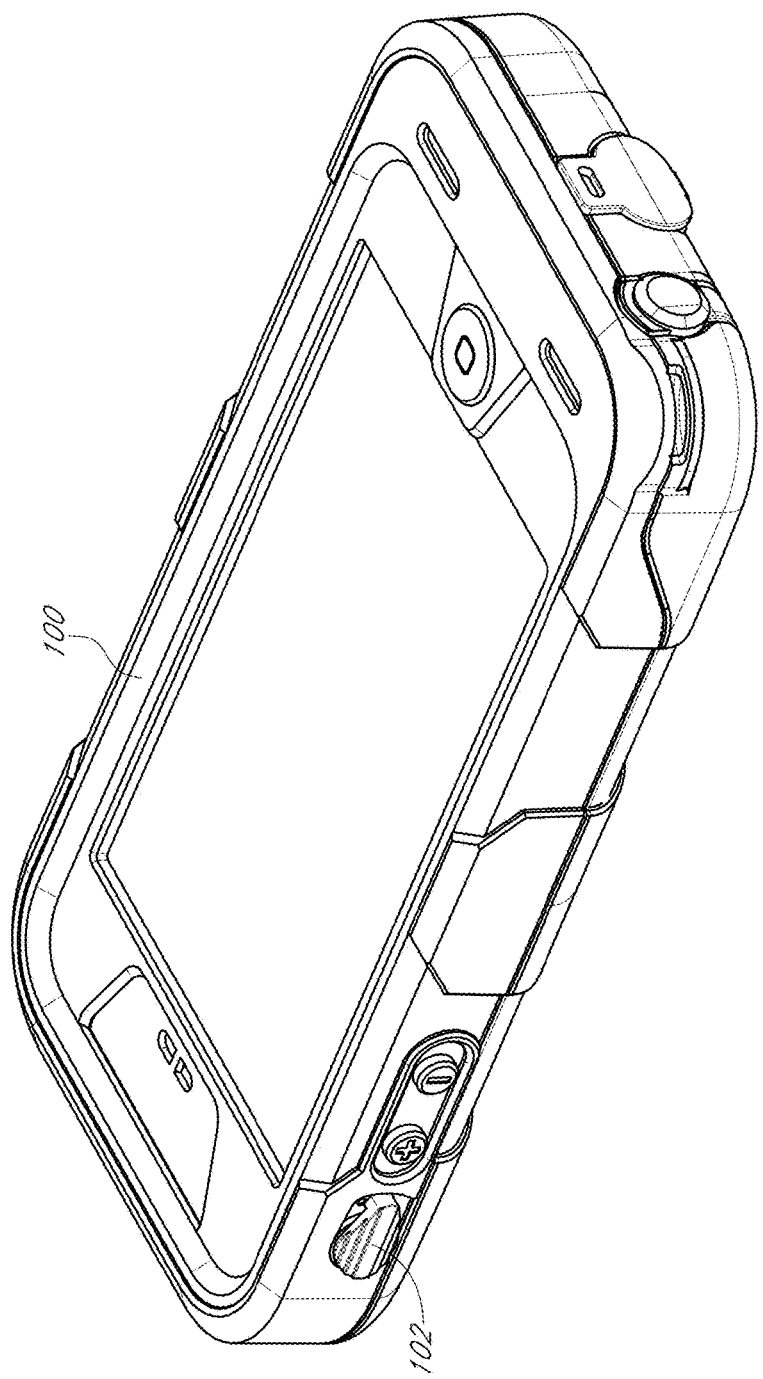
FIG. 43 illustrates an example embodiment of a protective case having a switch cover.

FIG. 43 is a side, top, perspective view of an example embodiment of a shell (e.g., case or battery case). The shell or case 100 can be the same or different case 2 as discussed in reference to FIGS. 1 to 42. The shell or case 100 can be used to protect a portable electronic device (e.g., a mobile device, mobile phone, or tablet). The portable electronic device can have a switch or toggle 46 built into the mobile device as discussed herein. A switch cover 102 can be integrated into the shell 100. The switch cover 102 can be positioned to engage/mate with a switch 46 of the mobile device 4 as discussed herein (in reference to, for example, FIG. 56).

Figure 44:
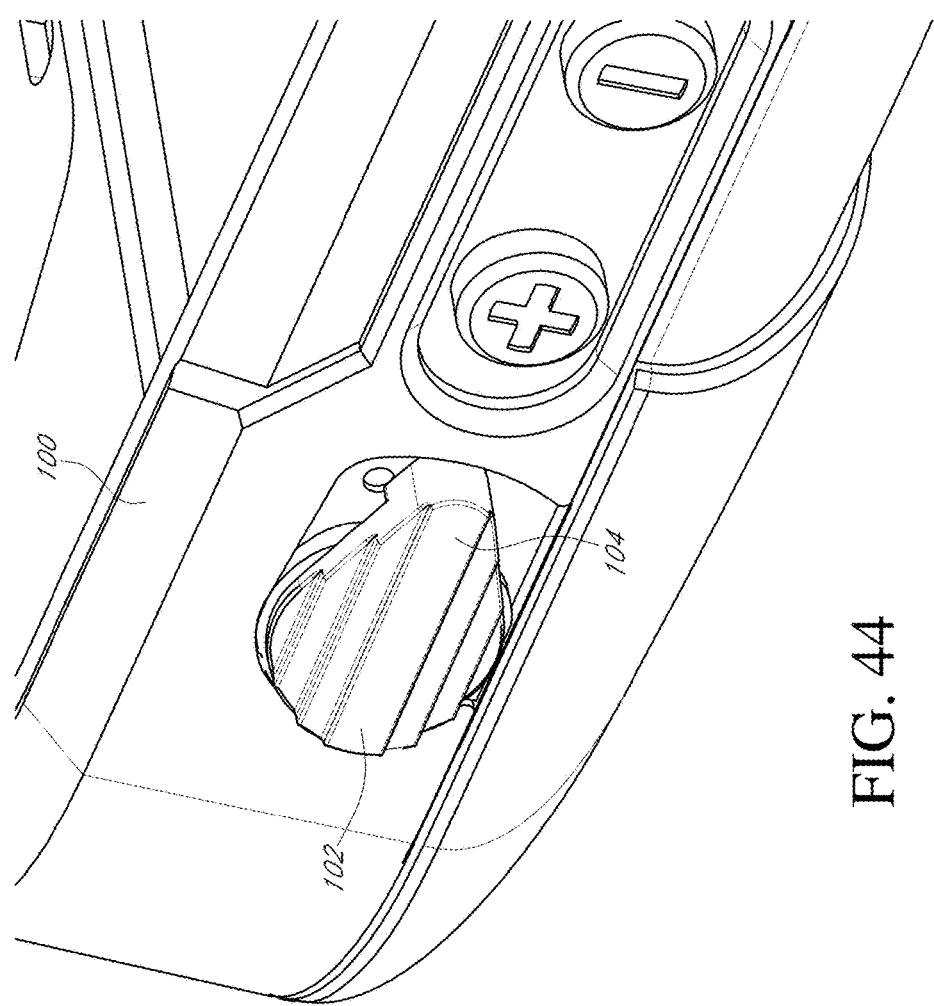
FIG. 44 is an enlarged view of an example embodiment of a switch cover on a case.

FIG. 44 is a side, top, perspective view of an example embodiment of a switch cover 102 of a shell 100 (sometimes referred to as a case). The switch 102 cover can rotate. The rotating switch cover 102 can have a handle 104 (e.g., an extension or protrusion). The handle 104 can be an elongated shape (e.g., oval or tear drop shape) to provide a lever or leverage to facilitate rotating of the switch cover 102 by the user, although various other shapes can be used. In some embodiments, the handle 104 can have protruding features to help a user grip and rotate the switch cover 102 as discussed herein, and in particular, in reference to FIGS. 58 and 59. The protruding features 166 can be linear and extend generally along a longer dimension of the handle. The handle 104 of the switch cover 102 can be larger than a shaft portion (or base 152) of the switch cover 102 that is inserted into an opening 106 (FIG. 45) in the shell 100, such that the handle 104 prevents the switch cover 102 from being over inserted into or through the opening 106 in the shell 100.

Figure 45:
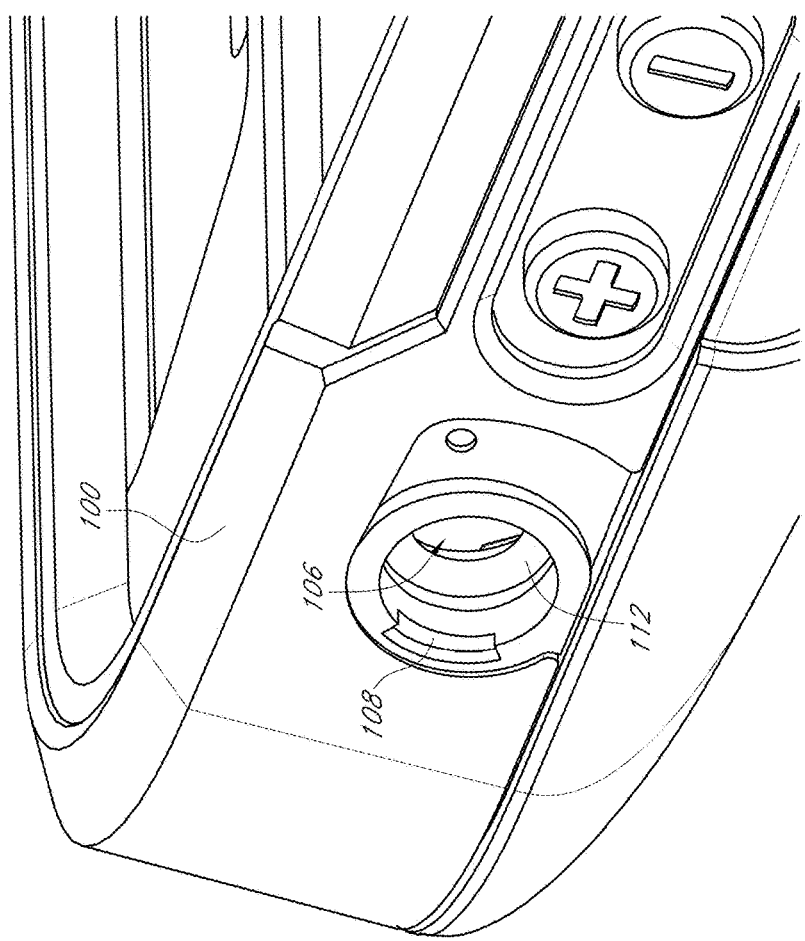
FIG. 45 illustrates an example embodiment of an opening in the shell or case.

FIG. 45 is a side, top, perspective view of an example embodiment of an opening 106 in the shell or case 100. The opening (e.g., cavity or lumen) 106 can be shaped to accept the switch cover 102. The opening 106 can be generally round or cylindrical. The opening 106 can have open ends on both sides (e.g., cutout through a wall of the shell 100) to accept the switch cover 102. The switch cover 102 can be inserted into the opening 106 and secured as discussed herein. The opening 106 can be positioned in the shell 100 such that when the switch cover 102 is inserted into the opening 106 and the mobile device is inserted into the shell 100, the switch cover 102 can engage the switch or toggle 46 of the mobile device 4 as discussed herein.

The case or shell 100 and/or the switch cover 102 can include a motion limiter feature configured to restrict the range of motion of the switch cover 102. For example, the opening 106 can have a groove 108 positioned (e.g., along the periphery of the opening). The groove 108 can be shaped to engage or mate with a protrusion 110 or knob (shown in FIG. 55) of the switch cover 102 as discussed herein to limit the range of motion of the knob 110 in the groove. By limiting the range of motion of the knob 110, the rotational range of the switch cover 102 can be limited. The range of rotation can correspond to, for example, a corresponding translational (e.g., linear) movement or range of the switch 46 of the mobile device 4.

FIG. 45 shows the opening 106 without the switch cover 102 inserted or positioned within the shell 100. FIG. 45 illustrates a cover gasket 112 positioned within the lumen (e.g., cylinder) formed by the opening 106. The cover gasket 112 can be sized and shaped to rest against a wall or periphery (e.g., main wall 132 as discussed in reference to FIG. 50) formed by the lumen of the opening 106. The cover gasket 112 can be sized and shaped to form a seal with the wall of the opening 106. The cover gasket 112 can remain engaged with the wall of the opening 106 to maintain the seal when the switch cover 102 is rotated as discussed herein. The seal can provide protection against the environment external to the shell 100 to prevent or inhibit contact of the external environmental elements (e.g., moisture or water) with the mobile device in the shell. In some embodiments, the cover gasket 112 moves relative to the wall of the opening 106 when the switch cover 102 is rotated. In some embodiments, the gasket remains in substantially a same position (e.g., does not rotate) relative to the wall of the opening 106 when the switch cover 102 is rotated.

Figure 46:
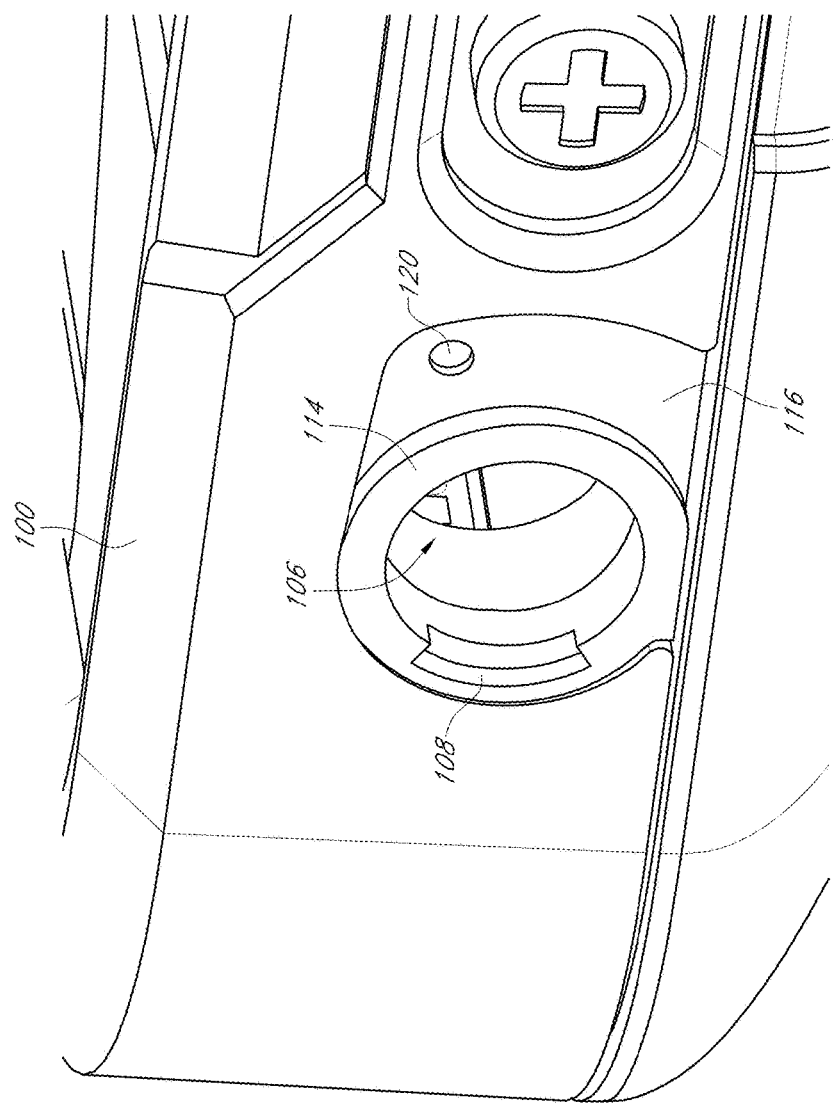
FIG. 46 illustrates an example embodiment of an opening in the shell or case.

FIG. 46 is a side, top, perspective view of an example embodiment of an opening 106 in a shell 100. FIG. 46 shows the opening without a switch cover 102 or a cover gasket 112. The wall of the opening 106 (e.g., main wall 132 as discussed in reference to FIG. 50) can be generally smooth and continuous. The wall of the opening can be generally smooth and continuous where the gasket is positioned. In some embodiment, the wall of the opening can have a groove or channel sized and shaped to engage the cover gasket 112. For example, the channel in the opening can be a cutout or groove into the body of the shell, forming a torus like cutout in the wall of the opening 106.

As shown in FIG. 46, the opening 106 can have a round frame or periphery 114 encircling the opening 106. The wall of the shell 100 can have a handle 104 cutout 116 sized, shaped, and positioned to correspond to the handle stop 118 as discussed herein and in particular, in reference to FIG. 54. The handle cutout 104 can limit the range of motion of or degrees of rotation of the switch cover 102 as discussed herein. For example, the handle stop 118 can abut or come against a periphery of the handle cutout 116 at a predetermined position of the switch cover 102 to inhibit or prevent further rotation of the switch cover 102.

With continued reference to FIG. 46, the handle cutout 116 can have a divot or indentation 120. In some embodiments, the divot 120 can be sized, shaped, and positioned to engage or mate with a knob on the handle. For example, the knob can be on the handle stop 118 and can engage the divot 120 at a predetermined position of the rotating switch cover 102. While the knob is engaged with the divot, the switch cover 102 can be biased to remain in the predetermined position. When desired, the handle 104 can be moved or pushed for the knob to disengage or dislodge from the divot 120 for the switch cover 102 to rotate as discussed herein.

In some embodiments, a visual indicator 120 (e.g., the divot) can be used as a status indicator configured to indicate the position of the switch 46 on the mobile device 4. In some embodiments, the divot 120 can be colored (e.g., red) or can otherwise be visually distinguishable from the area around the divot 120. In some cases, a colored dot or other visual indicator can be used instead of a recessed divot 120. When the switch cover 102 is in a first position (e.g., configured to position the switch 46 in a first state), the visual indicator 120 (e.g., the divot) can be covered by a portion of the switch cover 102, such that the visual indicator 120 is hidden from view. When the switch cover 102 is in the second position (e.g., configured to position the switch 46 in a second state), the visual indicator 120 (e.g., the divot) can be uncovered such that the visual indicator 120 is exposed and visible. In some embodiments, two different visual indicators can be used. A first visible indicator can be visible when the switch cover 102 is in the first position and covers the second visible indicator, and the second visible indicator can be visible when the switch cover 102 is in the second position and covers the first visible indicator.

Figure 47:
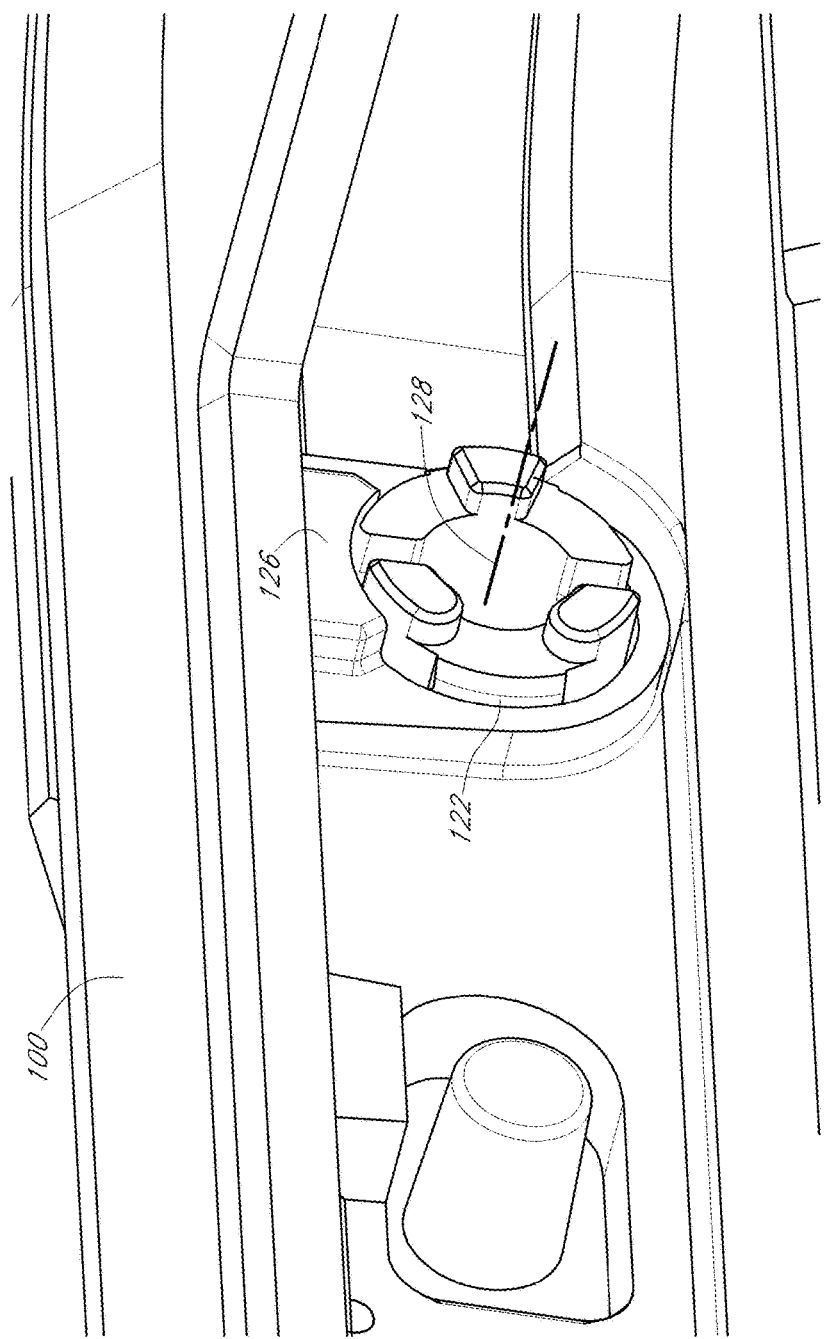
FIG. 47 illustrates an example embodiment of a switch cover on the shell or case.
Figure 57:
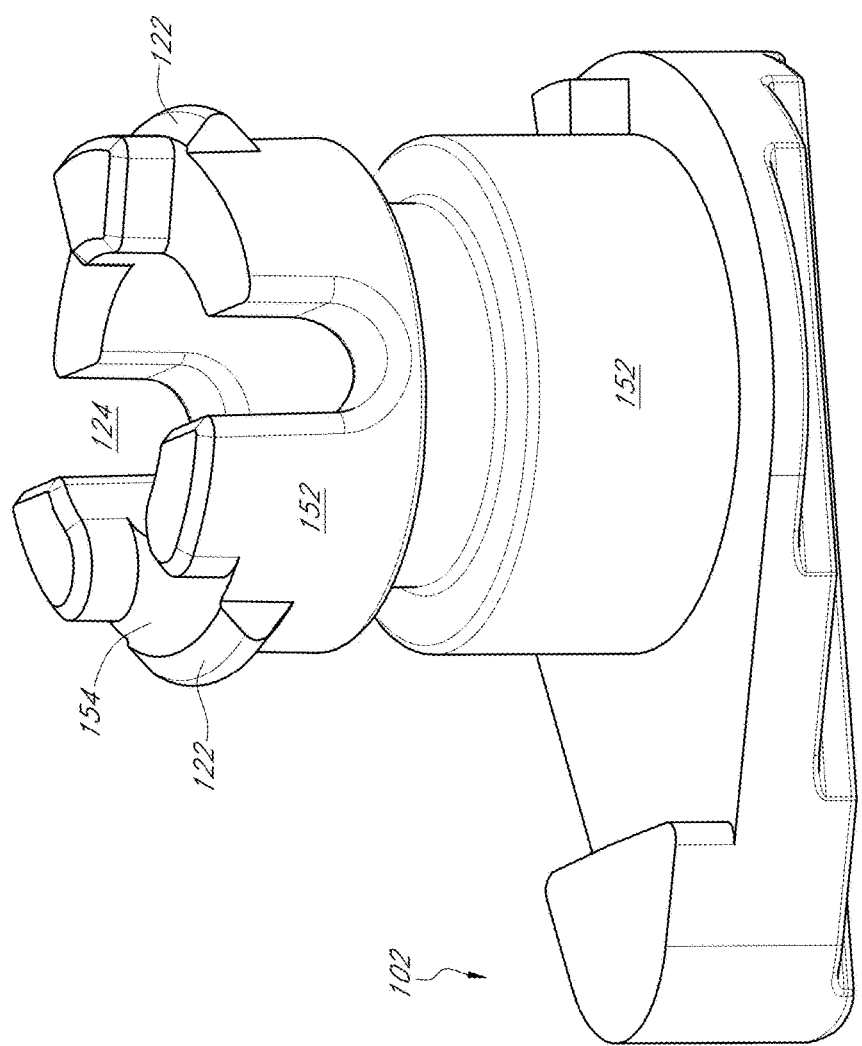

FIG. 47 is a side, top, perspective view of an example embodiment of a switch cover 102 in the shell or case 100. FIG. 47 illustrates the switch cover 102 and shell 100 from the inside of the shell 100 (e.g., where the mobile device is inserted and/or housed). The switch cover 102 can protrude into the shell 100 beyond an interior periphery or wall of the shell 100 (e.g., main wall 132 as discussed in reference to FIG. 50). The switch cover 102 can have at least one flange 122 that protrudes beyond the periphery or wall of the opening 106 as discussed herein, and in particular, in reference to FIGS. 45 and 46. The flange 122 can contact, rest against, or abut the inner wall of the shell 100 to secure the switch cover 102 within the opening 106. The flange 122 can limit, inhibit, or prevent axial movement of the switch cover 102 along an axis while allowing for rotation of the switch cover 102 about the axis. The flange 122 can limit, inhibit, or prevent axial movement along an axis to, for example, inhibit or prevent the switch cover 102 from coming out of the opening 106 once inserted into the opening 106. As can be seen in FIG. 57, for example, the switch cover 102 can include multiple flanges 122. Two flanges 122 are shown in FIG. 57 positioned generally opposite each other on the switch cover 102. As discussed in reference to FIG. 57, a gap 124 can be positioned in the switch cover 102 such that the one or more flanges 122 can deflect inwardly as the switch cover 102 is inserted into the opening 106.

As illustrated in FIG. 47, the inner wall of the shell 100 can have a protrusion or stop 126 extending from or connected to the inner wall. The stop 126 can be shaped to circumscribe at least a portion of the switch cover 102. The stop 126 can be spaced to generally limit the movement or rotation of the switch cover 102 within the opening. The stop 126 can be shaped and positioned to prevent passage of the flange 122 past the stop 126. As the switch cover 102 is rotated about the axis 128, the flange 122 can abut the stop 126 at a predetermined position of the cover to inhibit or prevent further rotation of the switch cover 102. The range of motion or degrees of rotation of the switch cover 102 can be limited by the flange abutting or coming up against the stop 126.

In some embodiments, the stop 126 can guide the switch cover 102 during rotation about axis 128 as discussed herein. The stop 126 can surround or circumscribe the switch cover 102 at least partially to maintain a predetermined contact and/or predetermined clearance with the switch cover 102 such that the stop 126 substantially maintains rotation of the the switch cover 102 along axis 128.

Figure 48:
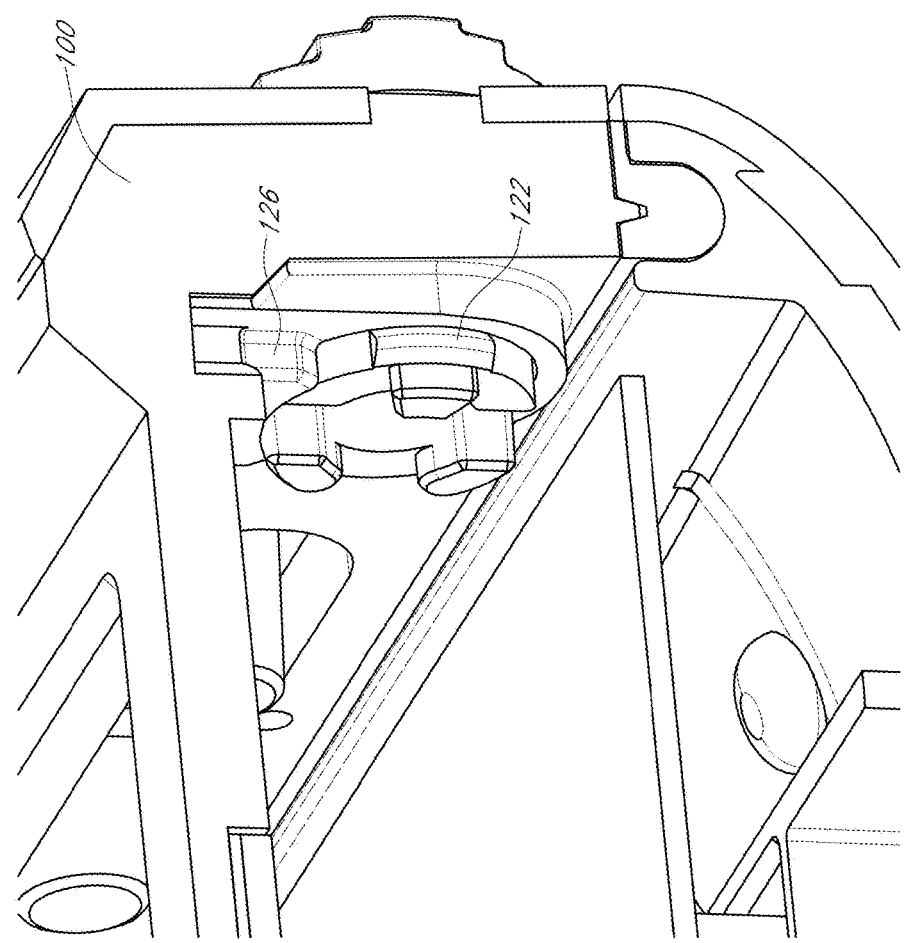
FIG. 48 illustrates an example embodiment of a switch cover on the shell or case.

FIG. 48 is a side, top, perspective view of an example embodiment of a switch cover 102 in the shell. FIG. 48 illustrates a perspective view as seen from the opposite side of the shell of FIG. 47. In FIG. 48, a cross-section of the shell 100 is taken to illustrate certain features of the shell 100 and switch cover 102 as discussed herein. The switch cover 102 can have another or second flange 122. The second flange 122 can be positioned on the cover about 180 degrees opposite form the first flange 122. In some embodiments, the first and second flanges 122 can have other degrees of separation relative to each other, such as, for example, about 170, 160, 150, 140, 130, 120, 110, 100, 90, and/or 80 degrees, including ranges bordering and bounded by the foregoing values. The second flange 122 can also limit, inhibit, or prevent axial movement of the switch cover 102 along the central axis 128 while allowing for rotation of the switch cover 102 as discussed in reference to the first flange 122. The second flange 122 can abut the stop 126 at a predetermined position of the cover to inhibit or prevent further rotation of the switch cover 102 as discussed in reference to the first flange 122.

Figure 49:
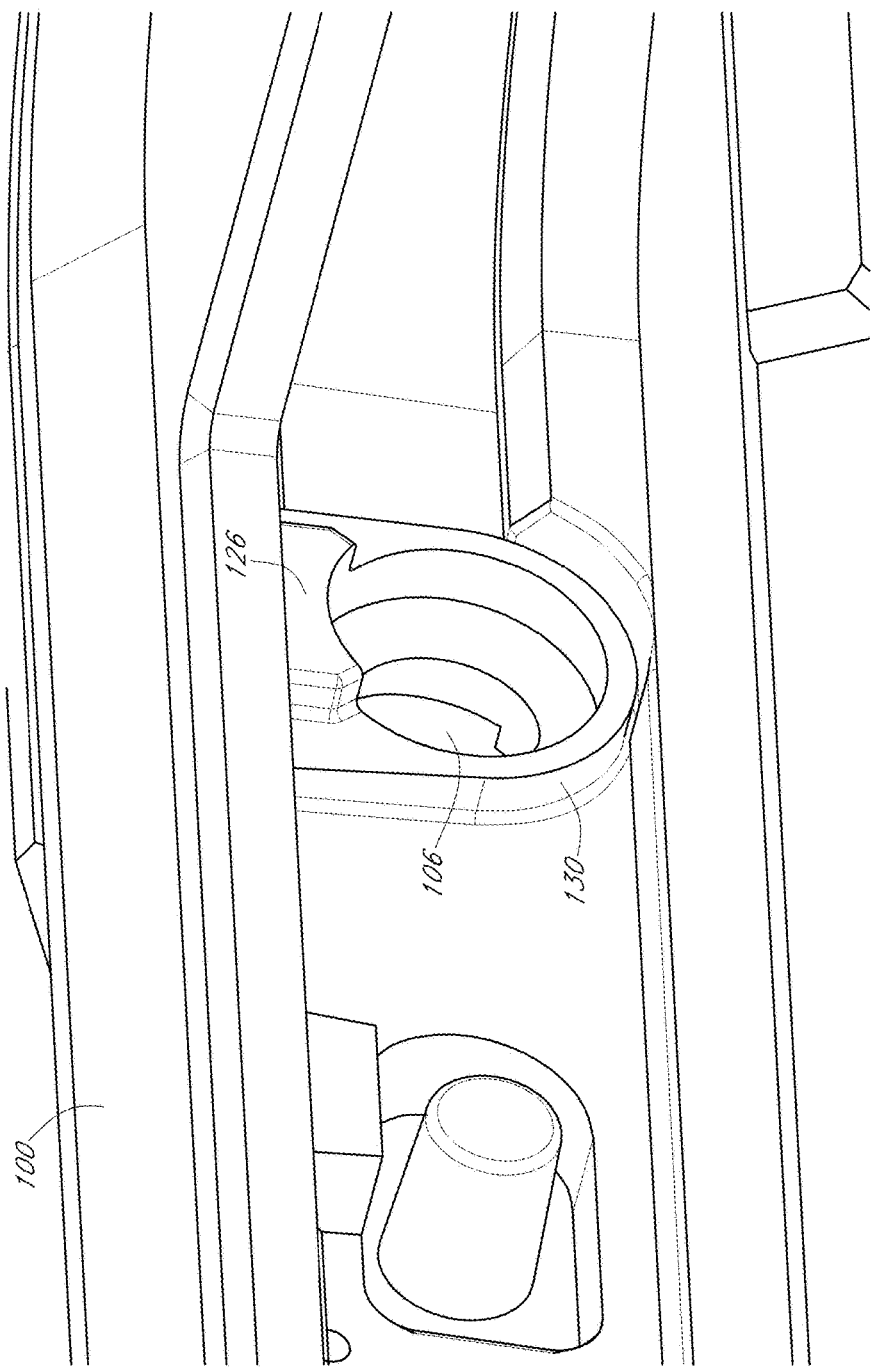
FIG. 49 illustrates an example embodiment of an opening in the shell or case.

FIG. 49 is a side, top, perspective view of an example embodiment of an opening 106 in a shell 100. FIG. 49 illustrates a view from the inside of the shell or case 100 (e.g., where the mobile device is housed). The opening 106 is illustrated without a switch cover 102. The inner wall of the shell 100 (e.g., main wall 132 as discussed in reference to FIG. 50) can have a raised portion 130 to lengthen the opening 106 in the shell 100 to a desired length. The desired length can correspond to a length of the switch cover 102 or a base 152 of the switch cover 152 as discussed herein. The length of the opening 106 and the length of the switch cover 102 can correspond to limit, inhibit, or prevent motion (e.g., axial movement) of the switch cover 102 along the central line (e.g., the axis 128). The raised portion 130 can extend along the length of the opening 106 to substantially match the length of the switch cover 102 from the handle 104 and the first and second flanges 122. The stop 126 can be positioned on the raised portion 130 at a desired position as discussed herein. The stop 126 can extend from or connect to the raised portion 130 at the desired position.

Figure 50:
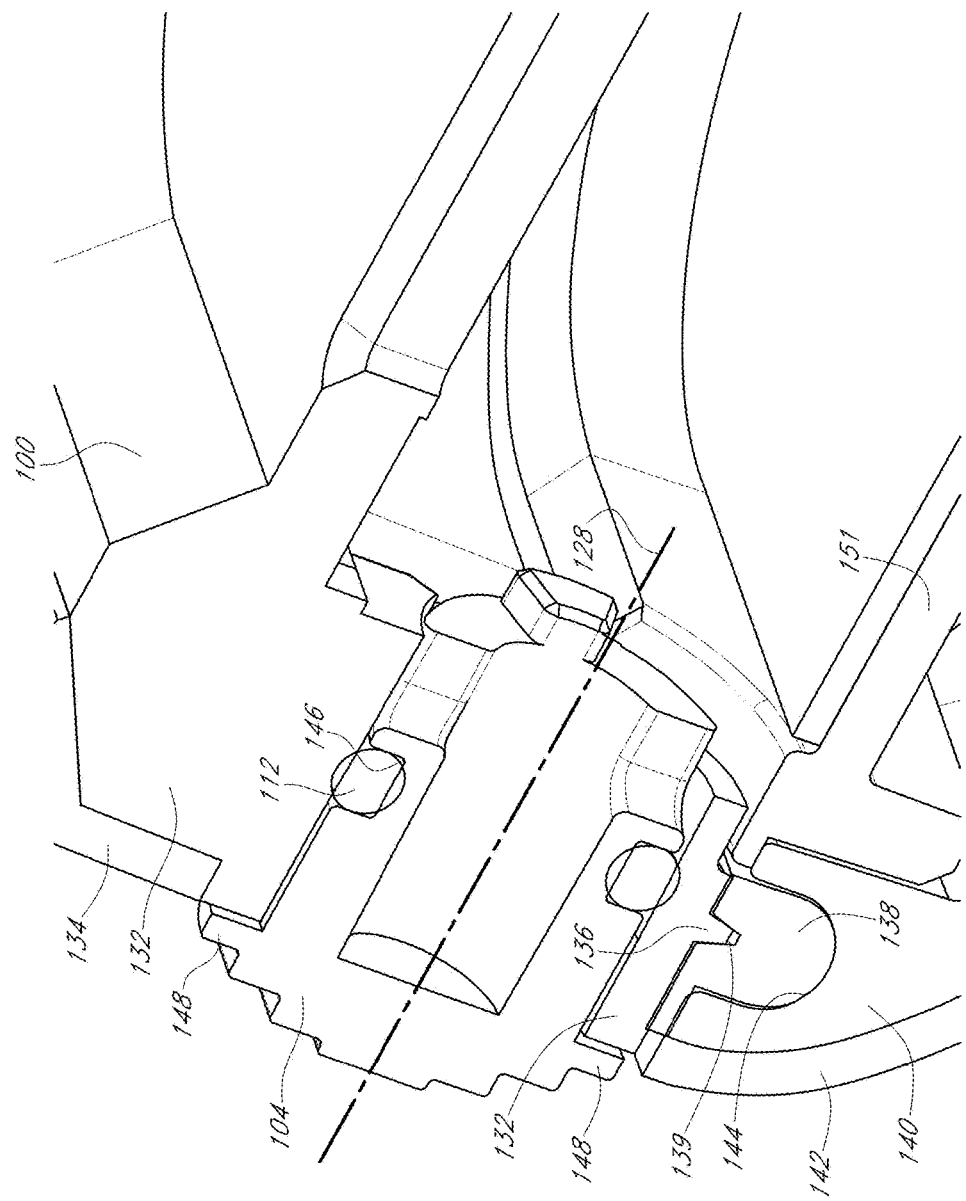
FIG. 50 is a cross-sectional view of a switch cover on the shell or case.

FIG. 50 is a cross-sectional side, top, perspective view of an example embodiment of a switch cover 102 in the shell or case 100. The shell 100 can have an inner or main wall 132 that forms or houses the opening 106. The main wall 132 can be formed from the top portion 52 as discussed herein. In some embodiments, the opening 106 can be formed in the main housing 54 when part line 56 undulates as illustrated in FIGS. 18-21. The shell 100 can have a top outer skin 134 that covers or overlays on at least a portion of the inner wall to provide a desired level of protection and/or a desired aesthetic appearance. The outer skin can be the over molded impact absorbing regions 22 as discussed herein. The inner wall 132 and top outer skin 134 form at least a portion or part of a top portion of the shell 100 (e.g., top portion 52). The following features discussed in connection with FIG. 50 can have the same and/or different functionality as the functionality discussed in reference to FIG. 42. The inner wall 132 can have a protrusion or perimeter flange 136 extending from or connected to the inner wall 132. The perimeter flange 132 can extend near or at the periphery of the shell 100 between the top portion 52 and a bottom portion (e.g. main housing 54) of the shell 100 as discussed herein. The perimeter flange 132 can extend an entire length or portions of the periphery (e.g. part line 56 as discussed herein) of the shell 100. The perimeter flange 132 can rest in a perimeter track 138. The perimeter track 138 can have a channel 139 that engages, connects to, or mates with the perimeter flange 136. The perimeter track 138 and/or perimeter channel 139 thereof (perimeter channel) can extend an entire length or portions of the periphery (e.g., part line 56) of the shell between the top portion 52 and the bottom portion 54 of the shell 100. A length of the perimeter track 138 and/or perimeter channel 139 can correspond to a length of the perimeter flange 136. The engagement, connection, or mating of the perimeter flange 136 with the perimeter track 138 (including channel 139), can facilitate positioning the top portion 52 and the bottom portion 54 of the shell 100 as desired. Desired or proper positioning of the various features and parts of the shell 100 (e.g., top portion 52 and bottom portion 54 of the shell) can facilitate in positioning the cover 100 relative to the switch 46 to achieve the desired contact, engagement, or mating and functionality of the switch cover 102 as discussed herein when the mobile device 4 is inserted into the shell or case 100.

As illustrated in FIG. 50, the shell 100 can have an inner bottom wall 140 (e.g., main housing 54). The shell 100 can have a bottom outer skin 142 (e.g., outer skin can be the over molded impact absorbing regions 22 as discussed herein) that covers or overlays on at least a portion of the bottom wall 140 to provide a desired level of protection and/or a desired aesthetic appearance. The bottom wall 140 and bottom outer skin 142 form at least a portion or part of the bottom portion 54 of the shell. The inner bottom wall 140 can have a perimeter cutout or indentation 144. The perimeter cutout 144 can be sized and shaped to engage, connects to, or mate with the perimeter track 138 to secure and/or house the perimeter track 138. In some embodiments, the perimeter track 138 can be formed or made at least partially from elastic materials, such as, nylon or rubber, and/or other plastic materials (e.g., main gasket 16 as discussed herein). The elastic material can provide a cushioned or elastic connection between the top and bottom portions 52, 54 of the shell 100 to, for example, reduce forces transmitted to the mobile device due to a sudden force or shock applied to the shell 100 (e.g., the shell 100 housing the mobile device 4 is dropped by the user).

Figure 54:
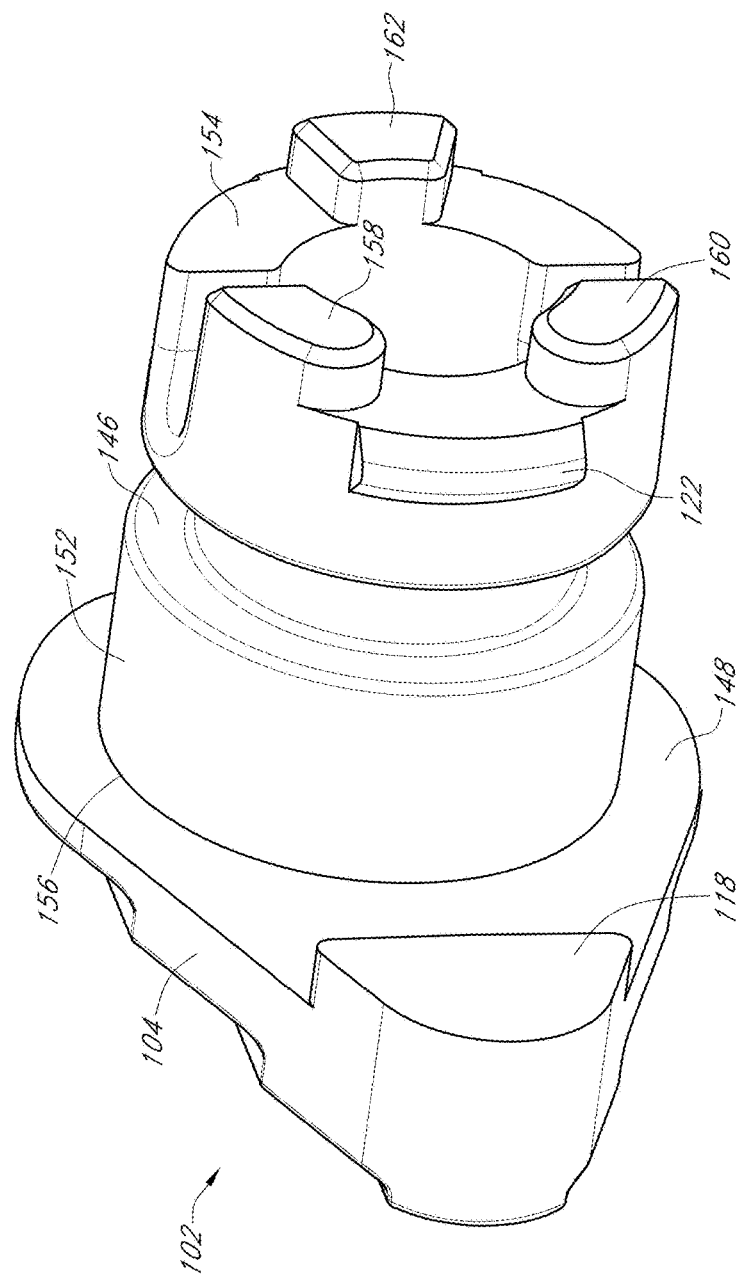
FIGS. 54-59 illustrate various views of an example embodiment of a switch cover.

With continued reference to FIG. 50, the switch cover 102 can have a gasket channel or cutout 146 formed in the switch cover 102 (shown, for example, in FIG. 54). The gasket channel 146 can be sized and shaped to house and position the cover gasket 112 as discussed herein as desired to form the seal from the external environmental elements. The size of the gasket channel 146 can closely correspond to the size of the cover gasket 112 when the cover gasket 112 is substantially not deformed (e.g., not stretched or compressed). For example, FIG. 50 illustrates an example size of the cover gasket 112 in its uncompressed or non-deformed shape or state. The periphery or wall of the cover gasket 112 is shown to overlap with the periphery or walls 132 of the opening 106 and the gasket channel 146 to illustrate example portion of the cover gasket 112 that would be compressed against the opening 106 and/or the gasket channel 146 when the cover gasket 112 is positioned within the opening 106 and/or gasket channel 146. Thus, when the cover gasket 112 is inserted into the gasket channel 146 and the switch cover 102 is inserted into the opening 106, the cover gasket 112 can be sized and shaped such that the cover gasket 112 is compressed by the walls 132 of the opening 106 and/or the gasket channel 146. Compression of the material of the cover gasket 112 against features of the opening 106 and/or switch cover 102 as discussed herein can create the seal from external environmental elements (e.g., such that the switch cover 102 is waterproof and/or water/dust resistant).

When the switch cover 102 is rotated as discussed herein, the cover gasket 112 can remain continuously compressed during the rotational movement. Thereby, the cover gasket 112 can maintain the seal during movement of the rotating switch cover 102 to move the switch 46 of the mobile device 4. While the switch cover 102 is being rotated, the cover gasket 112 can remain stationary relative to the switch cover 102 and/or the opening 106. Stated differently, while the switch cover 102 is being rotated, the cover gasket 112 can move relative to the switch cover 102, the opening 106, or both.

With continued reference to FIG. 50, the handle 104 of the switch cover 102 can have handle flanges 148 that extend beyond or protrude past the wall or periphery 132 of the opening 106 (e.g., external wall of the top cover 52 of the shell 100). The handle flanges 148 can abut, come against, or engage the wall 132 of the shell 100. The handle flanges 148 can limit, inhibit, or prevent further insertion or travel of the switch cover 102 into the opening 106 along the axis 128. The handle flanges 148 can be positioned to function with the one or more flanges 122 to limit, inhibit, or prevent movement of the switch cover 102 along the axis 128 once the switch cover 102 is inserted into the opening 106 as discussed herein.

Figure 51:
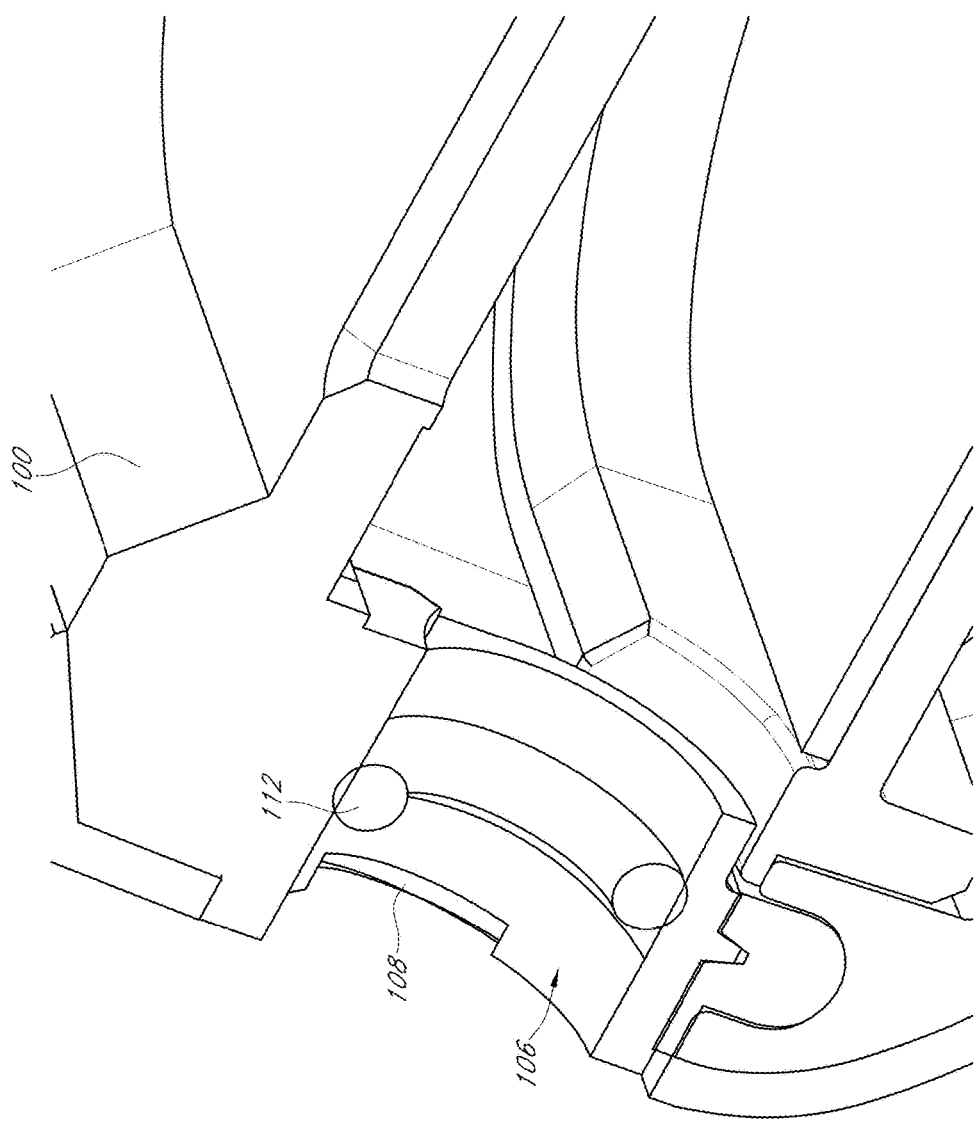
FIG. 51 is a cross-sectional view of an example embodiment of an opening in a shell or case.

FIG. 51 is a cross-sectional side, top, perspective view of an example embodiment of an opening 106 in a shell 100. The opening 106 is illustrated from the inside of the shell 106 without a switch cover 102. The cover gasket 112 can be positioned in the opening 106 near or at the midpoint of the opening 106 in the shell 100. In some embodiments, the cover gasket 112 can be positioned on the switch cover 102 (e.g., in the channel 146) before the switch cover 102 is inserted into the opening 106 during assembly.

Figure 52:
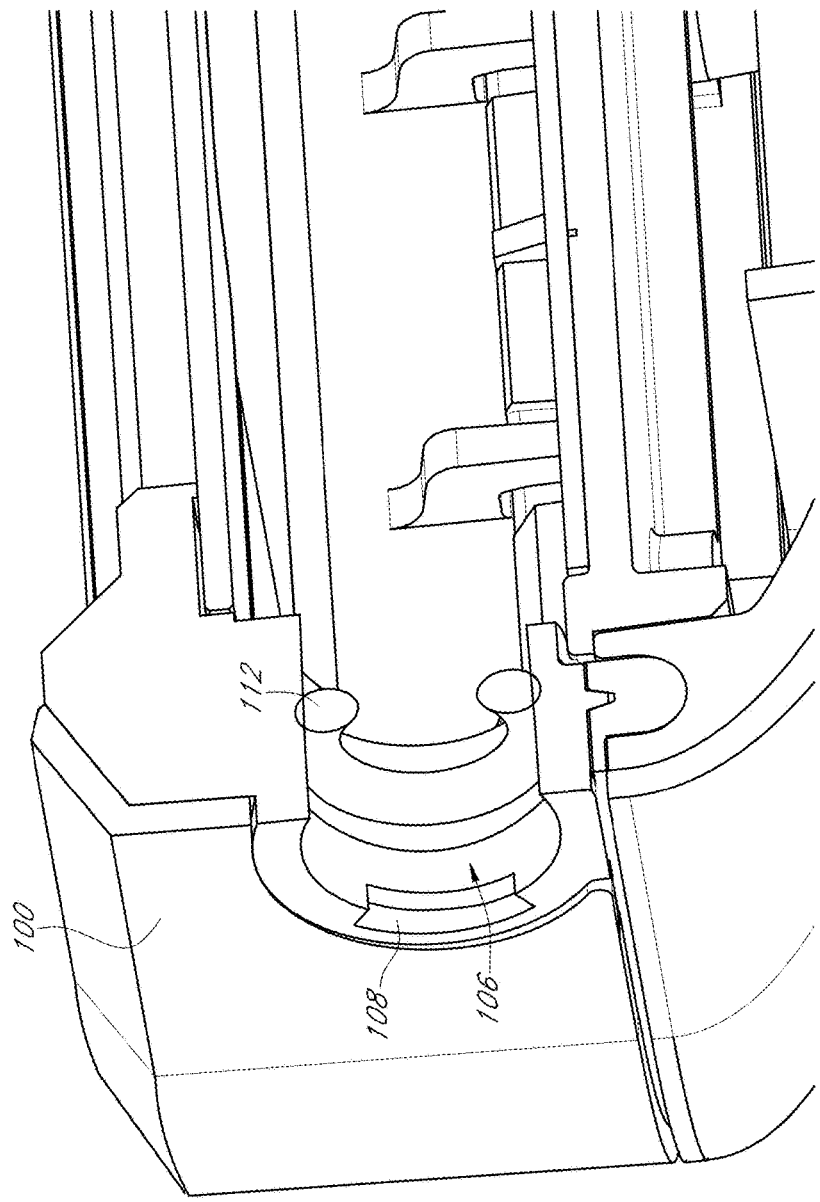
FIG. 52 is a cross-sectional view of an example embodiment of an opening in a shell or case.

FIG. 52 is a cross-sectional side perspective view of an example embodiment of an opening 106 in a shell 100. The opening 106 is illustrated from outside of the shell 100 without the switch cover 102. The groove 108 can be sized and shaped to engage or mate with the knob 110 of the switch cover 102 as discussed herein. The groove 108 can be positioned to provide a same or substantially similar range of motion or degrees of rotation of the cover as provide by the flange 122 and stops 126 discussed herein.

As illustrated in FIG. 52, the cover gasket 112 can be generally circular in shape. The cover gasket 112 can be a torus shaped and sized to rest in the gasket channel 146 as discussed herein. A cross-section of the cover gasket 112 along the central axis 128 can be generally circular or oval when the cover gasket 112 is uncompressed. In some embodiments, the cross-section of the cover gasket 112 can be generally any desired shape, such as, for example, rectangular, square, hexagonal, octagonal, and/or the like, including combinations of various shapes along a length, periphery, and/or circumference of the cover gasket 112.

Figure 53:
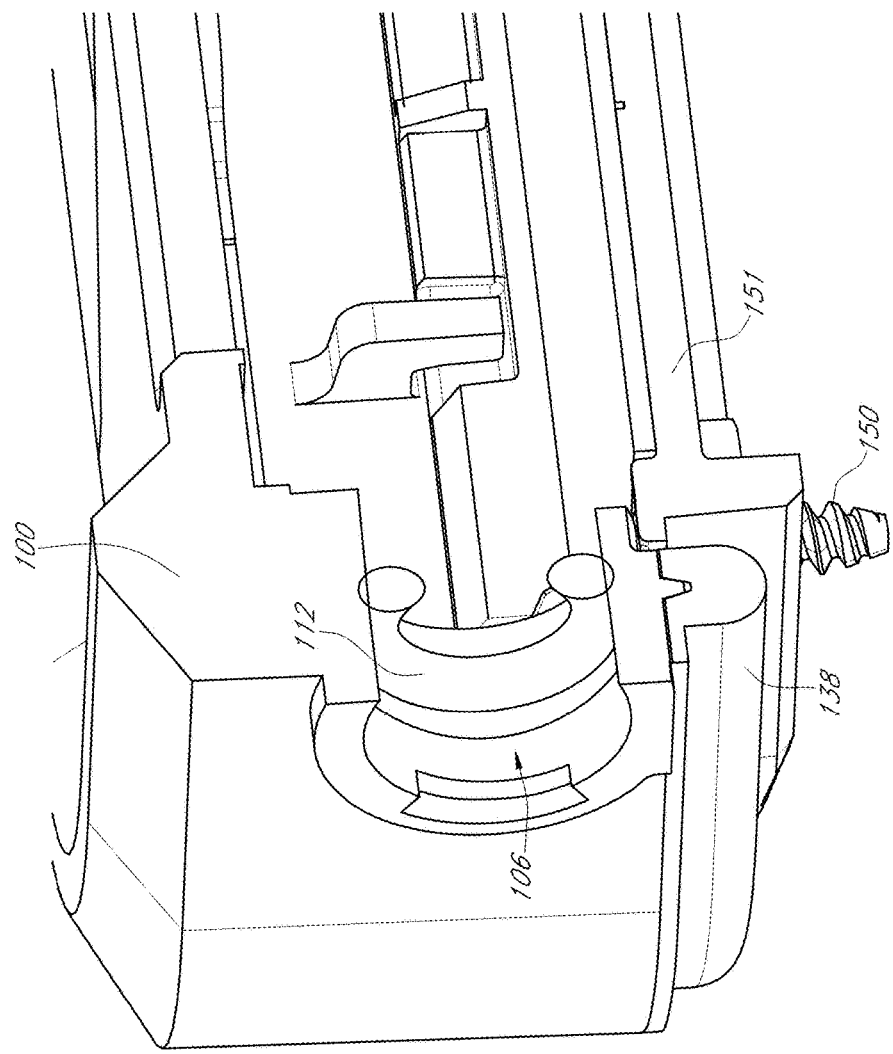
FIG. 53 is a cross-sectional view of an example embodiment of an opening in a shell or case.

FIG. 53 is a cross-sectional side, top, perspective view of an example embodiment of an opening 106 in a shell or case 100. The opening 106 is illustrated from outside the shell 100 without a switch cover 112. FIG. 53 illustrates the shell 100 without a part of the bottom portion/main housing 54 (e.g., inner bottom wall 140 and bottom outer skin 142) of the shell 100. As shown, the perimeter track 138 (e.g., main gasket 16) can extend substantially throughout or continue along the perimeter or periphery (e.g., part line 56) of the shell between the top and bottom portions 52, 54 of the shell 100. The bottom portion 52 can also have screws, springs, and/or dampeners 150 positioned to fasten or secure parts of the shell relative to each other (e.g., mobile device positioner 151 and bottom inner wall 140) and/or reduce forces transmitted to the mobile device 4 due to a sudden force or shock applied to the shell 100 (e.g., the shell 100 housing the mobile device 4 is dropped by the user). For example, the springs 150 can be positioned between the inner bottom wall 140 and a mobile device positioner or tray 151 (or at various other locations) to dampen transmission of a force or shock to the inner bottom wall 140 applied to the shel 100 and/or bottom outer skin 142. The device positioner 151 can be secured to other parts of the shell 100 (e.g., inner bottom wall 140) at a desired position via screws 150 or other fasteners. The screws, springs, and/or dampeners 150 can be a combination of a fastener (e.g., a screw) and a dampener. The mobile device positioner 151 can facilitate in positioning the mobile device 4 relative to the shell 100 and switch cover 102 as discussed herein to achieve the desired contact, engagement, or mating with switch cover 102 and switch 46 as discussed herein.

FIG. 54 a side, top, perspective view of an example embodiment of a switch cover 102. The switch cover 102 can have a base 152. The base 152 can have a first surface, end, or portion 154 and a second surface, end, or portion 156. The base 152 can be substantially round or cylindrical about a central axis 128 extending between the first surface/end 154 and the second surface/end 156 (as illustrated in FIG. 50). The base 152 can have a gasket channel 146 to engage or mate with a cover gasket 112 as discussed herein. The gasket channel 146 can be positioned on the base 152 between the first and second ends 154, 156. The gasket channel 146 can be generally rectangular or square in cross-section. In some embodiment, the gasket channel 146 can be generally any desired shape such as, for example, round, circular, oval, partially polygonal, and/or the like, including combinations of various shapes along the gasket channel 146.

The first surface or end 154 can have one or more guides (e.g., a first guiderail 158 and a second guiderail 160) configured to engage or mate with a switch or toggle 46 of a mobile device 4. The first surface/end 154 can have one or more flanges 122 to position the switch cover 102 in the opening 106 as discussed herein (e.g., abut an inner wall and/or main wall 132 of the shell 100) and limit the rotation of the switch cover 102 as discussed herein (e.g., abut a stop 126).

The second surface 156 of the switch cover 102 can have a handle 104. The handle 104 can have handle flanges 148 to position the switch cover 102 in the opening 106 as discussed herein (e.g., abut an outer wall and/or main wall 132 of the shell 100). The handle 104 can have a handle stop 118 to limit the rotation of the switch cover 102 as discussed herein. In some embodiments, the handle stop 118 can have a knob to engage or mate with a groove 120 of the shell 100 to bias the switch cover 102 in a predetermined position when the switch cover 102 is in the predetermined position as discussed herein.

Figure 55:
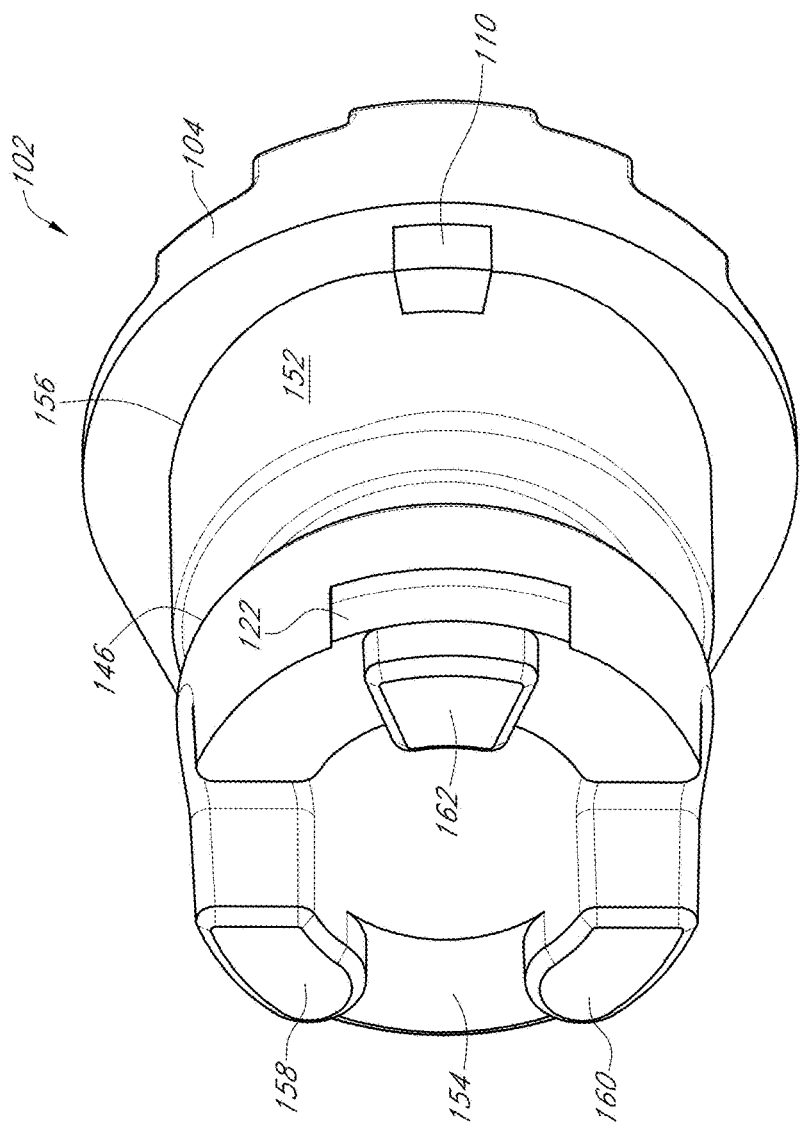

FIG. 55 a side, top, perspective view of an example embodiment of a switch cover 102. The view of FIG. 55 is of the other side of the switch cover 102 from the view illustrated in FIG. 54. The switch cover 102 can have a back support 162. The back support 162 can press against or abut a wall and/or periphery of the mobile device 4 for the switch cover 102 to stay at a predetermined position relative to the mobile device 4 as discussed herein, and in particular, in reference to FIGS. 58 and 59. For example, when the mobile device 4 is inserted into the shell 100, the first and second guiderails 158, 160 and the back support 162 can abut or press against the wall and/or periphery of the mobile device, positioning the switch cover 102 at a substantially constant distance relative to the wall and/or periphery of the mobile device 4. Maintaining the predetermined position or constant distance of the switch cover 102 relative to the mobile device 4 can help ensure proper engagement of the first and second guiderails 158, 160 with the switch 46 and adequate clearance to move the switch 46 as discussed herein, and in particular, in reference to FIGS. 58 and 59.

The switch cover 102 can have a protrusion or knob 110 to engage a groove 108 of a wall (e.g., main wall 132) of the shell 100 as discussed herein, and in particular, in reference to FIG. 45. The protrusion 110 can be sized and shaped to slide within the groove 108 and limit the range of motion or degrees of rotation of the switch cover 102 as discussed herein. The protrusion 110 can be positioned near second surface 154 of the base 152. The protrusion 110 can be in contact with or connect to the handle flanges 104. The protrusion 110 can be centrally aligned with the second flange 122 to similarly limit motion or degrees of rotation (e.g., a same degree of rotation) of the switch cover 102 as discussed herein.

Figure 56:
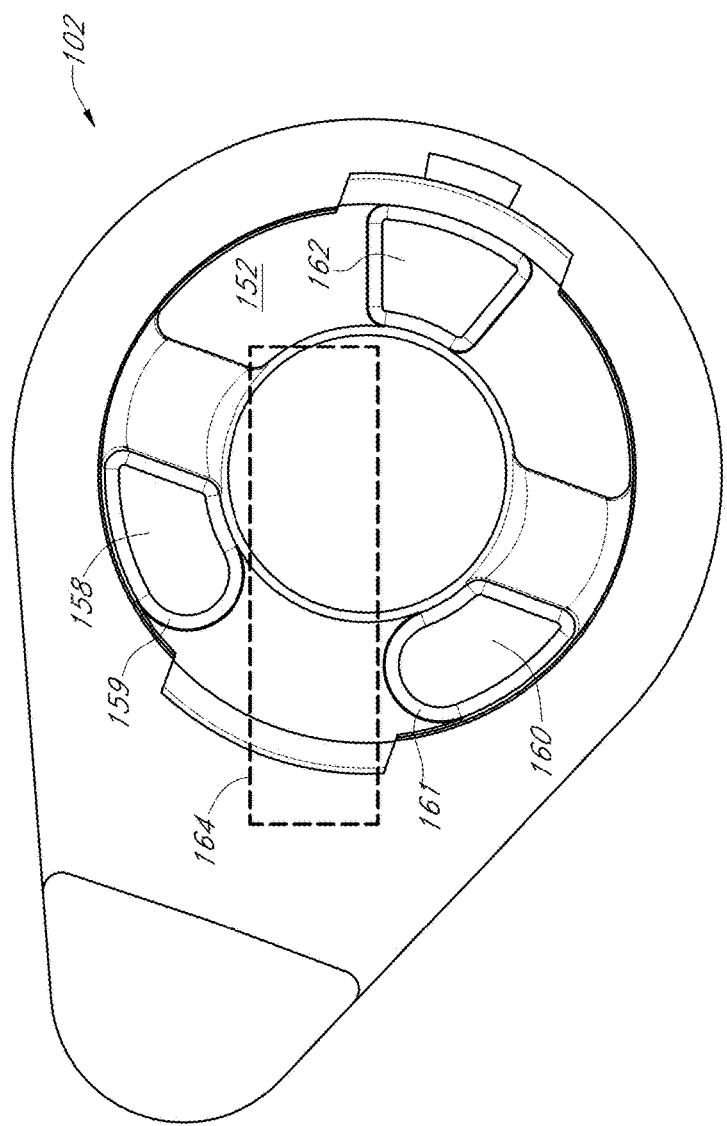

FIG. 56 is a side view of an example embodiment of a switch cover 102. A switch outline 164 (corresponding to a shape of a switch 46 of a mobile device 4) as would be engaged by the first and second guiderails 158, 160 is illustrated with dashed lines. The switch 46 can have a first portion (e.g., a left portion of the switch outline 164 as shown in FIG. 56) and a second portion (e.g., a right portion of the switch outline 164 as shown in FIG. 56). The first and second guiderails 158, 160 can engage the first portion of the switch 46 to apply a force to toggle the switch 46 as the switch cover 102 rotates. Many variations are possible. For example, in some embodiments, the first and second guiderails 158, 160 can engage the second portion of the switch 46. For example, a switch cover 102 may be positioned such that the first and second guiderails 158, 160 engage the second portion while the first portion remains outside of a periphery of the base 152. In some embodiments, the first and second guiderails 158, 160 can generally engage the switch 46, such as, for example, engaging the switch 46 at a midpoint of the switch 46. The points of engagement of between the switch cover 102 and switch 46 can move or transition as the switch cover 102 rotates as discussed herein.

As illustrated in FIG. 56, the first and second guiderails (e.g., guides) 158, 160 can engage the first portion of the switch 46 (e.g., the left portion of the switch outline 164 as shown in FIG. 56) to apply a force to toggle the switch 46. The second portion of the switch 46 (e.g., right portion of the switch outline 164 as shown in FIG. 56) can protrude past the first and second guiderails 158, 160 toward the back support 162. As the switch cover 102 is rotated, a part of the second portion of the switch 46 (e.g., right portion of the switch outline 164 as shown in FIG. 56) may move onto or over the wall of the base 152. For example, FIG. 56 shows that an upper right corner of the switch outline 164 moves over the wall of the base 152 as the switch cover 102 is rotated clockwise. Stated different, in some embodiments, the base 152 may be hollow and form a lumen via walls, and the second portion of the switch 46 can move past the lumen and overlap with the wall of the base 152. By keeping the switch cover 102 at a predetermined position relative to the mobile device 4 as discussed herein, and in particular, in reference to FIGS. 58 and 59, and consequently the switch 46, the switch cover 102 can be positioned to maintain a desired clearance between the wall of the base 152 and the switch 46 to allow the switch 46 to move onto or over the wall of the base 152.

The first and second guiderails (e.g., rounded guides) 158, 160 can have rounded ends 159, 161, respectively. The rounded ends 159, 161 can facilitate or help position the switch cover 102 to correspond to the position of the switch 46 when the mobile device 4 is initially inserted into the shell 100. For example, if the switch 46 is in a position corresponding to the switch cover 102 being in an up position (or first position) (e.g., as illustrated in FIG. 56), but the switch cover 102 is in a down position (or second position), the rounded end 159 of the first guiderail 158 can move against the switch 46 as the mobile device 4 is inserted, causing the switch cover 102 to rotate upward to match the position of the switch 46 as illustrated in FIG. 56.

In some instances, references to up and down can refer to an orientation in which the screen of the mobile device 4 would face upward, even though the case 100 and mobile device 4 could be positioned in various other orientations during use. The up position (or first position) of switch 46 of the mobile device 4 can correspond to a normal (e.g., not silent or auditory) mode of the mobile device 4. The down position (or second position) of switch 46 of the mobile device 4 can correspond to a quiet (e.g., vibrate or silent) mode of the mobile device 4. Other configurations are possible. For example, the up position (or first position) of the switch cover 102 can be configured to position the switch 46 into the quiet (e.g. vibrate or silent) mode of the mobile device 4, and the down position (or second position) of the switch cover 102 can be configured to position the switch 46 into the normal (e.g., not silent or auditory) mode of the mobile device 4.

In some embodiments, the switch cover 102 can be configured to move between the first and second positions in response to a force that is lower than an amount of force that would cause the switch 46 to move between its first and second positions. Thus, when the mobile device 4 is coupled or inserted into to the case 100 with the switch cover 102 misaligned from the switch 46, the switch cover 102 is moved to correspond to the position of the switch 46 instead of the switch 46 moving to correspond to the position of the switch cover 102.

When the switch cover 102 is rotated by a user, the rounded ends 158, 159 are correspondingly also rotated. The different parts or portions of the rounded ends 158, 159 contact or abut the switch 46 as the switch cover 102 is rotated. The rounded ends 158, 159 facilitate a smooth transition between the different portions of the switch 46 contacting the rounded ends 158, 159. For example, the rounded ends 158, 159 can be shaped and configured to roll over a contact surface or wall of the switch 46 as the switch cover 102 is rotated. The rolling of the rounded ends 158, 159 on the contact surface of the switch 46 can provide a smooth movement or mechanism by which rotational movement of the switch cover 102 and correspondingly the guiderails 158, 160 is transferred to the switch 46 as translational movement (e.g., up and down). Thus, the first and second guiderail 158, 160 can contact different portions (e.g., first and second portions) of the switch 46 as the switch cover 102 is rotated, and the switch 46 is moved. The portions of the switch 46 not in contact with the guiderails 158, 160 move without obstructions (e.g., over the wall of the base 152) to allow the translational movement of the switch 46. In some embodiments, the rounded guides 158, 160 are configured to roll along the switch 46, as opposed to sliding along the switch 46, when the switch cover 102 is rotated. In some embodiments, the guides 158, 160 can slide along the switch 46 as the cover 102 rotates.

FIG. 57 is a bottom perspective view of an example embodiment of a switch cover 102. The base 152 can have u-channels 124 positioned proximal or nearby the first and second flanges 122. The u-channel 124 can be on or nearby the first surface 154 of the base 152. The u-channel 124 can be a cutout or gap in the base 154 or wall of the base 152 that allows the base 152 wall to flex inward when the wall of the base 152 is compressed (e.g., forces applied at the first and second flanges 122). The u-channels 124 can allow for insertion of the switch cover 102 into the opening 106 of the shell 106 when the flanges 122 are designed to protrude past the walls (e.g., perimeter or periphery such as the circumference) of the opening 106. When the switch cover 102 is being inserted into the opening 106, the wall of the 152 can flex inward as a force is applied to the first and second flanges 122 via the wall of the opening 106. Flexing inward of the first and second flanges 122 allows for the switch cover 102 to be inserted. When the flanges 122 emerge beyond the wall (extent of the opening along axis 128) of the opening 106 on the inside of the shell 100, the resilience in the wall of the 152 can flex the wall of the base 152 back into its original position. The wall of the base 152 flexing back to its original position arranges the flanges 122 against the inside wall 132 of the shell 100 as discussed herein to secure the position of switch cover 102 along the central axis 128 (e.g., inhibit or prevent the switch cover 102 from being removed or withdrawn from the opening 106).

As illustrated in FIG. 57, the cross-section of the first and second flanges 122 can gradually increase in width to a desired width to allow the flanges 122 to slide against the wall (e.g., perimeter or periphery such as the circumference) of the opening 106 and progressively flex the wall of the base 152 as the switch cover 102 is initially inserted. For example, the flanges 122 can be substantially triangular in cross-section. In some embodiments, the flanges 122 can be square in cross-section to securely retain the switch cover 102 in the opening 106 after being inserted. For example, when a side of the first and second flanges 122 (e.g., a side facing the raised portion 130 of the shell 100) is substantially parallel with the wall of the shell 100, the abutment of the flange sides 122 with the wall of the shell 100 can impede flexing inward of the wall of the base 152 via the u-channels 124 when a force is applied that pulls or pushes the switch cover 102 out of the opening 106.

Figure 58:
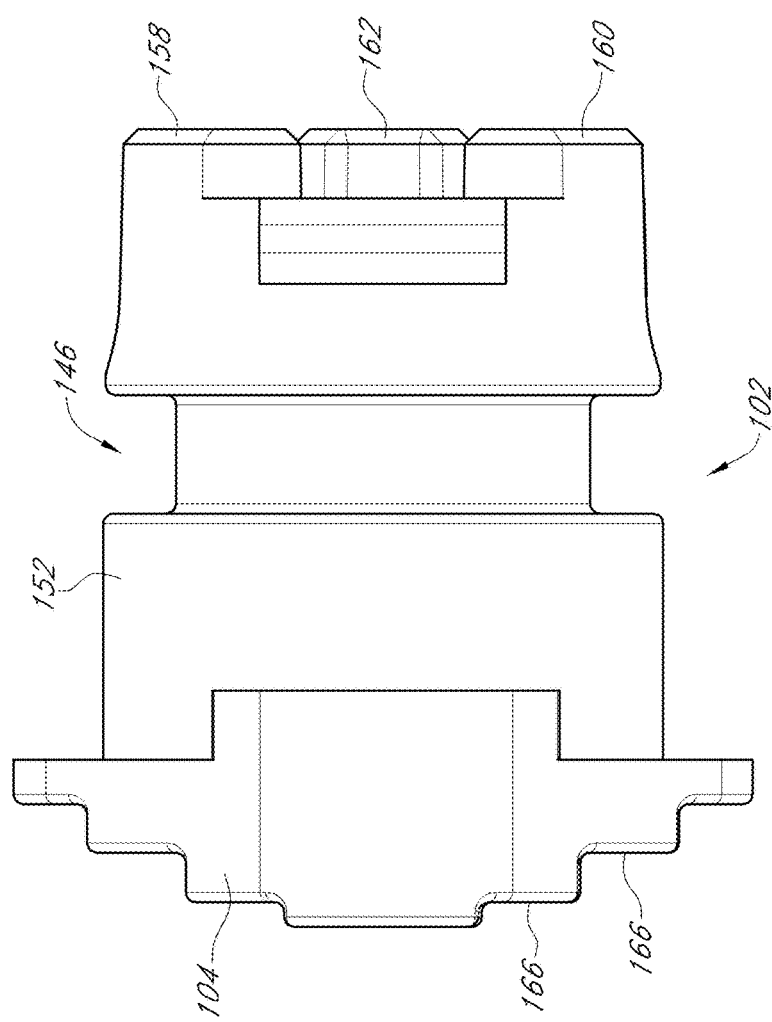
Figure 59:
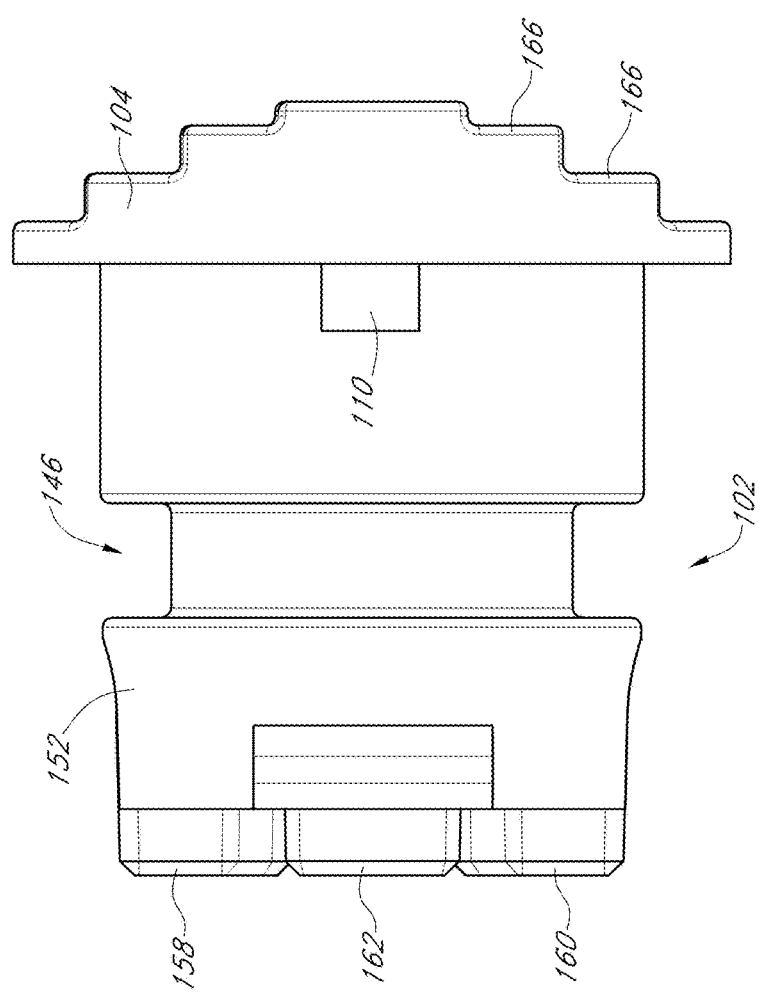

FIG. 58 is a side view of an example embodiment of a cover 102. FIG. 59 is another side view of an example embodiment of a cover 102. The first and second guiderails 158, 160 and the back support 162 can terminate, end, or lie in a same plane perpendicular to a central axis 128 (FIG. 50). For example, surfaces of the first and second guiderails 158, 160 and the back support 162 can terminate, end, or lie in the same plane as shown in FIGS. 58 and 59. By terminating in the same plane, the switch cover 102 can remain at a predetermined position relative to the mobile device 4 or walls of the mobile device 4 to, for example, provide clearance for the switch 46 to move as the switch cover 102 is rotated as discussed herein, and in particular in, reference to FIG. 46.

As illustrated in FIGS. 58 and 59, the handle 104 can have step like features 166 that increase the width of the handle toward the center (e.g., central axis 128) of the handle 104 and/or switch cover 102. The pyramid-like shape can aid a user in gripping and rotating the handle 104 and/or switch cover 102.

The foregoing description has set forth various embodiments of the systems and/or methods via the use of figures and/or examples. Insofar as such figures and/or examples contain one or more functions and/or operations, it will be understood by those within the art that each function and/or operation within figures or examples can be implemented individually and/or collectively. The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

The following is claimed:

1. A water-resistant protective case for a mobile device with a touch screen, the protective case comprising:

a first case portion and a second case portion configured to form flail the protective case around the mobile device, the protective case configured to reveal the touch screen;

a plurality of impact-absorbing regions fixed to the protective case;

a battery;

an internal interface capable of electrically coupling with the mobile device when the mobile device is in the protective case;

an external interface electrically coupled to the internal interface, wherein the external interface is a different connection type from the internal interface, and wherein the external interface and the internal interface comply with different standards;

a water-resistant seal formed between the first case portion and the second case portion when the first case portion and the second case portion are coupled to form the protective case; and a switch cover rotatable between a first position and a second position, wherein the switch cover is configured to move a switch on the mobile device linearly to a first switch position when the switch cover is rotated to the first position, and wherein the switch cover is configured to move the switch linearly to a second switch position when the switch cover is rotated to the second position.

2. The protective case of claim 1, wherein the water-resistant seal comprises a gasket.

3. The protective case of claim 2, wherein a first portion of the gasket is disposed between the internal interface and the first case portion and wherein a second portion of the gasket is disposed between the internal interface and the second case portion.

4. The protective case of claim 1, further comprising a plurality of openings and flexible port covers configured to correspond to ports and/or buttons on the mobile device when the mobile device is in the protective case.

5. The protective case of claim 1, further comprising a screen gasket capable of forming a water-tight seal around the touch screen when the mobile device is in the protective case.

6. The protective case of claim 1, further comprising a membrane attached to the protective case disposed in front of the touch screen when the mobile device is in the protective case.

7. The protective case of claim 6, wherein a tactile input on one side of the membrane registers with the touch screen on the mobile device when the mobile device is in the protective case.

8. The protective case of claim 1, wherein the plurality of impact-absorbing regions comprise over-molded thermoplastic.

9. The protective case of claim 1, further comprising a flexible sleeve configured to stretch around the protective case.

10. The protective case of claim 1, wherein the battery and another battery in the mobile device are configured to be charged through the external interface.

11. The protective case of claim 1, further comprising a battery information display.

12. The protective case of claim 1, wherein the battery is enclosed within the first case portion.

13. The protective case of claim 1, wherein:

the switch cover comprises:

a base having a first portion and a second portion, the switch cover configured to rotate about an axis of the base, the first portion configured to face the switch of the mobile device when the mobile device is in the protective case, the second portion configured to face away from the switch; and
a guide on the first portion of the base, the guide configured to engage the switch of the mobile device when the mobile device is in the protective case;
the protective case has an opening that engages the switch cover while allowing the switch cover to rotate about the axis of the base; and
the switch cover is configured such that when the mobile device is in the protective case and the switch cover is rotated about the axis of the base, the guide moves the switch of the mobile device.

14. A protective case for a mobile device with a touch screen, the protective case comprising:
a first rigid case portion and a second rigid case portion configured to form the protective case around the mobile device, the protective case configured to reveal the touch screen;
a battery;
an internal interface capable of electrically coupling with the mobile device when the mobile device is in the protective case;
an external interface electrically coupled to the internal interface; wherein the external interface is a different connection type from the internal interface; and
wherein the external interface and the internal interface comply with different standards;
a water-resistant seal formed between the first rigid case portion and the second rigid case portion when the first rigid case portion and the second rigid case portion are coupled to form the protective case;
a flexible sleeve configured to stretch around the protective case; and
a switch cover rotatable between a first position and a second position,
wherein the switch cover is configured to move a switch on the mobile device to a first switch position when the switch cover is moved to the first position, and wherein the switch cover is configured to move the switch to a second switch position when the switch cover is moved to the second position.

15. The protective case of claim 14, wherein the water-resistant seal comprises a gasket.

16. The protective case of claim 15, wherein a first portion of the gasket is disposed between the internal interface and the first rigid case portion and wherein a second portion of the gasket is disposed between the internal interface and the second rigid case portion.

17. The protective case of claim 14, further comprising a plurality of openings and flexible port covers configured to correspond to ports and/or buttons on the mobile device when the mobile device is in the protective case.

18. The protective case of claim 14, further comprising a second gasket capable of forming a water-tight seal around the touch screen.

19. The protective case of claim 14, further comprising a membrane attached to the protective case disposed in front of the touch screen when the mobile device is in the protective case.

20. The protective case of claim 19, wherein an input on one side of the membrane opposite the touch screen registers with the touch screen on the mobile device when the mobile device is in the protective case.

21. The protective case of claim 14, further comprising a waterproof microphone port.

22. The protective case of claim 14, wherein the battery of the protective case and a battery in the mobile device are configured to be charged through the external interface.

23. The protective case of claim 14, further comprising a battery information display.

24. The protective case of claim 14, wherein the protective case additionally comprises a third case portion.

25. The protective case of claim 14, wherein the battery is enclosed within the first rigid case portion.

26. The protective case of claim 14, wherein:
the switch cover comprises:
a base having a first portion and a second portion, the switch cover configured to rotate about an axis of the base, the first portion configured to face the switch of the mobile device when the mobile device is in the protective case, the second portion configured to face away from the switch; and
a guide on the first portion of the base, the guide configured to engage the switch of the mobile device when the mobile device is in the protective case; and
the switch cover is configured such that when the mobile device is in the protective case and the switch cover is rotated about the axis of the base, the guide moves the switch of the mobile device.

27. A protective case for a portable electronic device, the protective case comprising:
a first rigid case portion and a second rigid case portion configured to form the protective case around the portable electronic device; a battery;
an internal interface capable of electrically coupling with the portable electronic device when the portable electronic device is in the protective case;
a water-resistant seal formed between the first rigid case portion and the second rigid case portion when the first rigid case portion and the second rigid case portion are coupled to form the protective case; and
a switch cover rotatable between a first position and a second position; wherein the switch cover is configured to move a switch on the portable electronic device to a first switch position when the switch cover is moved to the first position, and wherein the switch cover is configured to move the switch to a second switch position when the switch cover is moved to the second position.

28. The protective case of claim 27, wherein:
the switch cover comprises:
a base having a first portion and a second portion, the switch cover configured to rotate about an axis of the base, the first portion configured to face the switch of the portable electronic device when the portable electronic device is in the protective case, the second portion configured to face away from the switch; and
a guide on the first portion of the base, the guide configured to engage the switch of the portable electronic device when the portable electronic device is in the protective case; and
the switch cover is configured such that when the portable electronic device is in the protective case and the switch cover is rotated about the axis of the base, the guide moves the switch of the portable electronic device.

29. The protective case of claim 28, wherein the guide comprises a first guiderail on the first portion of the base and a second guiderail on the first portion of the base, the first guiderail corresponding to a first side of the switch of the portable electronic device, the second guiderail corresponding to a second side of the switch of the portable electronic device, the first side of the switch opposite the second side of the switch, wherein when the switch cover is rotated in a first direction, the first guiderail rotates about the axis and pushes the first side of the switch to move the switch towards the first switch position, and wherein when the switch cover is rotated in a second direction, the second guiderail rotates about the axis and pushes the second side of the switch to move the switch towards the second switch position.

30. The protective case of claim 29, wherein the first and second guiderails form a pathway between the first and second guiderails to allow the switch to slide between the first and second guiderail when the portable electronic device is inserted into the protective case.

31. The protective case of claim 28, wherein the switch cover comprises a handle on the second portion to allow a user to rotate the switch cover about the axis.

32. The protective case of claim 31, further comprising a handle cutout, the handle cutout engaging the handle to inhibit rotation of the handle beyond a periphery of the handle cutout.

33. The protective case of claim 27, wherein the switch cover is rotatable between the first position and the second position, wherein the switch cover is configured to move the switch on the portable electronic device linearly to the first switch position when the switch cover is rotated to the first position, and wherein the switch cover is configured to move the switch linearly to the second switch position when the switch cover is rotated to the second position.

34. The protective case of claim 27, further comprising a gasket on the switch cover, the gasket engaging an opening in the protective case to form a water-resistant seal between the switch cover and the protective case, the opening configured to allow the switch to move between the first switch position and the second switch position, the water-resistant seal inhibiting contact of external environment elements with the portable electronic device when the portable electronic device is in the protective case.

* * * * *